(12) United States Patent
Laracuente-Rodriguez

(10) Patent No.: US 10,648,447 B2
(45) Date of Patent: May 12, 2020

(54) MECHANICAL SYSTEM FOR EXTRACTING ENERGY FROM MARINE WAVES

(71) Applicant: Ivan A. Laracuente-Rodriguez, Bayamon, PR (US)

(72) Inventor: Ivan A. Laracuente-Rodriguez, Bayamon, PR (US)

( * ) Notice: Subject to any disclaimer, the term of this patent is extended or adjusted under 35 U.S.C. 154(b) by 123 days.

(21) Appl. No.: 15/676,748

(22) Filed: Aug. 14, 2017

(65) Prior Publication Data
US 2018/0128237 A1    May 10, 2018

Related U.S. Application Data

(60) Provisional application No. 62/374,121, filed on Aug. 12, 2016.

(51) Int. Cl.
*F03B 13/22*  (2006.01)
*F03B 13/20*  (2006.01)
*F03B 15/00*  (2006.01)

(52) U.S. Cl.
CPC ............. *F03B 13/22* (2013.01); *F03B 13/20* (2013.01); *F03B 15/00* (2013.01); *F05B 2220/706* (2013.01); *F05B 2240/93* (2013.01); *F05B 2260/406* (2013.01); *F05B 2260/50* (2013.01); *Y02E 10/38* (2013.01)

(58) Field of Classification Search
CPC .... F03B 13/20; F03B 13/22; F05B 2220/706; F05B 2240/93; F05B 2260/50; F05B 2260/406; Y02E 10/38
See application file for complete search history.

(56) References Cited

U.S. PATENT DOCUMENTS

| | | | | |
|---|---|---|---|---|
| 1,018,678 A | * | 2/1912 | Nelson | F02B 63/04 290/4 D |
| 4,781,023 A | * | 11/1988 | Gordon | F03B 13/20 290/42 |
| 2008/0018114 A1 | * | 1/2008 | Weldon | F03B 13/181 290/53 |
| 2010/0038913 A1 | * | 2/2010 | Svelund | F03B 13/1815 290/53 |
| 2011/0121572 A1 | * | 5/2011 | Levchets | F03B 13/20 290/53 |
| 2012/0025532 A1 | * | 2/2012 | Song | F03B 13/1805 290/53 |

(Continued)

*Primary Examiner* — Ryan A Reis
(74) *Attorney, Agent, or Firm* — Eugenio J. Torres-Oyola; Victor M. Rodriguez-Reyes; Rafael Rodriguez-Muriel

(57) ABSTRACT

A mechanical structure used for extracting energy from oscillating marine waves is submitted. The apparatus comprises a plurality of buoyant tanks connected by a plurality of horizontal outriggers through a hinge assembly to a vertical frame located between the buoyant tanks. Marine waves create a pitching motion in the tanks forcing the outriggers to ascend and descend causing the vertical frame to rotate perpendicularly along the horizontal axis of the hinge. The power extraction system is comprised of a plurality of hydraulic cylinders connected to the vertical frame and outriggers. The pitching motion of the buoyant tanks and outriggers produce a vertical rotation along the horizontal axis of the hinge in the vertical frame, which forces contraction and expansion of the hydraulic cylinder assembly, thus extracting power from the relative motion between the members.

12 Claims, 44 Drawing Sheets

(56) References Cited

U.S. PATENT DOCUMENTS

| | | | |
|---|---|---|---|
| 2013/0008164 A1* | 1/2013 | Cunningham | F03B 13/20 60/641.8 |
| 2013/0067903 A1* | 3/2013 | Murtagh | F03B 13/20 60/505 |
| 2014/0091575 A1* | 4/2014 | McCormick | F03B 13/20 290/53 |

* cited by examiner

Fig. 5
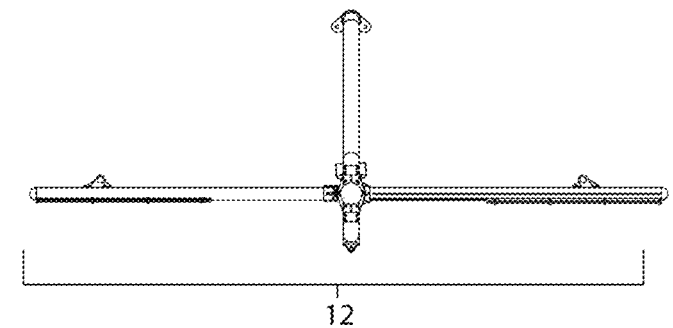
12
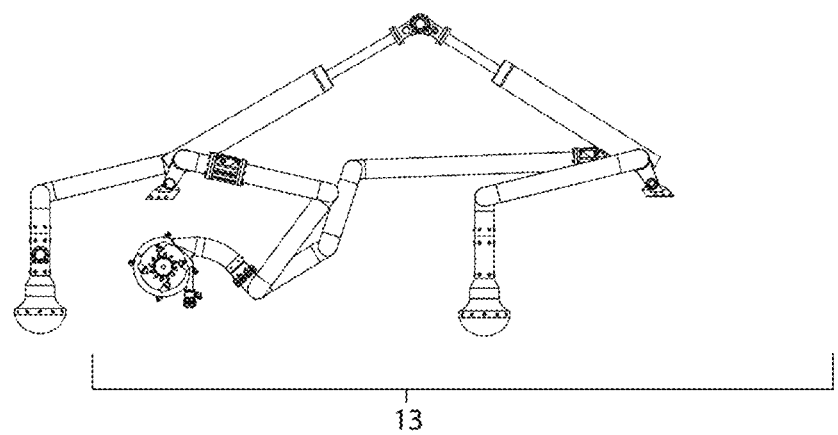
13
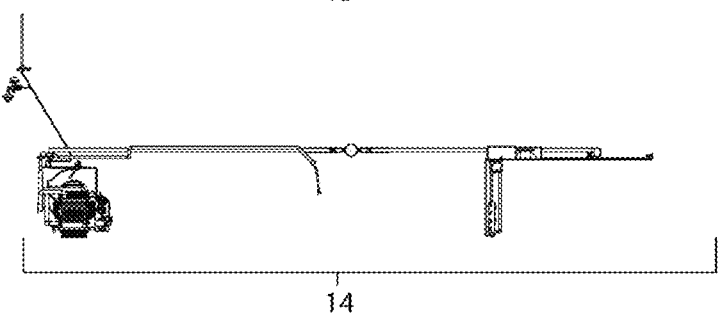
14
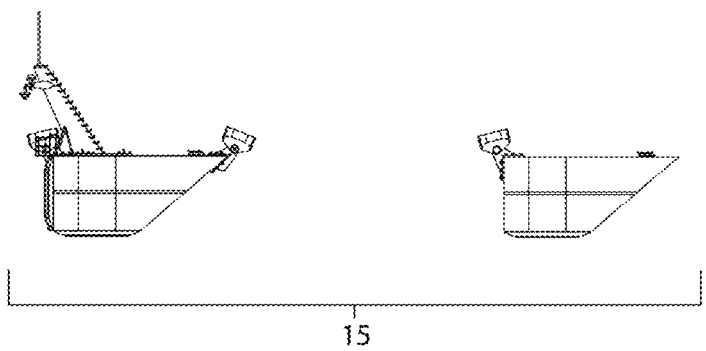
15

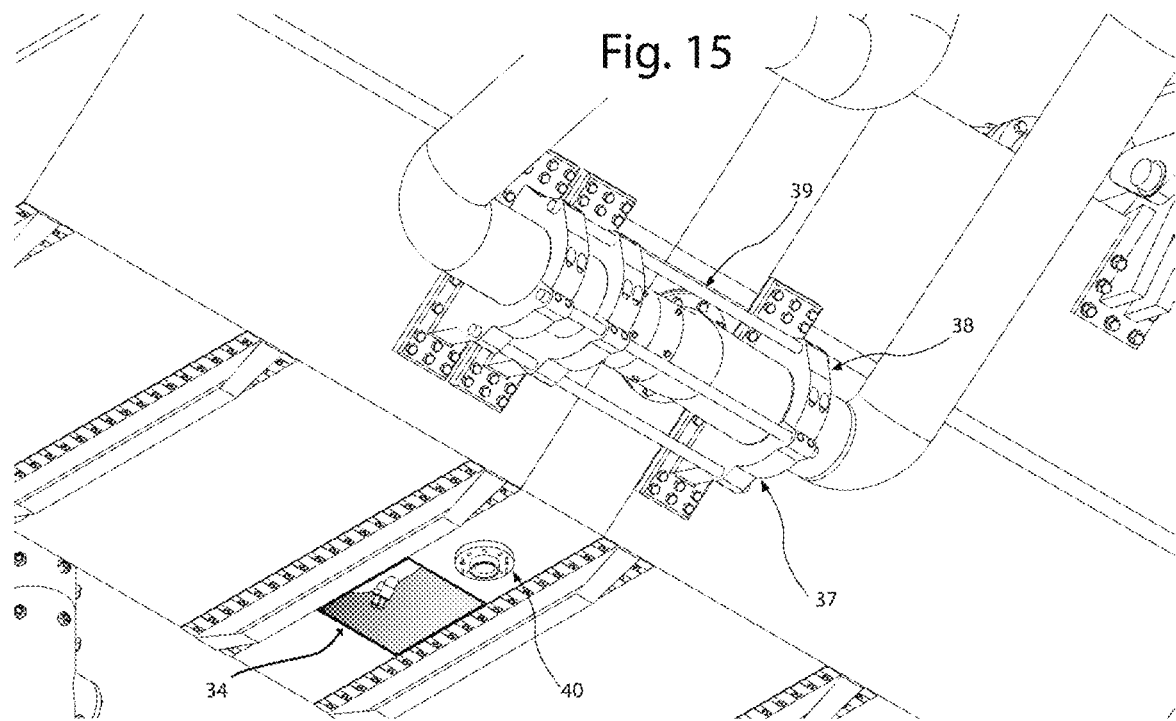
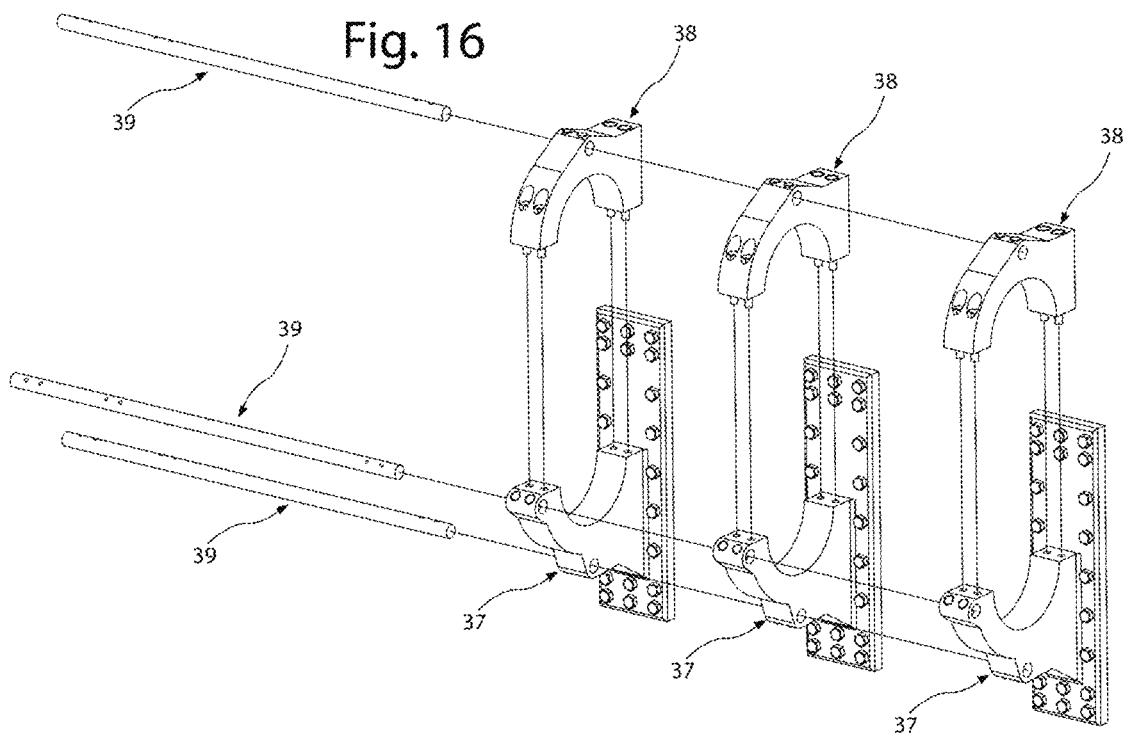

Fig. 26
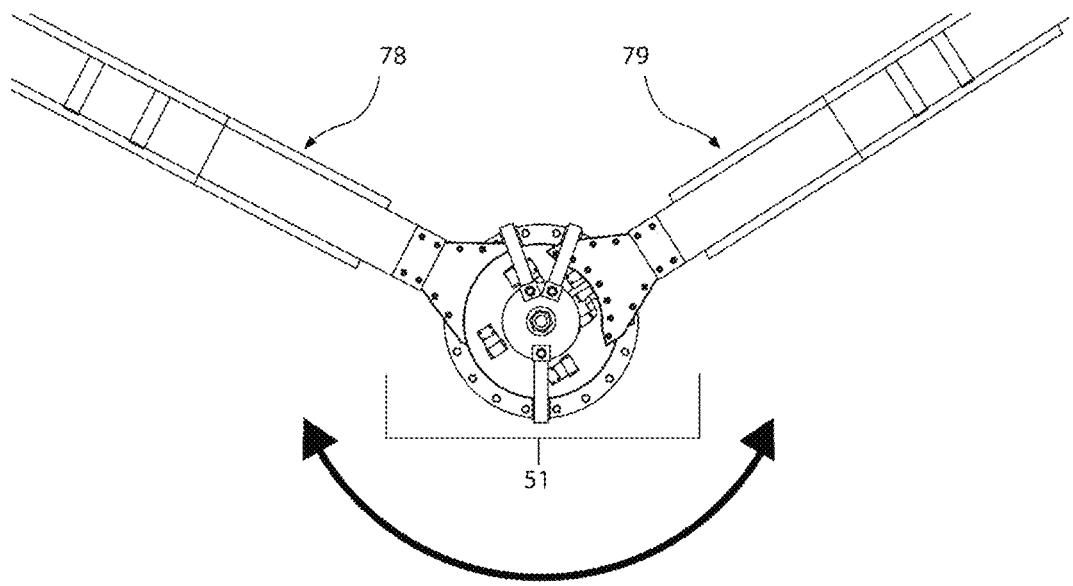
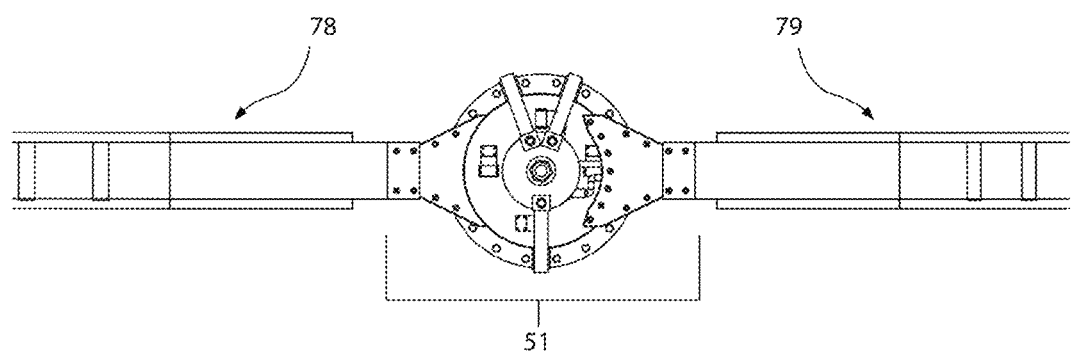
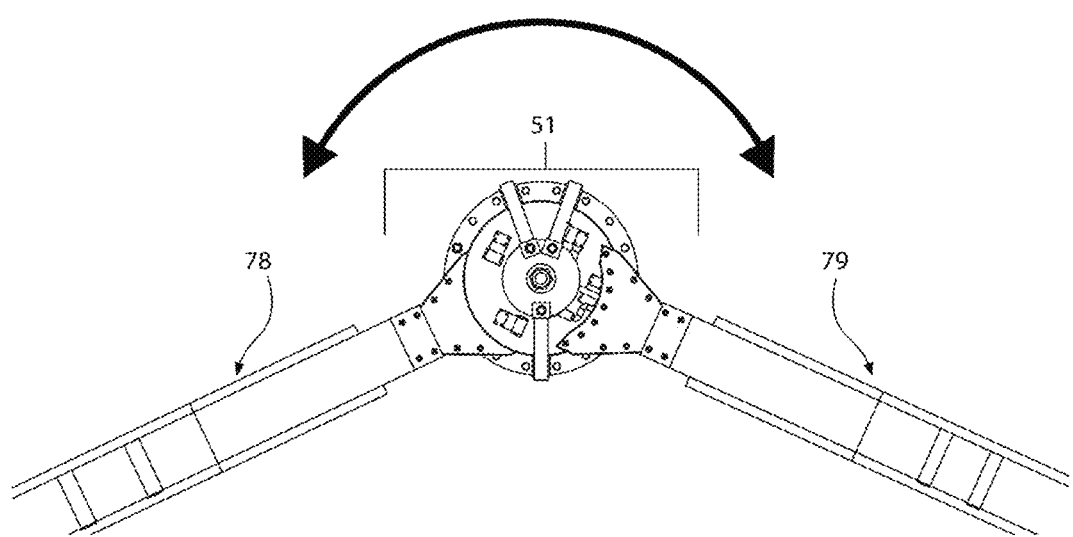

Fig. 60
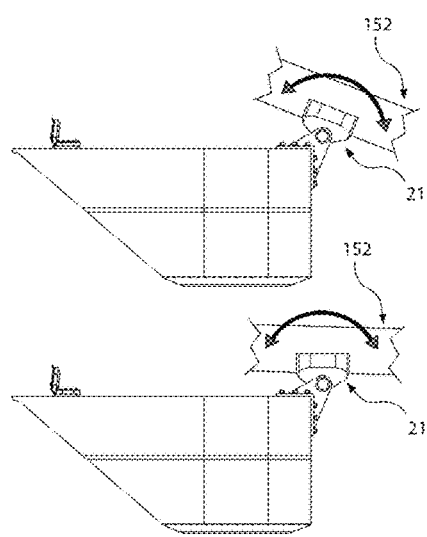
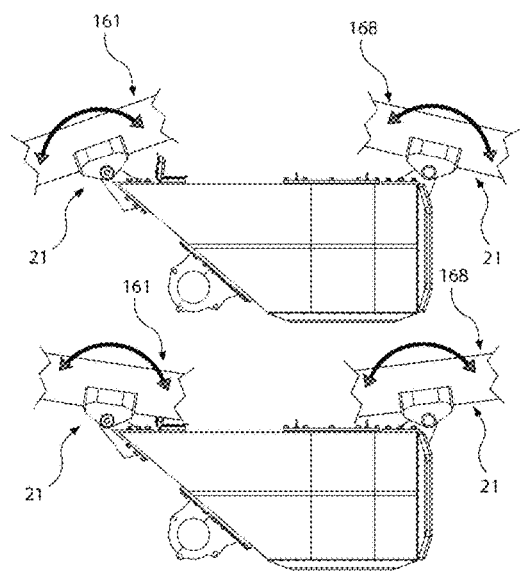

Fig. 69
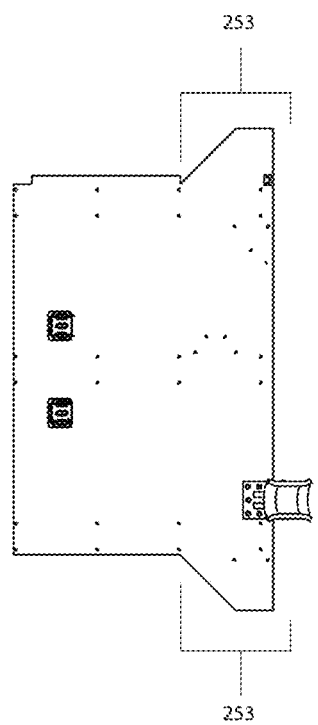
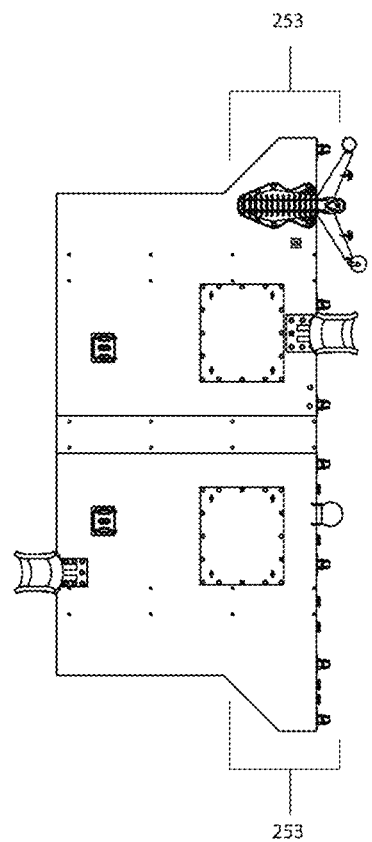
Fig. 70
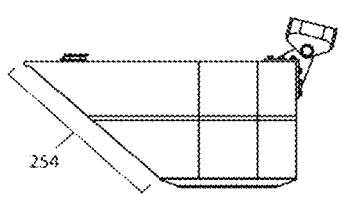
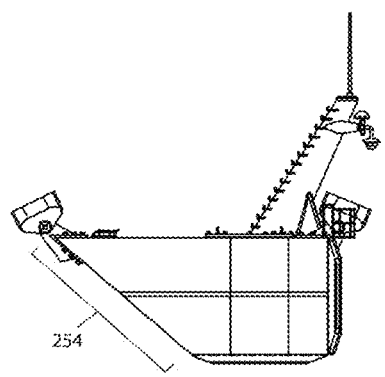

Fig. 71
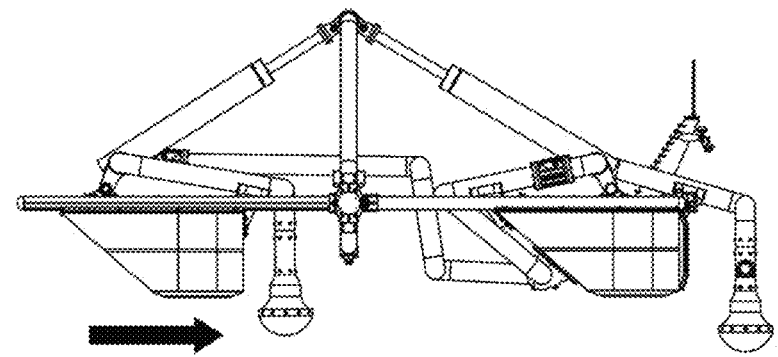
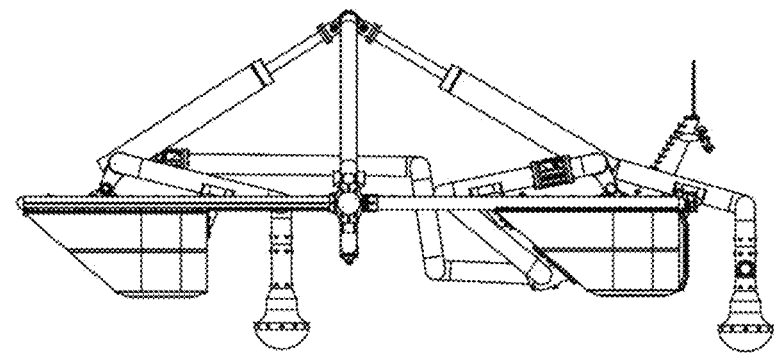
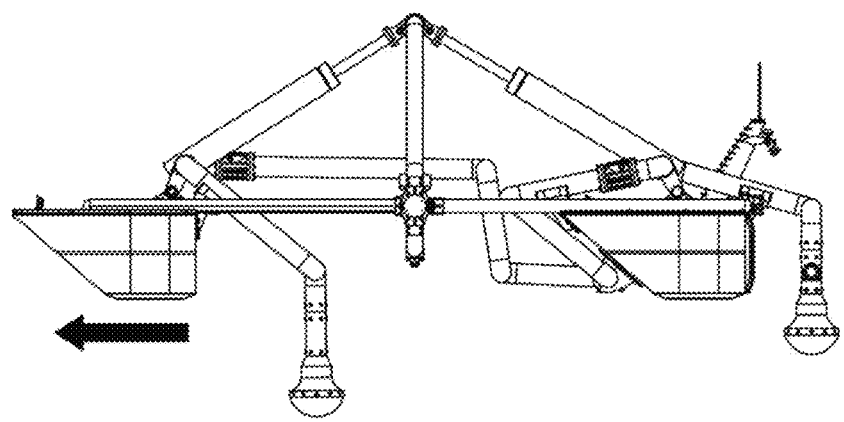

MECHANICAL SYSTEM FOR EXTRACTING ENERGY FROM MARINE WAVES

STATEMENT REGARDING FEDERALLY SPONSORED RESEARCH AND DEVELOPMENT

The present disclosure claim the benefits from Provisional application 62/374,121 filed on Aug. 12, 2017.

RELATED APPLICATIONS

N/A.

FIELD OF THE INVENTION

This invention relates to the field of marine renewable energy. More specifically, it relates to the field of marine Wave Energy Converters being comprised mainly of buoyant tanks, flexible interlocking structures, hydraulic rams, hydraulic circuits, hydraulic turbines and generators.

BACKGROUND OF THE INVENTION

Electricity, fuel and potable water production are becoming more expensive, less available and or contaminating. Of the renewable energies that exist on Earth, the most power intensive and consistent is marine wave energy owing to the density of the water and wave creation by local wind conditions or weather events hundreds or thousands of miles away. Ocean waves will raise and lower a buoyant object and this continuous difference in height is what this wave energy converter (WEC) exploits to extract energy for multiple uses.

Research, development and deployment of WEC technologies have been severely lagging when compared to weaker and less consistent solar and wind technologies but in the last decade more private companies and universities are researching, building and testing diverse WEC designs because of their greater potential to harness consistent and predictable large amounts of energy from marine waves. WECs can provide electricity either mechanically or through hydraulics. Hydraulics can be closed loop (pumping a fluid within a circulating loop) or open circulatory (pumping fluid from an external source and expelling it from the system).

WECs can also store hydraulic energy for future use in hydraulic pneumatic accumulators, water storage tanks, or in ponds or lakes elevated above sea level. Since WECs do not use fuel to generate energy, the electricity they produce is low cost and non-contaminating which can then produce inexpensive clean burning fuel for internal combustion engines in the form of hydrogen through the process of electrolysis.

WECs can pump seawater at high pressures to a desalination system, eliminating the costs and maintenance related to mechanical pumps and the high cost of electrical usage that the pumps consume. Wave energy converters can be the production centerpiece of low cost electricity, potable water and clean burning fuels. This design can also build artificial reefs or underwater structures through electrochemical accretion and act as fish accumulators by providing a floating structure for fish to congregate around.

While certain aspects of conventional technologies have been discussed to facilitate disclosure of the invention, Applicant in no way disclaims these technical aspects, and it is contemplated that the claimed invention may encompass one or more of the conventional technical aspects discussed herein.

In this specification where a document, act, or item of knowledge is referred to or discussed, this reference or discussion is not an admission that the document, act, or item of knowledge or any combination thereof was at the priority date, publicly available, known to the public, part of common general knowledge, or otherwise constitutes prior art under the applicable statutory provision; or is known to be relevant to an attempt to solve any problem with which this specification is concerned.

SUMMARY

The present disclosure presents a mechanical structure used for extracting energy from oscillating marine waves is submitted. In accordance with the principles of the current disclosure the exemplary embodiment is different from current WECs that extract energy from a small segment of marine waves or from only one wave at a time and cannot adapt themselves to the changing frequencies and amplitudes of the waves that are affecting them or need more than two buoyancy tanks or a large structure to sustain themselves. In any of the other designs, the full energy potential is not used or more materials are needed, all of which raise initial costs and maintenance expenses.

In accordance with the principles of the present disclosure the apparatus comprises a plurality of buoyant tanks connected by a plurality of horizontal outriggers through a hinge assembly to a vertical frame located between the buoyant tanks. Marine waves create a pitching motion in the tanks forcing the outriggers to ascend and descend causing the vertical frame to rotate perpendicularly along the horizontal axis of the hinge.

The exemplary embodiment includes a power extraction system comprising a plurality of hydraulic rams, mechanically coupled or connected to the vertical frame and outriggers. The pitching motion of the buoyant tanks and outriggers produce a vertical rotation along the horizontal axis of the hinge in the vertical frame which forces contraction and expansion of the hydraulic rams, thus extracting power from the relative motion between the members.

The exemplary embodiment presented is large, approximately 100 feet by 50 feet for uses above 5 megawatts. However, other sizes are also considered such as for homes near the beach, size approximately 4 feet by 8 feet or small businesses 12 feet by 24 feet as well as for use by the military, emergency situations or poor communities with metallic or inflatable floats in accordance with the principles of the present disclosure. Size is dependent on energy required.

A clear understanding of the disclosure summarized above may be had by reference to the appended drawings which illustrate the exemplary components, their spatial relationship to one another and their interaction, although it will be understood that such drawings depict preferred embodiments of the disclosure and therefore, are not to be considered as limiting its scope with regard to other embodiments which the invention is capable of contemplating. Examples of some different embodiments in this exemplary embodiments are as follows; the numbers of outriggers in this exemplary embodiment are three forward and three rearward, the number and position of the outriggers can be changed and the exemplary embodiment will continue to work.

The outriggers are basically tubular but other shapes such as rectangular, oblong, trusses and other shapes can also be used. The vertical frame in this design is triangular but square, round, rectangular, oblong and other shapes or combined shapes can be used. The buoyancy tanks have rectangular and triangular forms in its overall design but other shapes which afford buoyancy can be used, as well as more than one tank can be used for the forward section as well as for the rear section. The hydraulic ram in this design is a piston/rod cylinder type but it may also be a multi stage hydraulic ram, double action hydraulic cylinder or any type of hydraulic pumping device which expands or contracts or mechanical device which lifts and lowers or spins to produce movement.

The front buoyancy tank contains a motorized rack and pinion system with two brakes so that the forward buoyancy tank can move forward or backwards but any linear actuator system or combination of different actuator systems can be used in lieu of the current one shown without affecting the systems performance. The transmission gears between the turbine shaft and the generator show a large gear on the turbine shaft and a small gear on the generator shaft which would produce high speeds on the turbine but the position of the gears can be reversed to produce higher torque on the generator. Any other combination of gears and pulleys can be used without changing the basic principal of transfer of energy including direct drive.

The disclosure as presented produces electricity on board but the exemplary embodiment can also produce high pressure water only which would be sent by pipes for production of electricity or potable water on shore or to other areas as required with only internal modifications.

The present disclosure may address one or more of the problems and deficiencies of the prior art discussed above. However, it is contemplated that the disclosure may prove useful in addressing other problems and deficiencies in a number of technical areas. Therefore, the claimed invention should not necessarily be construed as limited to addressing any of the particular problems or deficiencies discussed herein.

BRIEF DESCRIPTION OF THE DRAWINGS

These and other features, aspects, and advantages of the present invention will become better understood with regard to the following description, appended claims and accompanying drawings where:

FIG. 5 illustrates a right side view of the exemplary embodiment with the major assembly components separated vertically, structural support assembly, hydraulic assembly, electrical assembly and the buoyancy tank assembly in accordance with the principles of the present disclosure.

FIG. 15 illustrates a perspective bottom left front close up view of the rear buoyancy tank in accordance with the principles of the present disclosure.

FIG. 16 illustrates a perspective left front exploded view of the T pipe support bracket assembly in accordance with the principles of the present disclosure.

FIG. 26 illustrates a frontal view of the range of movements of the circular electrical track transfer assembly the rear electrical conduit and the forward electrical conduit in accordance with the principles of the present disclosure.

FIG. 60 illustrates a left view of the range of movements of the hydraulic pipe support assembly on the forward and rear buoyancy tanks in accordance with the principles of the present disclosure.

FIG. 69 illustrates a top view of the forward and rear buoyancy tanks in accordance with the principles of the present disclosure.

FIG. 70 illustrates a left side view of the forward and rear buoyancy tanks in accordance with the principles of the present disclosure.

FIG. 71 illustrates a left side view of the design showing the forward and rearward movements of the front buoyancy tank in relation to the rest of the exemplary embodiment in accordance with the principles of the present disclosure.

DETAILED DESCRIPTION

Figure 1:
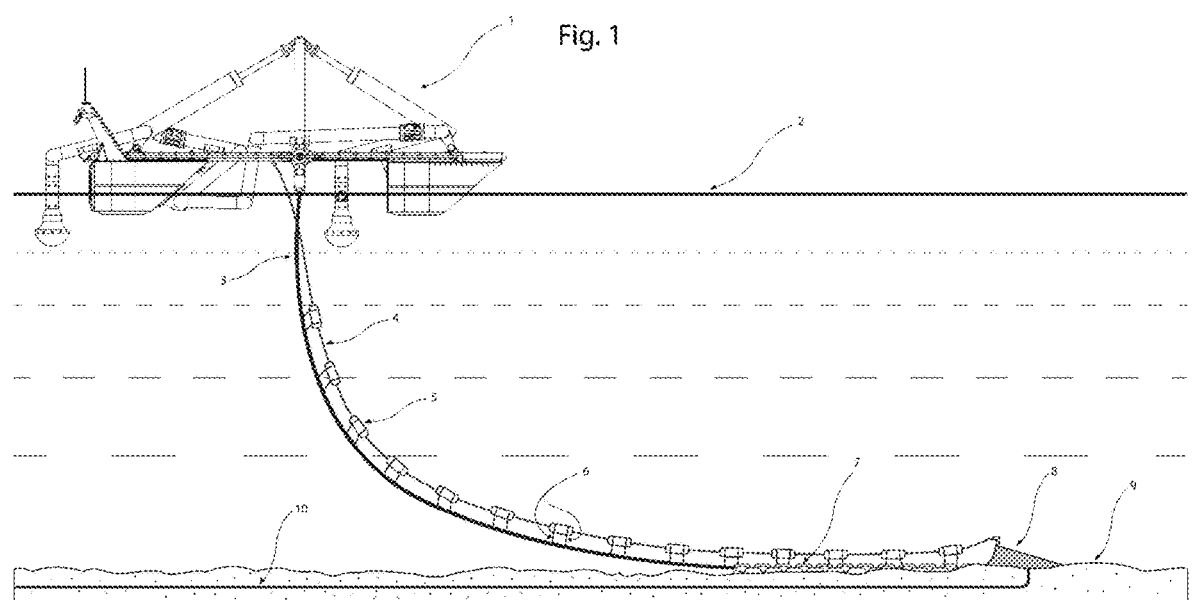
FIG. 1 illustrates a right side view of the exemplary embodiment floating on the water held in place by a rode to an anchor on the seabed with electrical cables floating above the rode in accordance with the principles of the present disclosure.

In the Summary above, the Description below, and in the accompanying drawings, reference is made to particular features of the present disclosure. It is to be understood that the disclosure includes possible combinations of such particular features. For example, where a particular feature is disclosed in the context of a particular aspect or exemplary embodiment, or a particular claim, that feature can also be used, to the extent possible, in combination with and/or in the context of other particular aspects and exemplary embodiments, and in the invention generally.

The term "comprises" and grammatical equivalents thereof are used herein to mean that other components, structures, steps, etc. are optionally present. For example, an article "comprising" (or "which comprises") components A, B, and C can consist of (i.e., contain only) components A, B, and C, or van contain not only components A, B, and C, but also one or more other components or structures.

The term "at least" followed by a number is used herein to denote the start of a range beginning with that number (which may be a range having an upper limit or no upper limit, depending on the variable being defined). For example, "at least 1" means 1 and/or more than 1.

The term "mechanical features" or "mechanical coupled" is used herein to mean features of a component, mechanical or geometric, which have a functional purpose of attaching or linking that component to one or more other components with compatible or corresponding mechanical features. An example of a mechanical feature is a slot in a component, where said slot is designed to accept a tab from another component and the union of the slot and tab from the two components effectively links, attaches, fixes, and/or locks the components together. The term "mechanical features" refers to, but is not limited to: clips, hooks, hook and loop fasteners, slot and tabs, all male and female fasteners, screws, bolts, nuts, holes that have been tapped, latches, pins, etc.

While the specification will conclude defining the features of exemplary embodiments of the disclosure that are regarded as novel, it is believed that the disclosure will be better understood from a consideration of the following description in conjunction with the figures, in which like reference numerals are carried forward.

FIG. 1 illustrates a right side view of a marine wave apparatus 1, floating on a body of water 2, fixed to the seabed 9, by way of rode 3, to a length of chain 7, to an anchor 8. An armored electrical cable 4, exits the marine wave apparatus 1 and connects to the rode 3, by way of separating straps 6, attached to a float 5, which surrounds the armored electrical cable 4. The float 5, maintains a separation between the armored cable 4, and the rode 3, so as not to allow friction or contact between the two. From the anchor 8 another armored electrical cable 10, exits and can lay below or above the seabed 9, on its way to shore or where ever its needed. In this configuration the marine wave apparatus will be free to swing as the conditions of the waves influence its movement. The version of this marine wave apparatus 1 is a large version. Smaller versions may not or will not require certain components such as ladders, access hatches, communications equipment or sensors.

Figure 2:
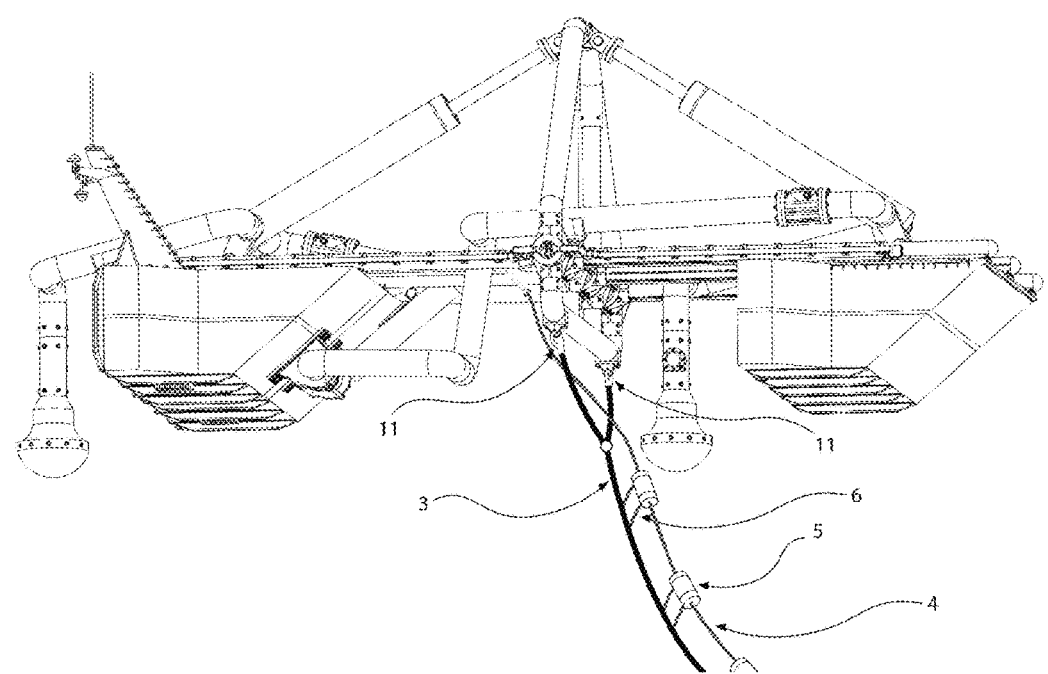
FIG. 2 illustrates a right lower perspective view of the exemplary embodiment in accordance with the principles of the present disclosure.

FIG. 2 illustrates a bottom perspective right side view of a marine wave apparatus 1, wherein the rode 3, is connected to the left and right underside of the central vertical portion of the marine apparatus by way of a shackle 11. This configuration allows the marine wave apparatus 1 to tack into the waves similar to how a triangular or diamond kite flies into the wind. Another important reason for this configuration is that when the waves lift and lower and push back on the marine wave apparatus 1, it will force the central vertical portion down past its horizontal plane, when the wave goes past the marine wave apparatus 1, the flotation capacity of the buoyancy tanks will lift forcefully the central vertical portion above its horizontal plane. This will cause a continuous up and down motion (see FIG. 61 and FIG. 63).

Figure 3:
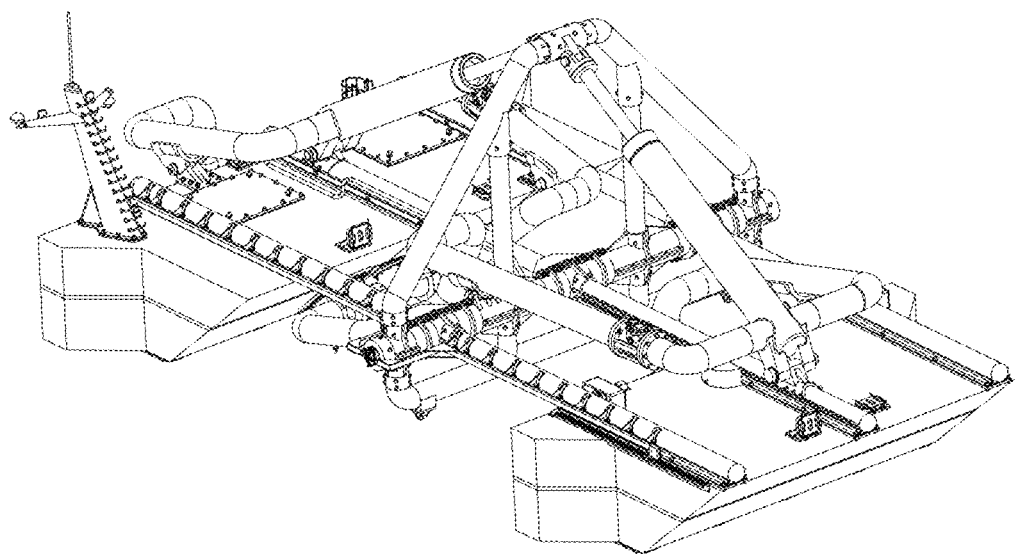
FIG. 3 presents a right frontal perspective view of the exemplary embodiment in accordance with the principles of the present disclosure.
Figure 4:
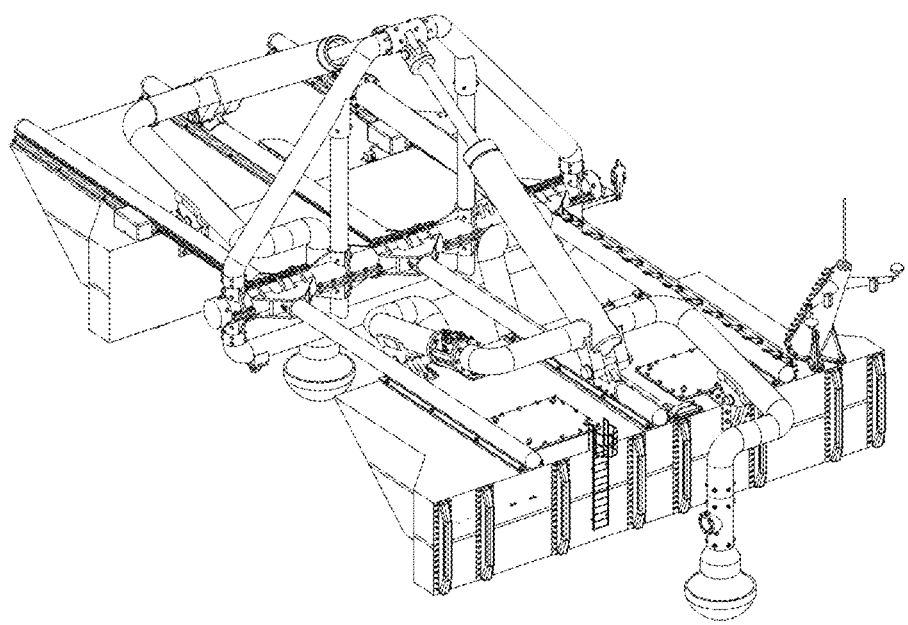
FIG. 4 shows a left rear perspective view of the exemplary embodiment in accordance with the principles of the present disclosure.
Figure 6:
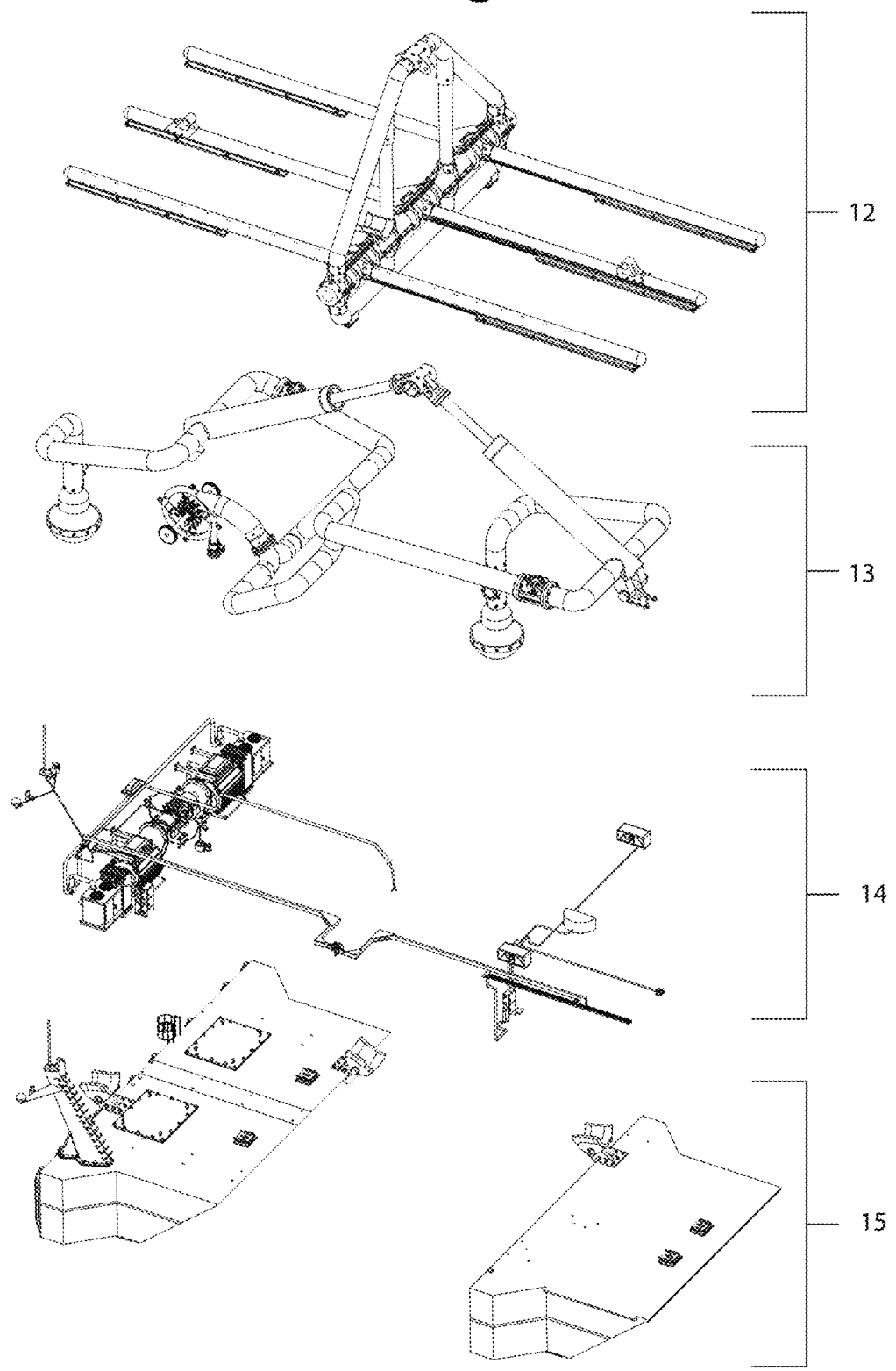
FIG. 6 illustrates a right front perspective view of exemplary embodiment with the major assembly components separated vertically structural support assembly, hydraulic assembly, electrical assembly and the buoyancy tank assembly in accordance with the principles of the present disclosure.
Figure 7:
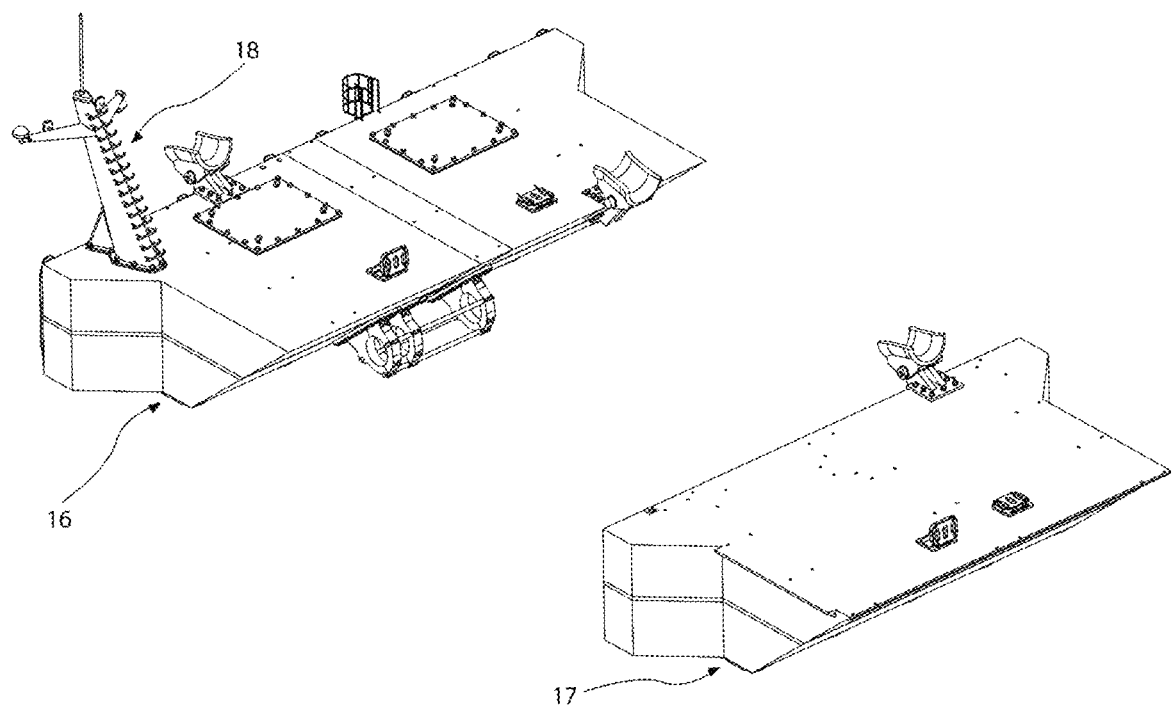
FIG. 7 illustrates a right front perspective view of the front and rear buoyancy tank assemblies in accordance with the principles of the present disclosure.
Figure 8:
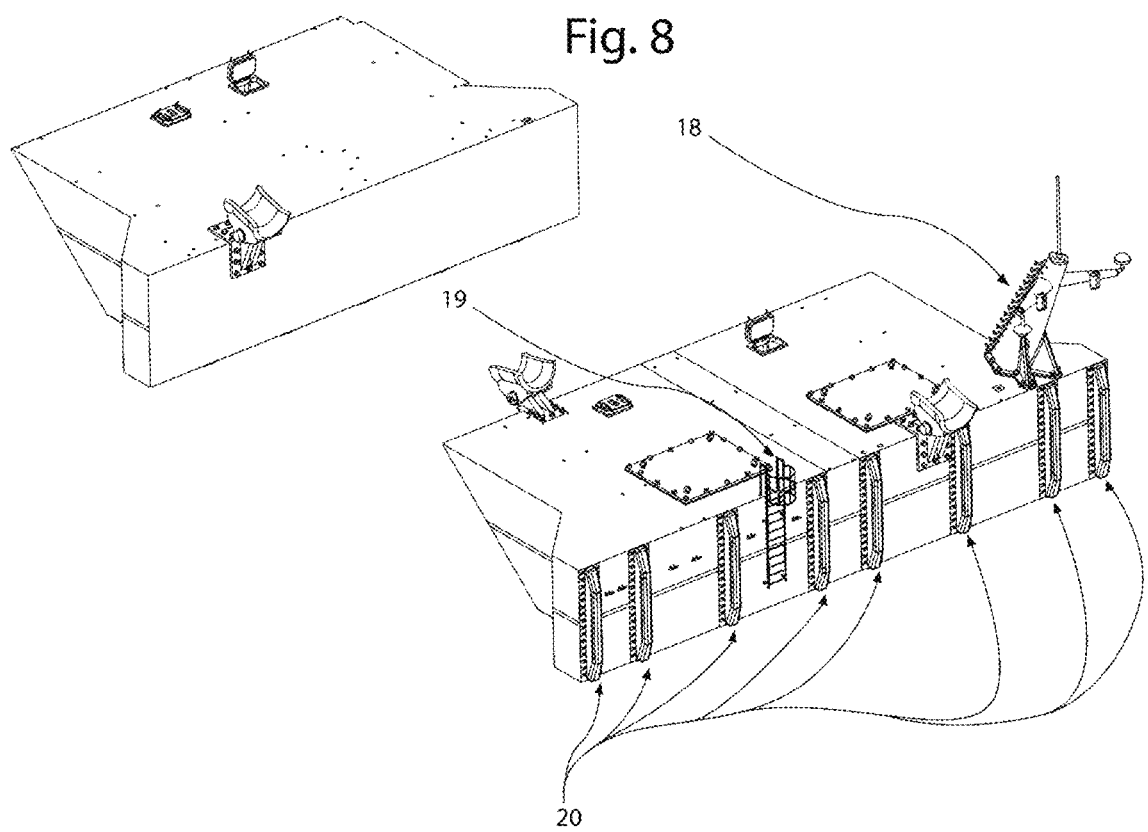
FIG. 8 illustrates a left rear perspective view of the front and rear buoyancy tank assemblies in accordance with the principles of the present disclosure.

FIG. 3 illustrates a top right front perspective view of a marine wave apparatus 1. FIG. 4 illustrates a top left rear perspective view of a marine wave apparatus 1. FIG. 5 illustrates a right side view of the structural support assembly 12, hydraulic assembly 13, electrical assembly 14 and the tank float assembly 15. FIG. 6 illustrates a top right front perspective view of the structural support assembly 12, hydraulic assembly 13, electrical assembly 14 and the tank float assemblies 15. FIG. 7 illustrates a top right front perspective view of the rear tank float assembly 16, the front tank float assembly 17 and the communications tower assembly 18. FIG. 8 illustrates a top left rear perspective view of the access ladder 19 and the vertical steel protective bumper 20 which also double as exterior structural supports.

Figure 9:
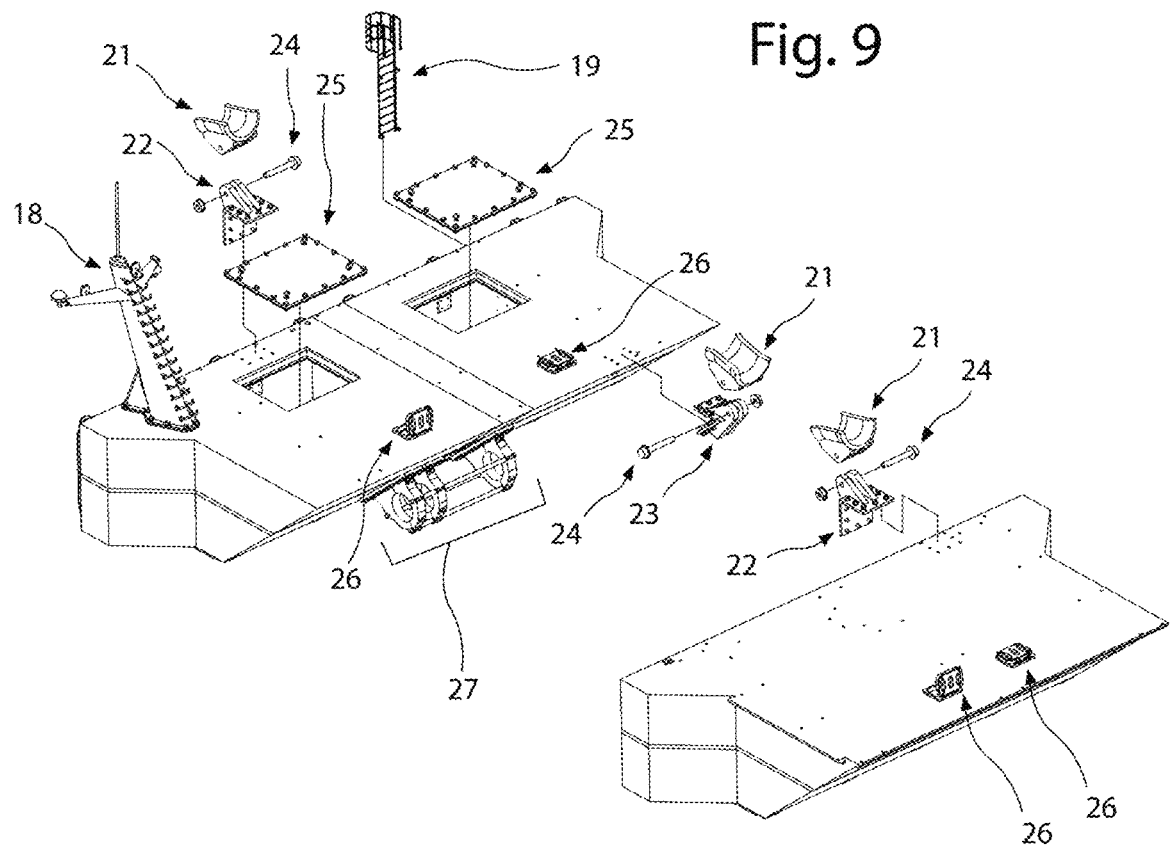
FIG. 9 illustrates a partially exploded right front perspective view of the front and rear buoyancy tanks assemblies in accordance with the principles of the present disclosure.

FIG. 9 illustrates a top right front perspective partially exploded view of the communications tower assembly 18, exterior access ladder 19 which allows access to the rear buoyancy tank from a support ship, hydraulic pipe support cradle 21, hydraulic pipe support base forward 22, hydraulic pipe support base rear 23, hinge pin 24, large access hatch 25 used for removal or replacement of large internal components, small access hatch 26 used for human access to internal buoyancy tanks, output pipe brace assembly 27.

Figure 10:
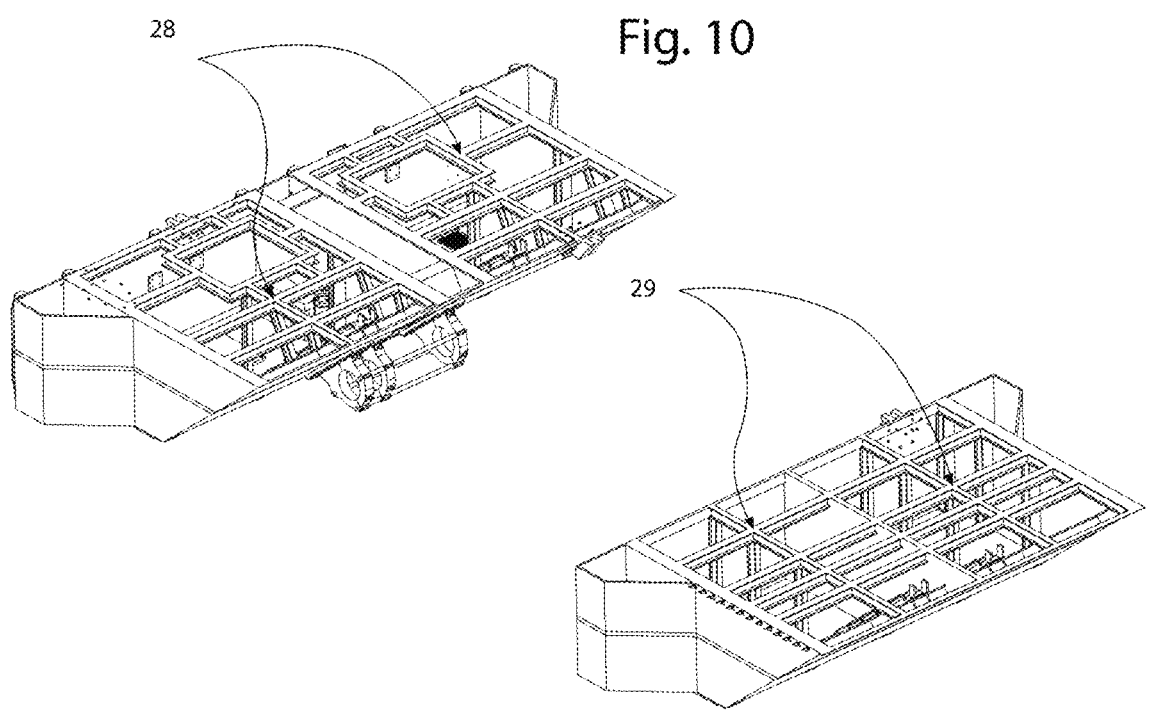
FIG. 10 illustrates a right front perspective view of the front and rear buoyancy tank exposing the deck support beams in accordance with the principles of the present disclosure.
Figure 11:
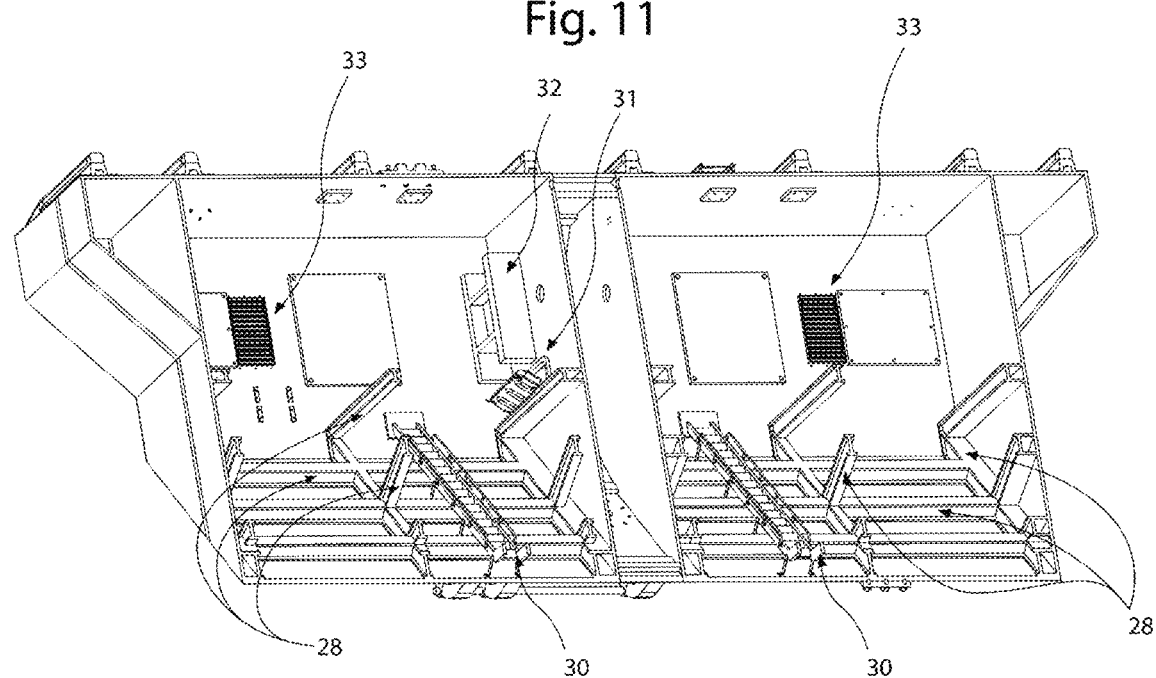
FIG. 11 illustrates a perspective top front view of the rear buoyancy tank exposing internal supports and components in accordance with the principles of the present disclosure.
Figure 12:
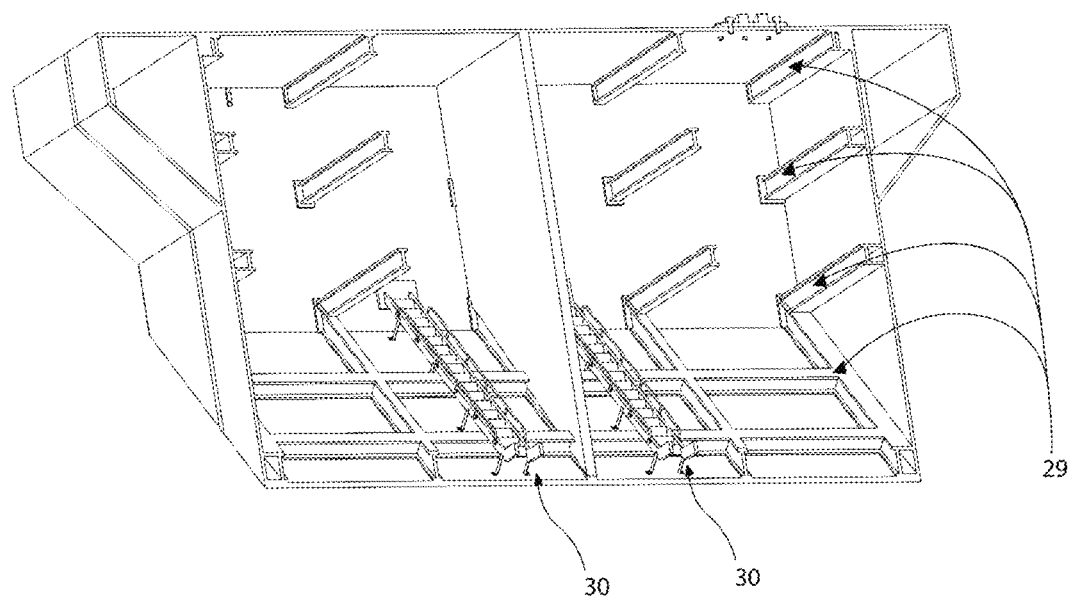
FIG. 12 illustrates a perspective top front view of the forward buoyancy tank exposing internal supports and ladders in accordance with the principles of the present disclosure.

FIG. 10 illustrates a top right front perspective view of the internal support structure rear buoyancy tank 28, internal support structure forward buoyancy tank 29. FIG. 11 illustrates a top right front perspective view of the rear buoyancy tank, internal access ladder 30, turbine access hatch 31, pillow bearing support structure 32, heat transfer socket 33 which is exposed to the water and allows for the cooling of the heat sink cooling fins 57 in FIG. 21 and FIG. 22 to expel heat produced by mechanical and electrical processes within the rear buoyancy tanks. FIG. 12 illustrates a top right front perspective view of the forward buoyancy tank, internal support structure forward buoyancy tank 29 internal access ladder 30.

Figure 13:
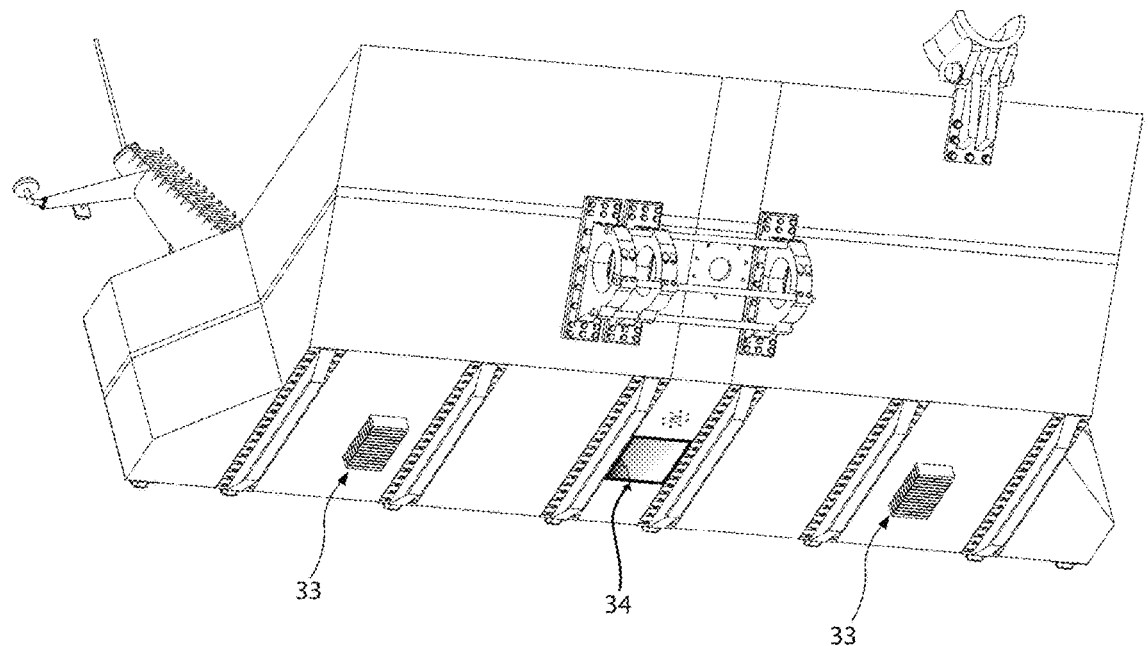
FIG. 13 illustrates a perspective bottom front view of the rear buoyancy tank in accordance with the principles of the present disclosure.
Figure 14:
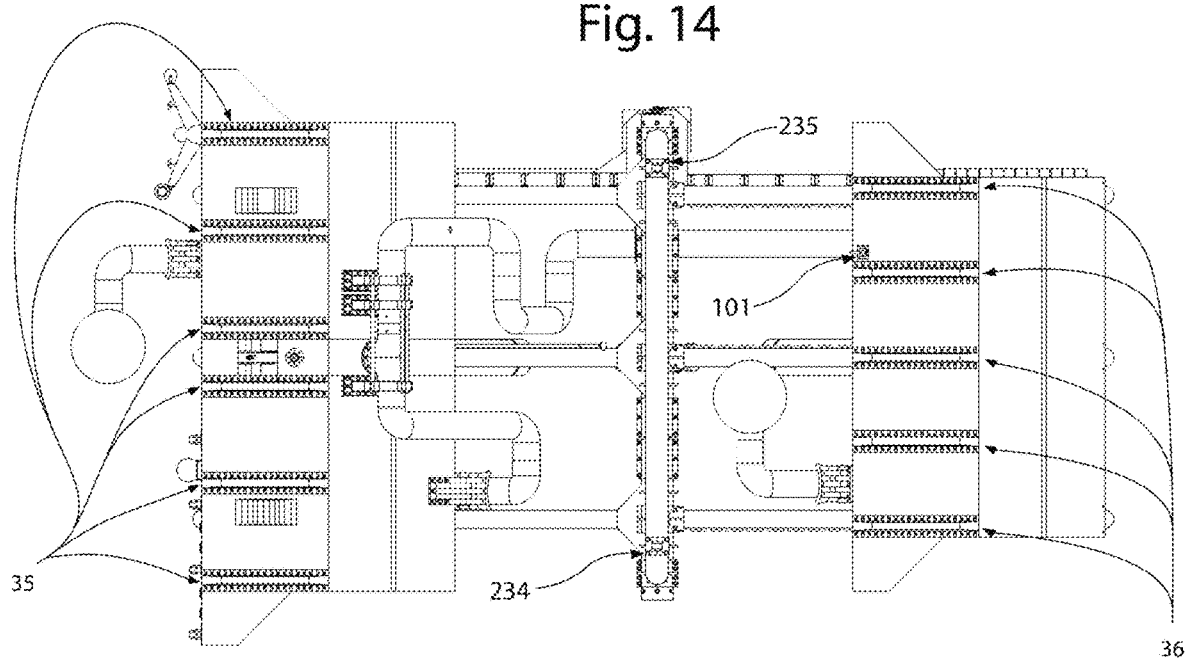
FIG. 14 illustrates a bottom view of the full system with the forward section to the right and the rear section to the left in accordance with the principles of the present disclosure.
Figure 45:
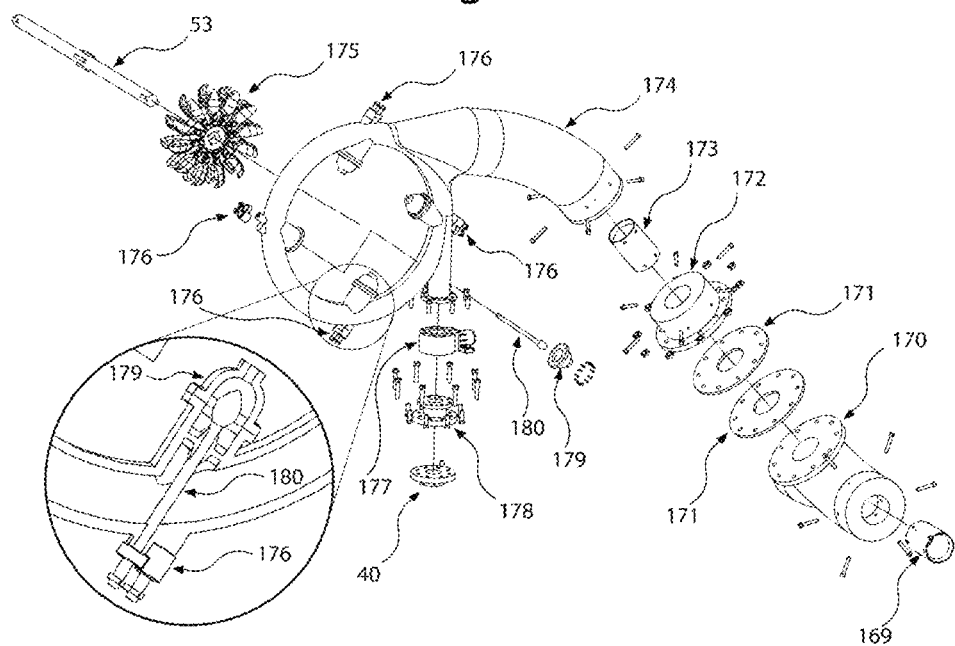
FIG. 45 illustrates an exploded rear right side perspective view of the hydraulic turbine/penstock assembly in accordance with the principles of the present disclosure.
Figure 68:
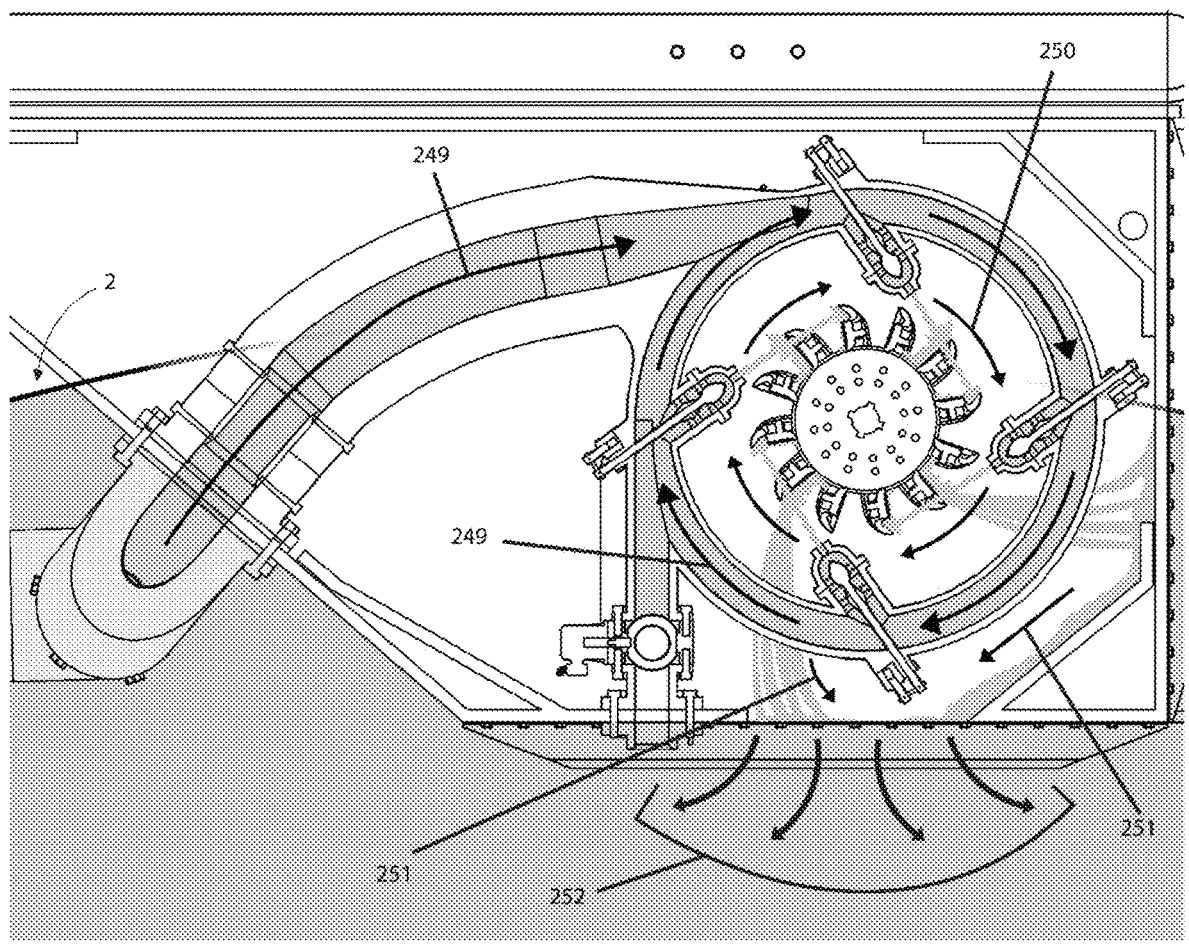
FIG. 68 illustrates a left cutaway view of the hydraulic turbine system within the rear tank float indicating the flow of compressed water through the penstock impacting and spinning the turbine whereby the water then returns to the ocean in accordance with the principles of the present disclosure.

FIG. 13 illustrates a bottom right front perspective view of the rear buoyancy tank, heat transfer socket 33 used for cooling, turbine water escape aperture 34 from which water is allowed to escape after being expelled from the penstock 174 FIG. 45 and impacting the pelton turbine 175 FIG. 45 as seen in 252 in FIG. 68. FIG. 14 illustrates bottom view of marine wave apparatus 1, bottom support structures rear buoyancy tank 35, bottom support structures forward buoyancy tank 36, anchor hard point 234, anchor hard point 235, ocean sensor array 101 would be used to measure different factors related to water data compilation but are not necessary for system operations. FIG. 15 illustrates a bottom left front perspective close up view of the rear buoyancy tank 16, output pipe brace assembly 27 FIG. 9, used to support the T pipe 170 in FIG. 45 and the turbine water escape aperture 34, lower output pipe support brace 37, upper output pipe support brace 38, horizontal support bar 39, external hydraulic connector flange 40 which is used to connect to external hydraulic accumulators.

Figure 17:
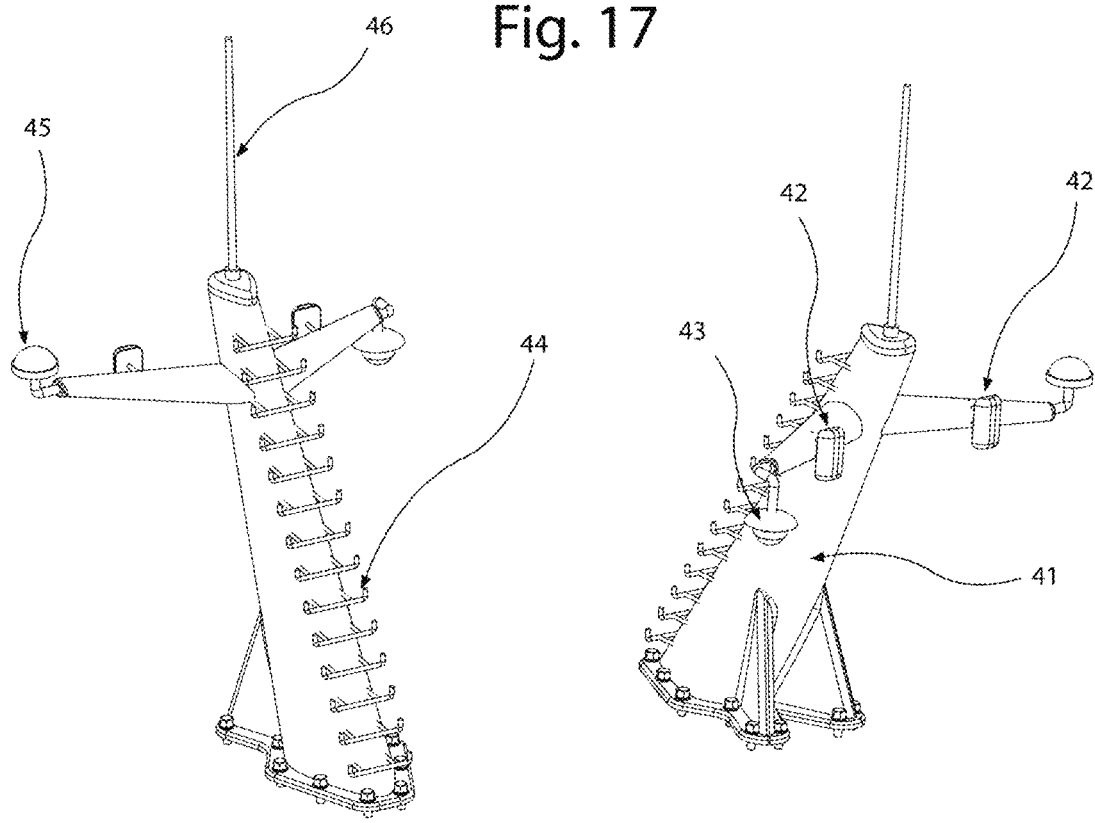
FIG. 17 illustrates front and rear perspective views of the communications assembly tower in accordance with the principles of the present disclosure.
Figure 18:
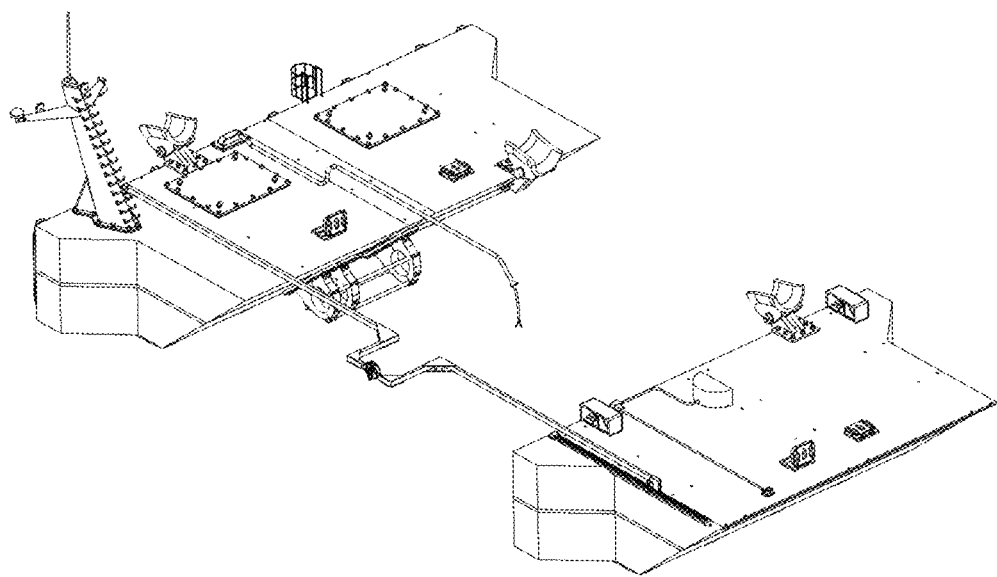
FIG. 18 illustrates a front perspective view of the rear and front buoyancy tank with exterior views of the electrical system and other components in accordance with the principles of the present disclosure.
Figure 19:
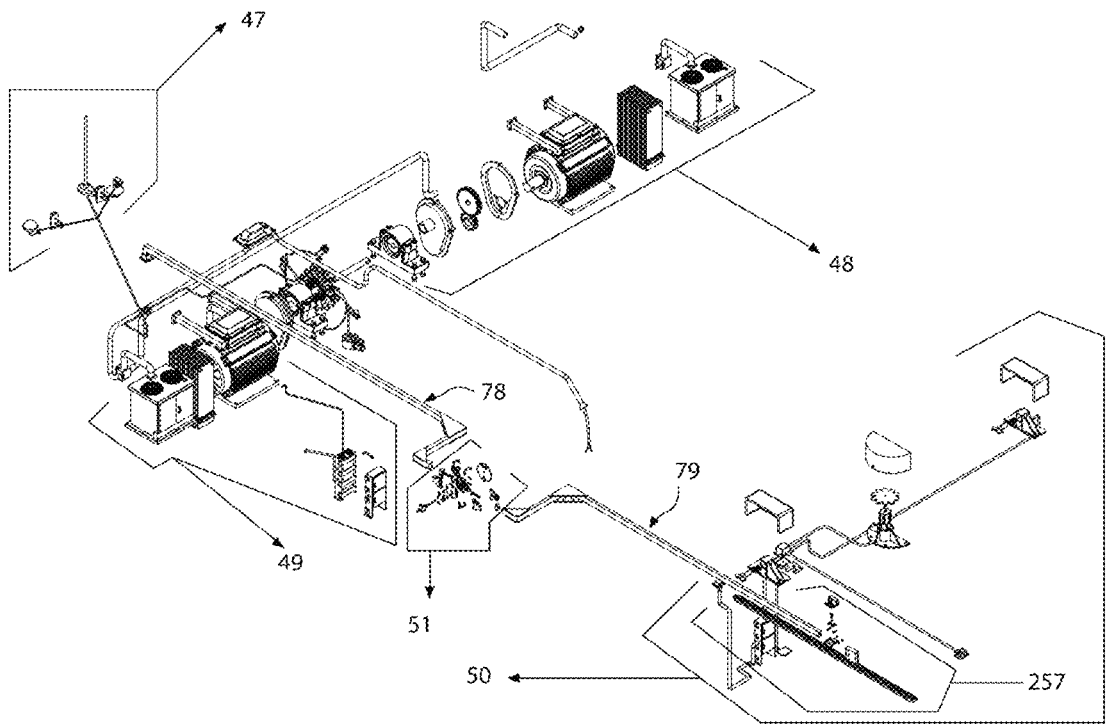
FIG. 19 illustrates a partially exploded front perspective view of the interior and exterior electrical system for the complete exemplary embodiment in accordance with the principles of the present disclosure.

FIG. 16 illustrates an exploded left side perspective view of the output pipe brace assembly 27, lower output pipe support brace 37, upper output pipe support brace 38, horizontal support bar 39. FIG. 17 illustrates a front and rear perspective view of the communications tower assembly 18, communications tower 41, data antenna 42, video camera 43, ladder 44, GPS antenna 45, communications antenna 46. The communications tower assembly 18, is not necessary for the marine wave apparatus 1 to work but if used, it will aide in monitoring and controlling certain aspects of the system from remote locations. FIG. 18 illustrates a top right front perspective forward view of the exterior electrical system mounted on the buoyancy tanks. FIG. 19 illustrates a top right front perspective partially exploded forward view of the electrical system 14. Communications tower electrical assembly 47, electrical assembly exploded rear buoyancy tank left side 48, electrical assembly rear buoyancy tank right side 49, exploded electrical assembly forward buoyancy tank 50, circular electrical transfer assembly 51, rear electrical conduit 78, exploded circular forward electrical conduit 79, exploded linear electrical transfer assembly 257.

Figure 20:
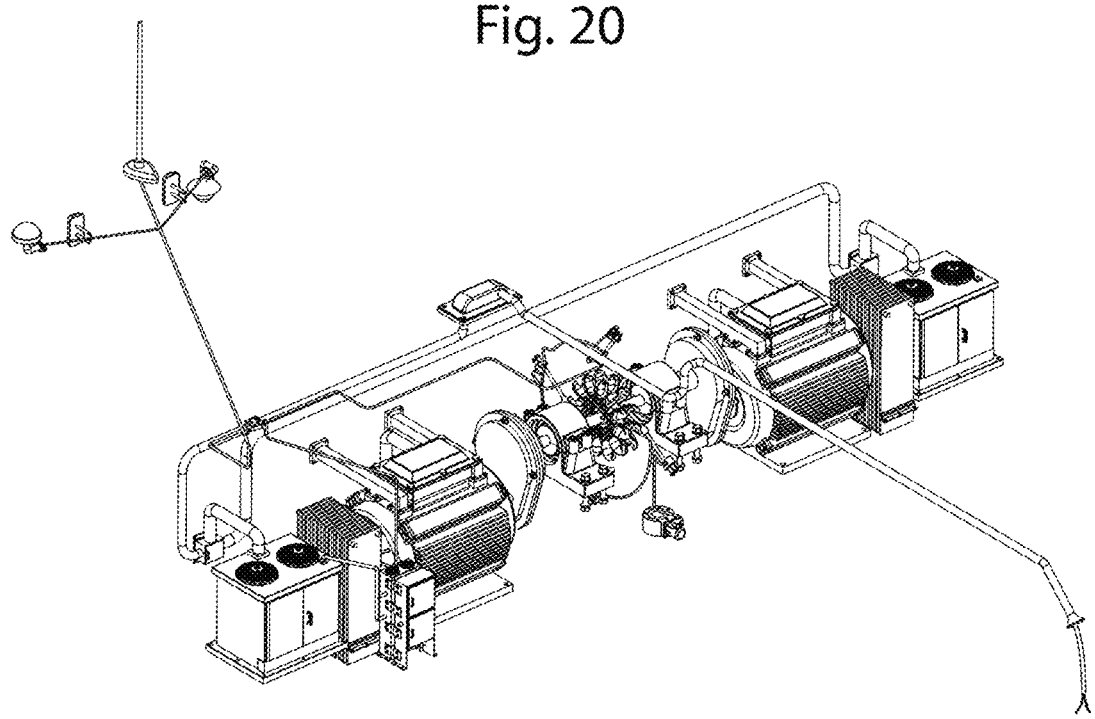
FIG. 20 illustrates a front perspective view of the rear buoyancy tank electrical system in accordance with the principles of the present disclosure.
Figure 21:
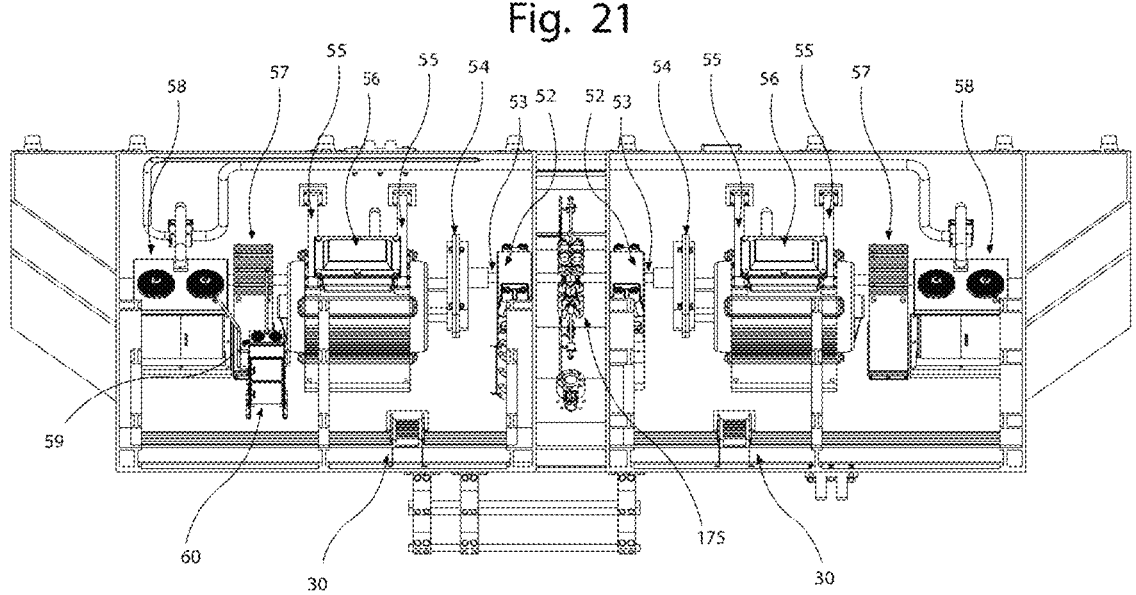
FIG. 21 illustrates a top front view of the rear buoyancy tank without its deck and supports, indicating internal electrical production components in accordance with the principles of the present disclosure.

FIG. 20 illustrates a top right front perspective view of the rear buoyancy tank electrical assembly. FIG. 21 illustrates a perspective top down internal view of the rear buoyancy tank 16, with pillow bearings 52, turbine shaft 53, transmission assembly 54, generator support arms 55, electrical generator 56, heat sink cooling fins 57, high voltage transformer 58, low voltage transformer 59, programmable logic controller (PLC), communications control, camera control and GPS control cabinet 60, internal access ladder 30, hydraulic Pelton turbine 175. The PLC will monitor generator speed and temperature and will expand and contract the spear control actuator 176 see FIGS. 45 and 46 which will open and close the spear 180 see FIGS. 45 and 47 thereby controlling the flow of water see FIG. 68 to the turbine 175 see FIGS. 21, 22, 45 and 46 which will lower or raise the generator rpms see FIGS. 21 and 22 as required. This process of controlling the flow of water by way of the actuators and spears will also be used to control the amount of flexibility of the marine wave apparatus 1 when very large wave events occur by closing off partially or entirely the water flow, this will cause the hydraulic assembly 12 see FIGS. 5 and 6 to stiffen because water cannot escape nor can it be compressed within the hydraulic assembly 12 which will limit the total movements, protecting it from damage by over extension of its moving parts.

Figure 22:
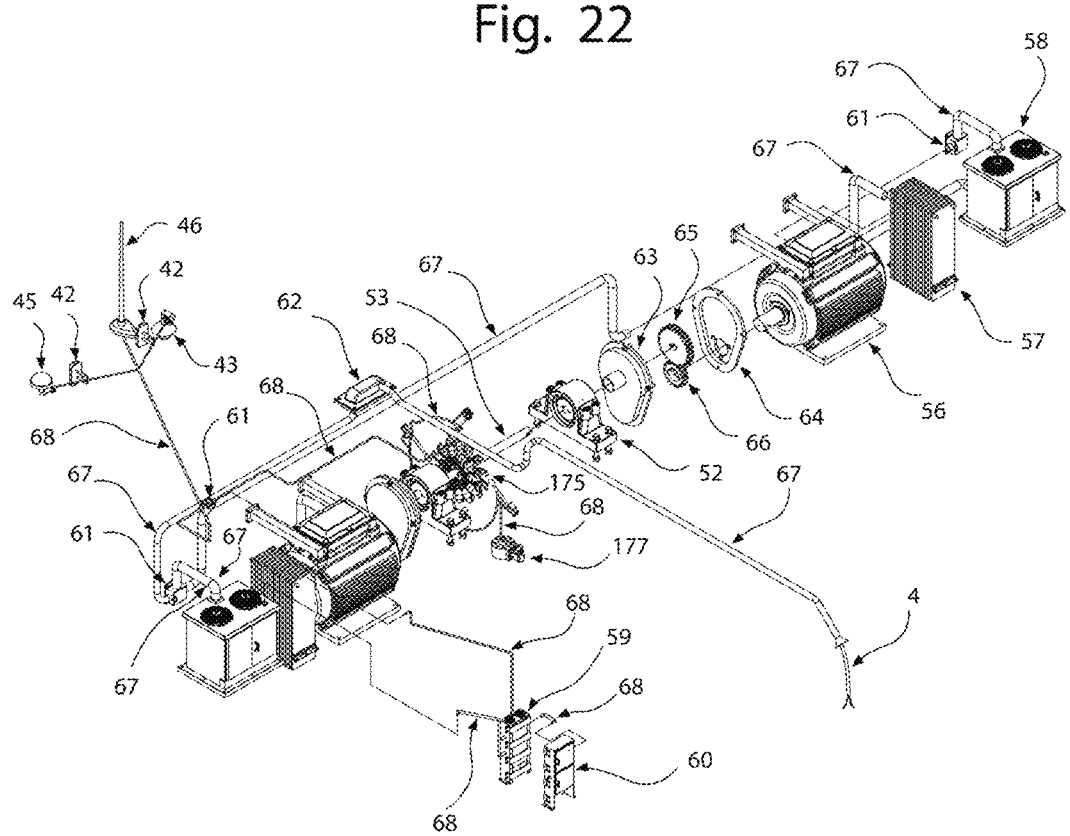
FIG. 22 illustrates a partially exploded left front perspective view of the electrical system in the rear buoyancy tank in accordance with the principles of the present disclosure.
Figure 23:
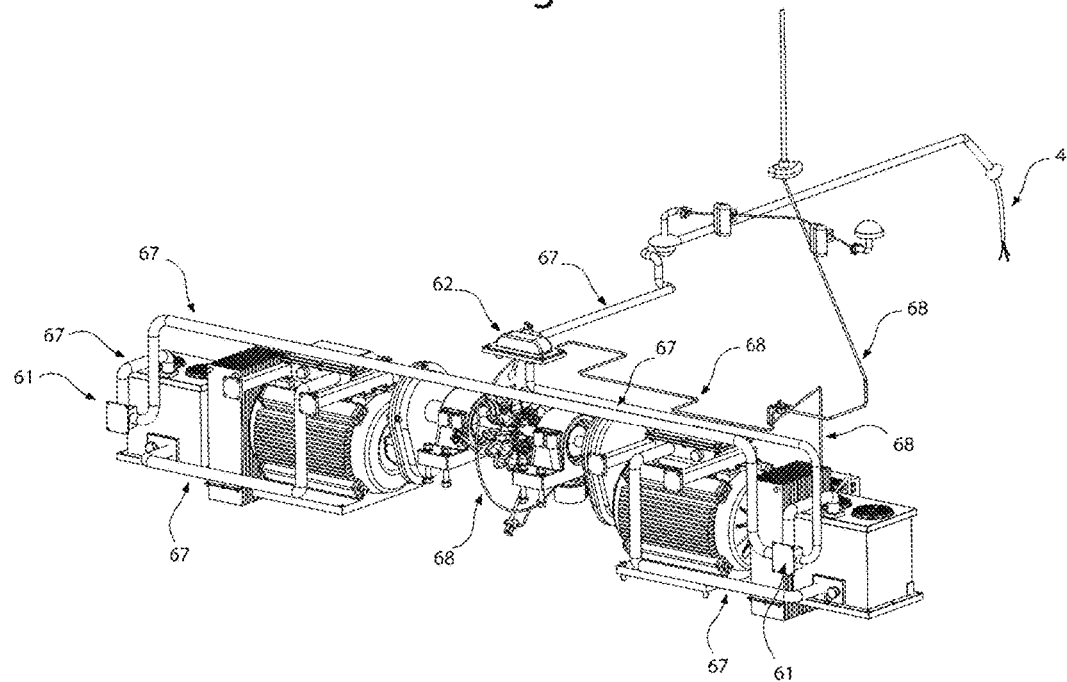
FIG. 23 illustrates a rear perspective view of the rear buoyancy tank electrical system in accordance with the principles of the present disclosure.
Figure 24:
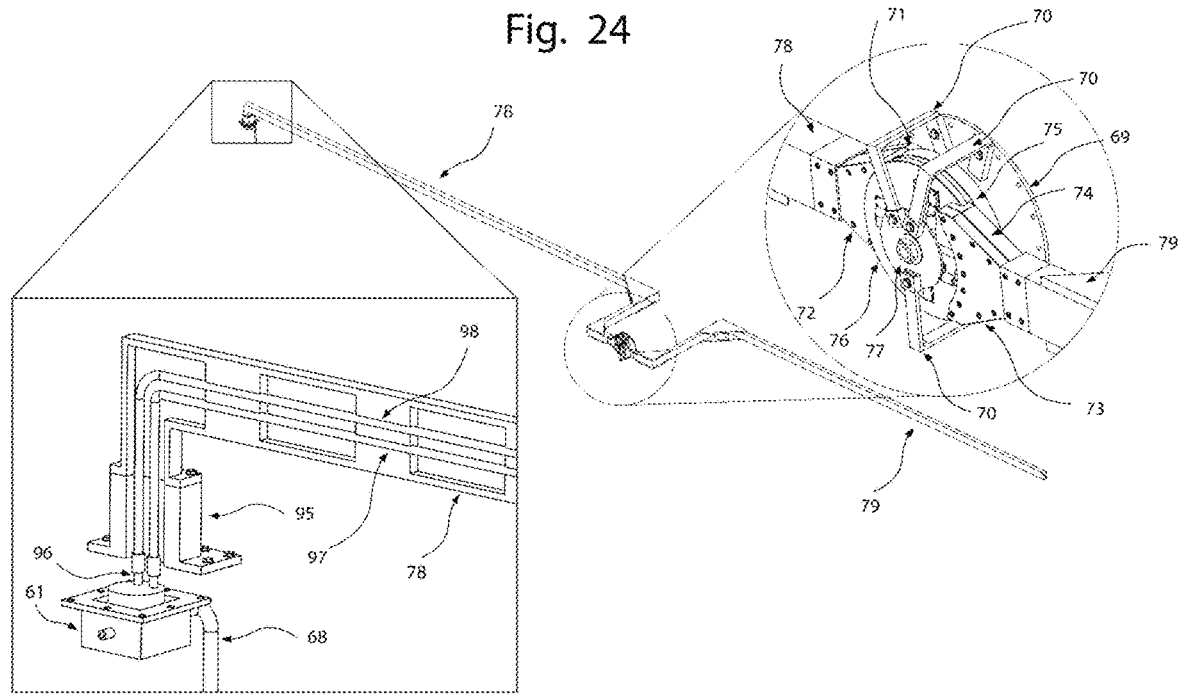
FIG. 24 illustrates a right perspective view of the electrical transmission system between the rear and forward buoyancy tanks with emphasis on the circular electrical track transfer system in accordance with the principles of the present disclosure.

FIG. 22 illustrates a partially exploded perspective top right view of the rear electrical assembly 47, 48 and 49, armored electrical cable 4, data antenna 42, video camera 43, GPS antenna 45, communications antenna 46, pillow bearing 52, turbine shaft 53, electrical generator 56, heat sink cooling fins 57, high voltage transformer 58, low voltage transformer 59, PLC, communications control, camera control, gyroscope and GPS control cabinet 60, internal electrical junction box 61, external electrical junction box 62, transmission cover right 63, transmission cover left 64, large gear 65, small gear 66, high voltage conduit 67, low voltage conduit 68, hydraulic Pelton turbine 175. FIG. 23 illustrates a right rear perspective view of the rear buoyancy tank electrical assembly, armored electrical cable 4, internal electrical junction box 61, external electrical junction box 62, high voltage electrical conduit 67, low voltage electrical conduit 68. FIG. 24 illustrates a right perspective view of the circular electrical transfer assembly 51, rear electrical conduit 78, forward electrical conduit 79, internal electrical junction box 61, low voltage electrical conduit 68, circular track base plate rear 69, support brace 70, rear track plate support 71, front track plate support 72, front bearing plate support 73, rear bearing plate support 74, circular electrical transfer track plate 75, circular electrical transfer bearing plate 76, circular track base plate front 77, electrical conduit base connector 95, electrical conduit socket connectors short 96, electrical conduit rod lower 97, electrical conduit rod upper 98.

Figure 25:
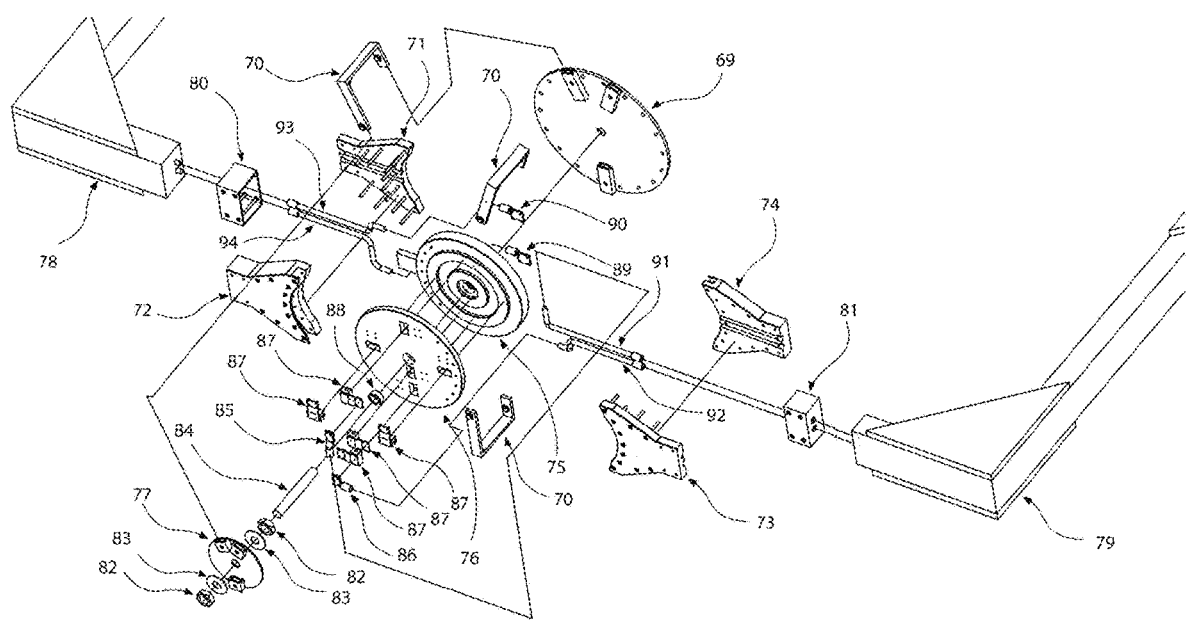
FIG. 25 illustrates a right front exploded perspective view of the circular electrical track transfer assembly in accordance with the principles of the present disclosure.

FIG. 25 illustrates an exploded perspective view of the circular electrical transfer assembly 51 which allows electricity to flow between parts which are moving vertically without the electrical connections being continuous, welded, tied together or bolted together at the point where the moving parts come together. Circular track base plate rear 69, support brace 70, rear track plate support 71, front track plate support 72, front bearing plate support 73, rear bearing plate support 74, circular electrical transfer track plate 75, circular electrical transfer bearing plate 76, circular track base plate front 77, rear electrical conduit 78, forward electrical conduit 79, electrical conduit adapter rear 80, electrical conduit adapter front 81, lock nut 82, flat washer 83, center post 84, bearing plate vertical electrical connector 85, bearing plate horizontal electrical connector 86, cylindrical roller bearing and case 87, bushing 88, track plate upper electrical connector 89, track plate lower electrical connector 90, upper front electrical conduit connector 91, lower front electrical conduit connector 92, upper rear electrical conduit connector 93, lower rear electrical conduit connector 94.

Figure 27:
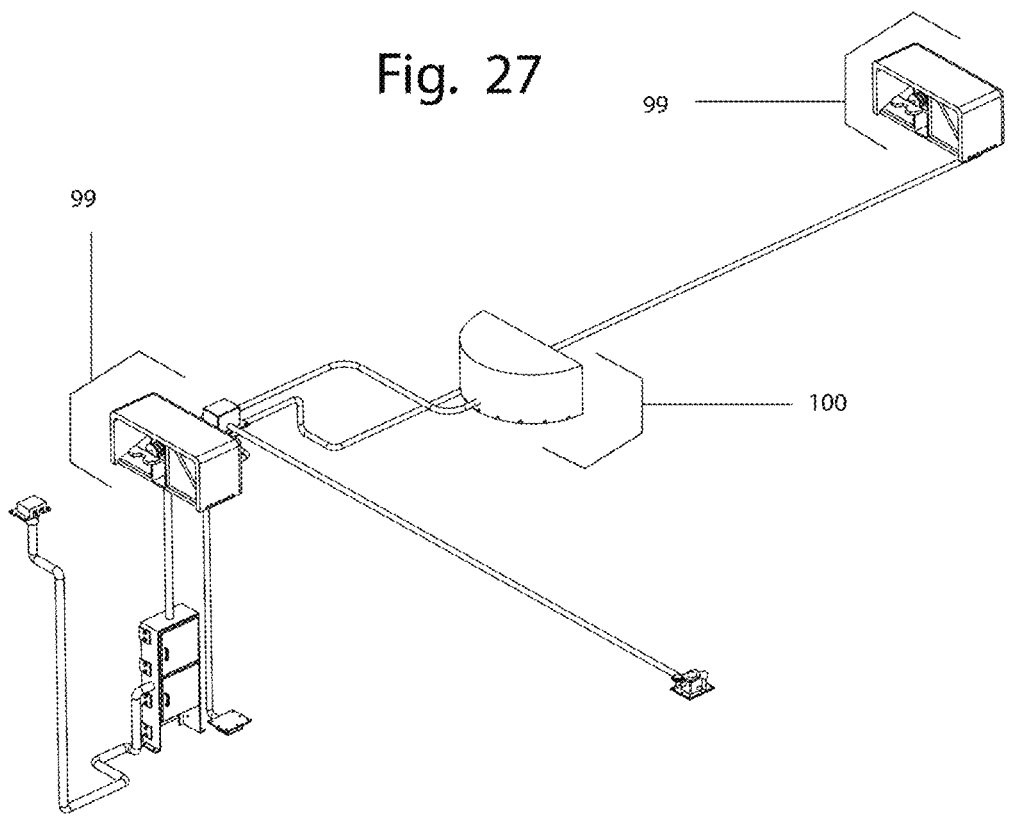
FIG. 27 illustrates a front right perspective view of the front float electrical system and components in accordance with the principles of the present disclosure.

FIG. 26 illustrates a right side view of the range of movements of the circular electrical transfer assembly 51, This allows for electricity to flow from the rear electrical conduit 78 to the circular electrical transfer assembly 51 and onwards to the electrical conduit 79 without interruption. FIG. 27 illustrates a right front perspective view of the forward buoyancy tank electrical assembly 50, electrical brake assembly 99, electrical motor assembly 100. The brake assembly 99 couples or decouples from the rack 210 on the outriggers 195 and 197 in FIG. 55. When coupled the outriggers remain stationary, when decoupled, the electrical motor assembly 100 will move the forward buoyancy tank 17 forward or rearward depending on the wave height and frequency.

Figure 28:
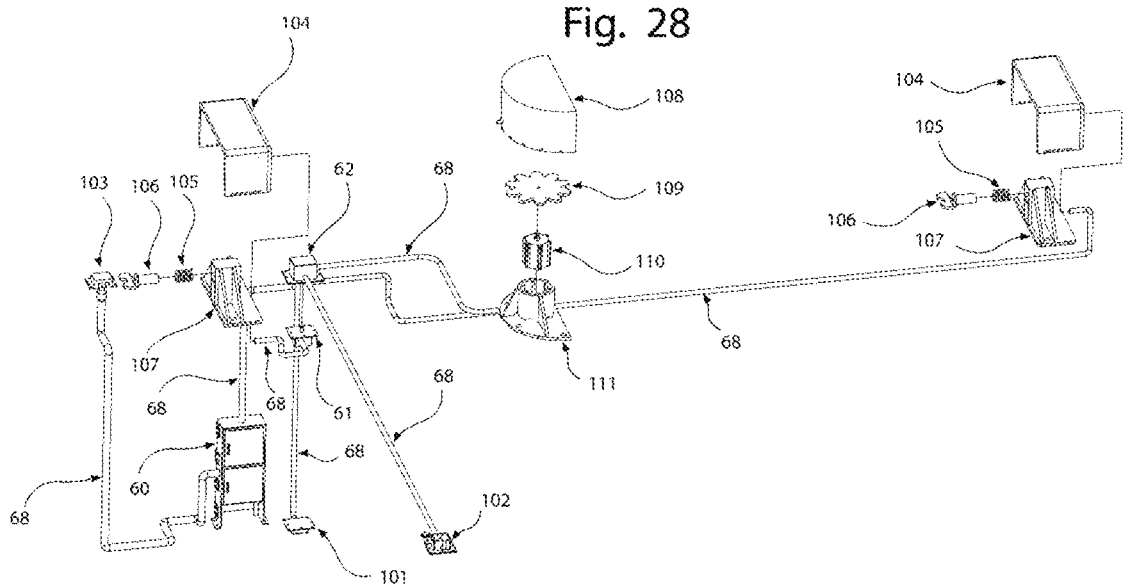
FIG. 28 illustrates an exploded right front perspective view of the front tank float electrical system and components in accordance with the principles of the present disclosure.

Wave height and frequency are measured by the gyroscope and calculated by the PLC, both located in the PLC and gyroscope control cabinet 60. The PLC based on the information provided by the gyroscope will send signals to the electrical brake assembly 99 to either couple or decouple from the rack 210 on the outriggers 195 and 197 see FIG. 55 and for the electrical motor assembly to move forward or rearward the forward buoyancy tank 17 see FIG. 71. FIG. 28 illustrates a right front exploded perspective view of the forward buoyancy tank electrical assembly 50, PLC and gyroscope control cabinet 60, internal junction box 61, external junction box 62, low voltage conduit 68, marine sensor module 101, the atmospheric sensor module 102, water proof electrical cover 103, brake box cover 104, brake spring 105, brake 106, brake base 107, motor cover 108, pinion 109, motor 110, motor base 111. The marine sensor module 101 will measure various parameters related to ocean water as well as the atmospheric sensor module 102 will do for the air, neither sensor systems are required for the marine apparatus 1 to function. The brake 106 will be pulled in by an electromagnet located in the brake base 107 and the motor 110 will move a pinion 109 which will move the forward buoyancy tank 17 either forward or backwards see FIG. 71. When electricity is cut to the electromagnet in the brake base 107 the brake spring 105 will force the brake to extend from the brake base 107 and engage the rack 210 which will impede the movement of the forward buoyancy tank.

Figure 29:
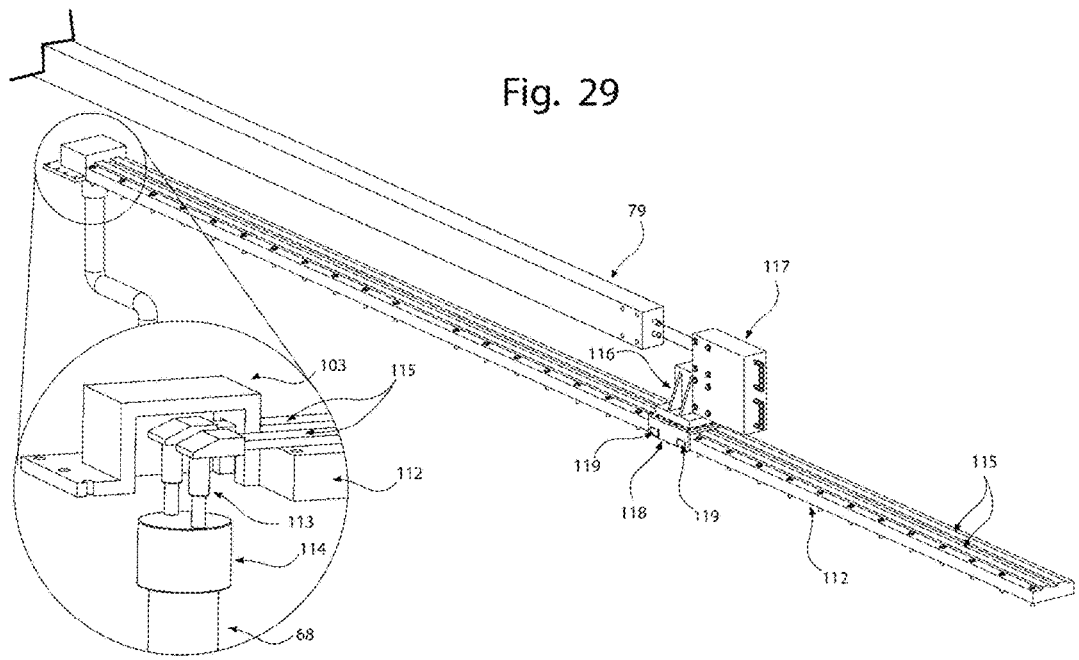
FIG. 29 illustrates a right front perspective view of the linear electrical track system on the front tank float in accordance with the principles of the present disclosure.
Figure 30:
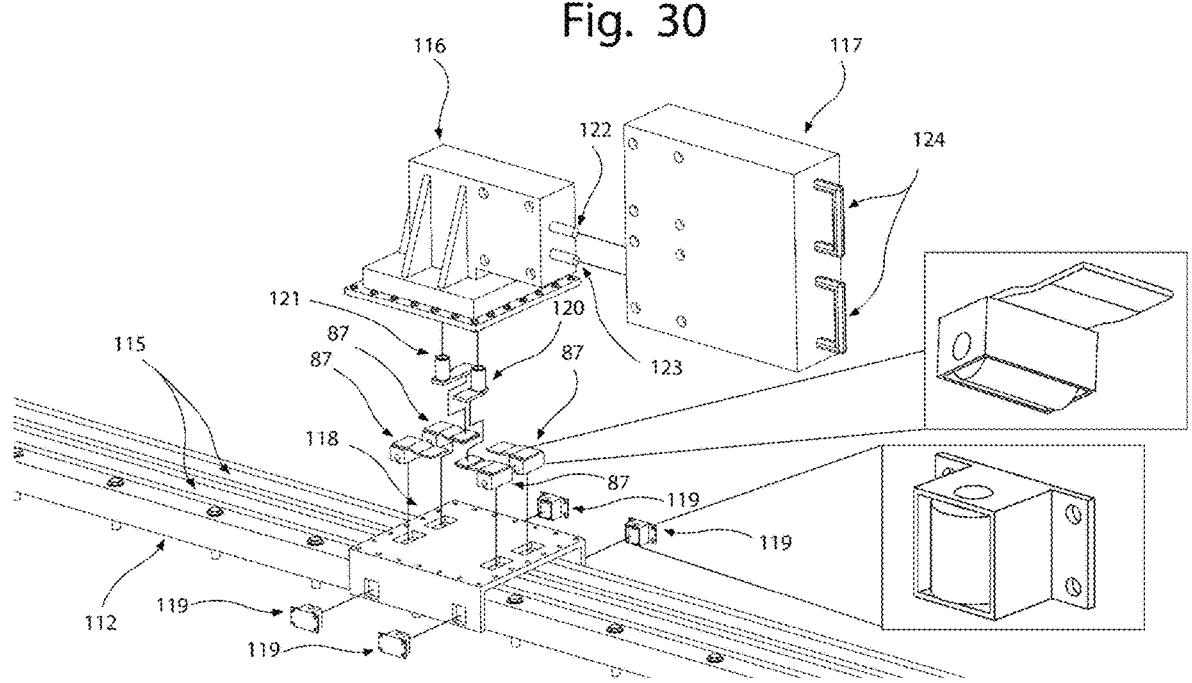
FIG. 30 illustrates an exploded front right perspective close up view of the front linear electrical track system in accordance with the principles of the present disclosure.

FIG. 29 illustrates a right front perspective view of the linear electrical transfer assembly 257, low voltage conduit 68, forward electrical conduit 79, water proof electrical cover 103, linear track 112, conduit female socket adapter 113, conduit male socket adapter 114, electrical tracks 115, upper electrical track slide 116, electrical conduit and electrical track slide connector 117, lower electrical track slide 118, lateral guidance roller bearing and case 119. FIG. 30 illustrates a right front exploded perspective view of the linear electrical transfer assembly 257, cylindrical roller bearing and case 87, linear electrical track 112, electrical tracks 115, upper electrical track slide 116, electrical conduit and electrical track slide connector 117, lower electrical track slide 118, lateral guidance roller bearing and case 119, bearing electrical conduit socket adapter front 120, bearing electrical conduit socket adapter rear 121, electrical male conduit extension upper 122, electrical male conduit extension lower 123, removal grips 124.

Figure 31:
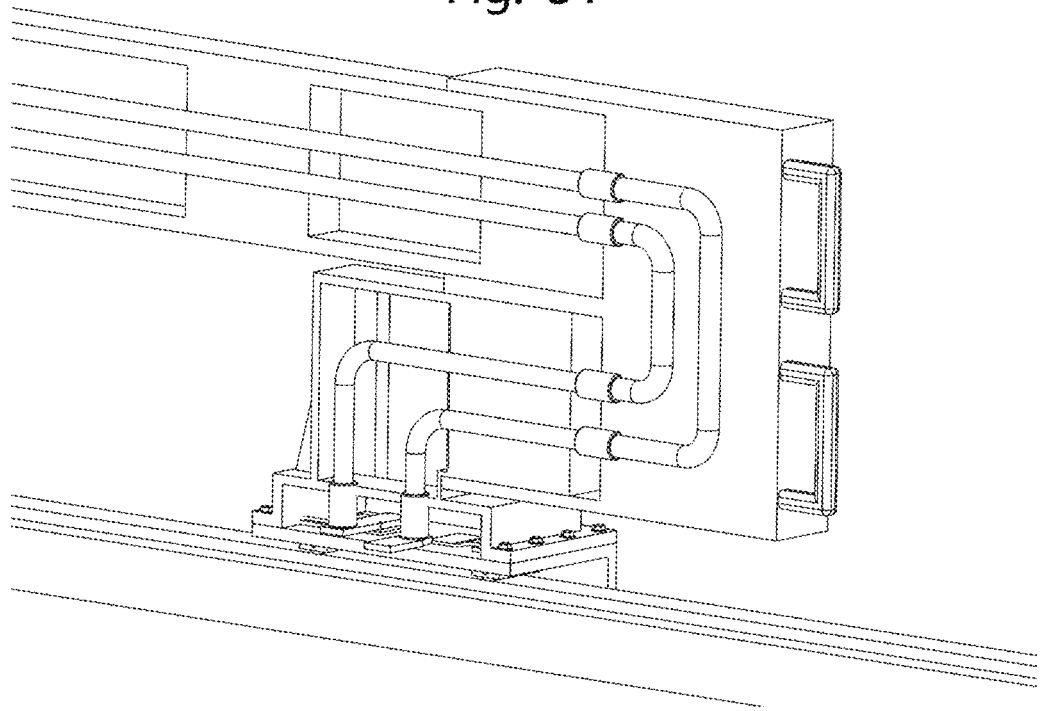
FIG. 31 illustrates a front right perspective lateral cutaway view of the front linear electrical track system in accordance with the principles of the present disclosure.
Figure 32:
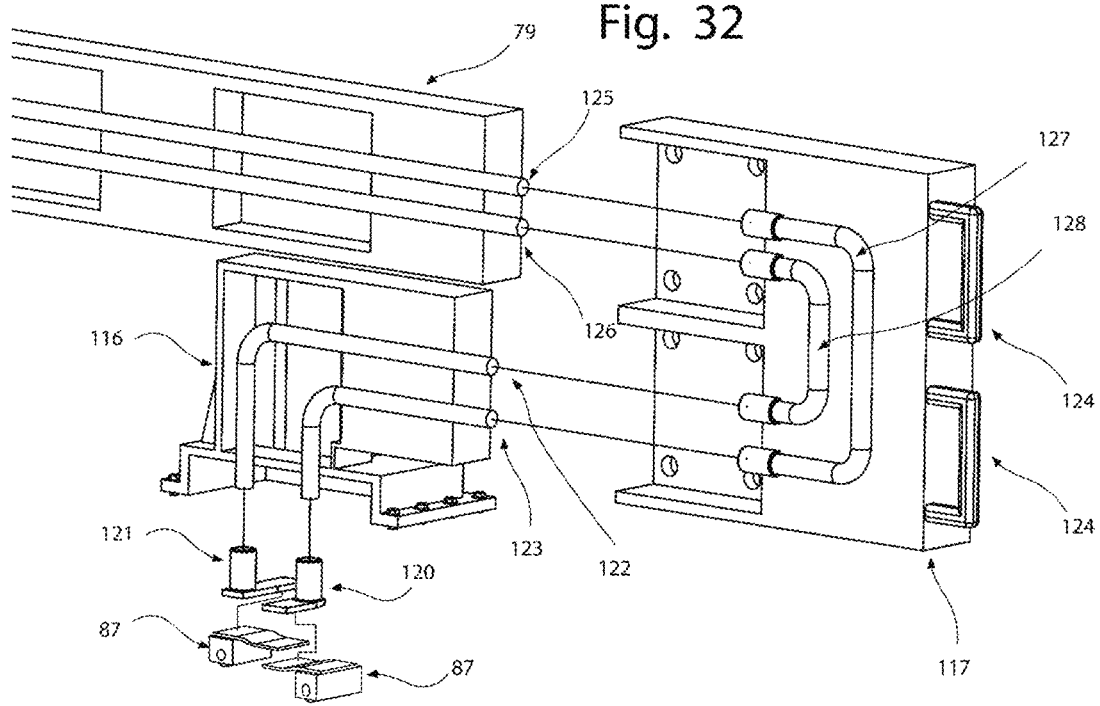
FIG. 32 illustrates a front right perspective lateral exploded cutaway view of the upper part of the front linear electrical track system in accordance with the principles of the present disclosure.

FIG. 31 illustrates a right front cutaway perspective view of the linear electrical transfer assembly 257, and forward electrical conduit. FIG. 32 illustrates a right front cutaway exploded perspective view of the linear electrical transfer assembly 257, forward electrical conduit 79, cylindrical roller bearing and case 87, upper electrical track slide 116, electrical conduit and electrical track slide connector 117, bearing electrical conduit socket adapter front 120, bearing electrical conduit socket adapter rear 121, electrical male conduit extension upper 122, electrical male conduit extension lower 123, removal grips 124, electrical conduit upper 125, electrical conduit lower 126, electrical conduit socket outer 127, electrical conduit inner 128.

Figure 33:
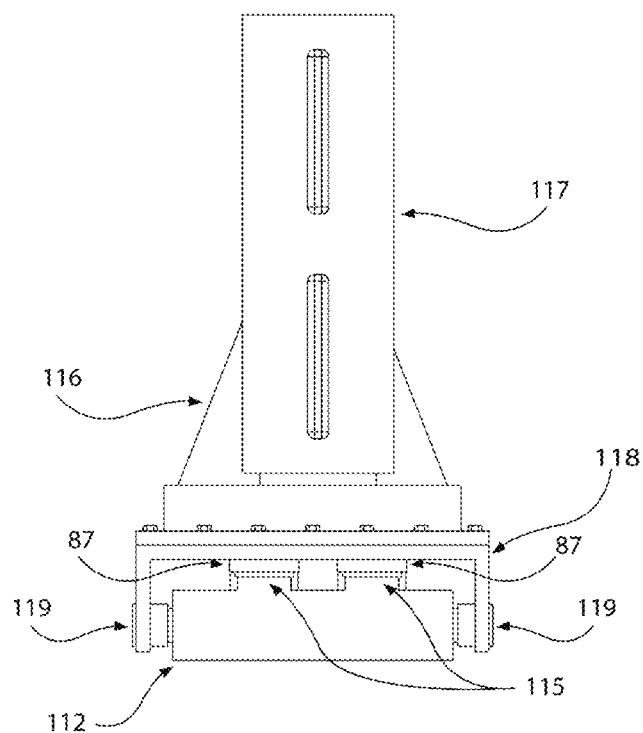
FIG. 33 illustrates a front view of the front linear electrical track system in accordance with the principles of the present disclosure.
Figure 34:
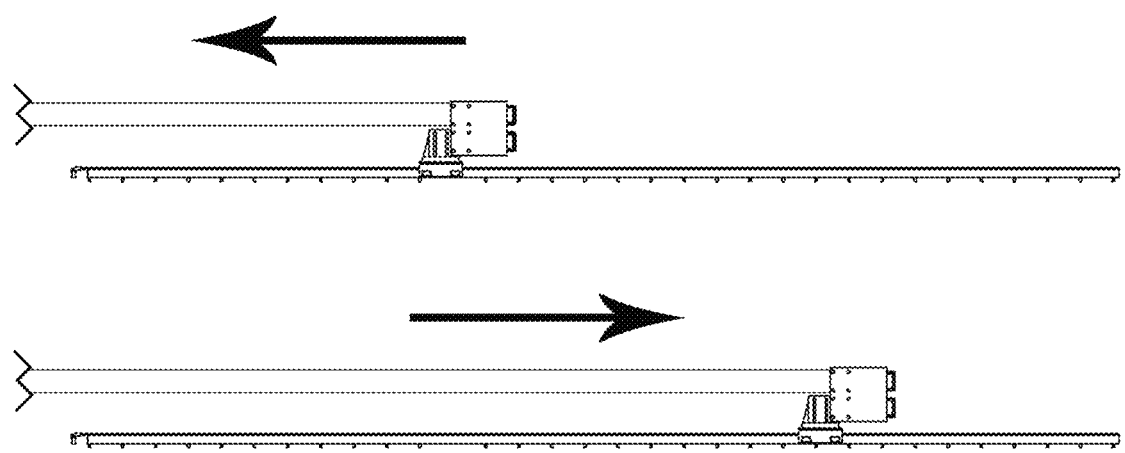
FIG. 34 illustrates a right side view of the front linear electrical track system indicating rearward and forward movement in accordance with the principles of the present disclosure.
Figure 35:
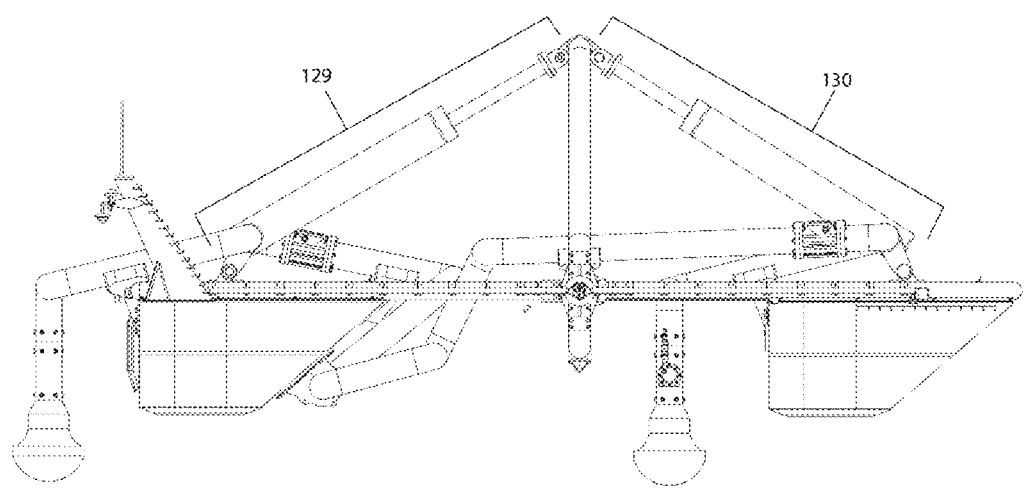
FIG. 35 illustrates a right side view of the complete apparatus in accordance with the principles of the present disclosure.

FIG. 33 illustrates a front view of the linear electrical transfer assembly 257, cylindrical roller bearing and case 87, linear track 112, electrical tracks 115, upper electrical track slide 116, electrical conduit and electrical track slide connector 117, lower electrical track slide 118, lateral guidance roller bearing and case 119. FIG. 34 illustrates a side view of the rearward and forward movement of the linear electrical transfer assembly 257. Based on FIGS. 29, 30, 31, 32, 33 and 34 the following indicates the electrical flow through the linear electrical transfer assembly 257 between two parts that are moving horizontally in a linear fashion with respect to one another. In this case since the forward buoyancy tank 17 moves forward and backwards in relation to the rest of marine wave apparatus 1 sees FIG. 71, the electricity needed to supply the electrical assembly of the forward buoyancy tank 50 needs to come from the electrical assembly rear right buoyancy tank 49 but since these parts expand and contract in relation to each other, the linear electrical transfer assembly 257 allows for electrical flow from the forward electrical conduit 79 to the electrical conduit and electrical track slide connector 117, through the upper electrical track slide 116 to the bearing electrical conduit socket adapters front 120 and rear 121 to the cylindrical roller bearing and case 87 which transfers the electricity from the metal bearings to the electrical tracks 115 which connect to the conduit female socket adapter 113 to the conduit male socket adapter 114 and from there on to the low voltage electrical conduit which supplies low voltage electricity to the electrical assembly of the forward buoyancy tank 50. FIG. 35 illustrates a right side view of the marine wave apparatus 1, rear hydraulic piston assembly 129, front hydraulic piston assembly 130.

Figure 36:
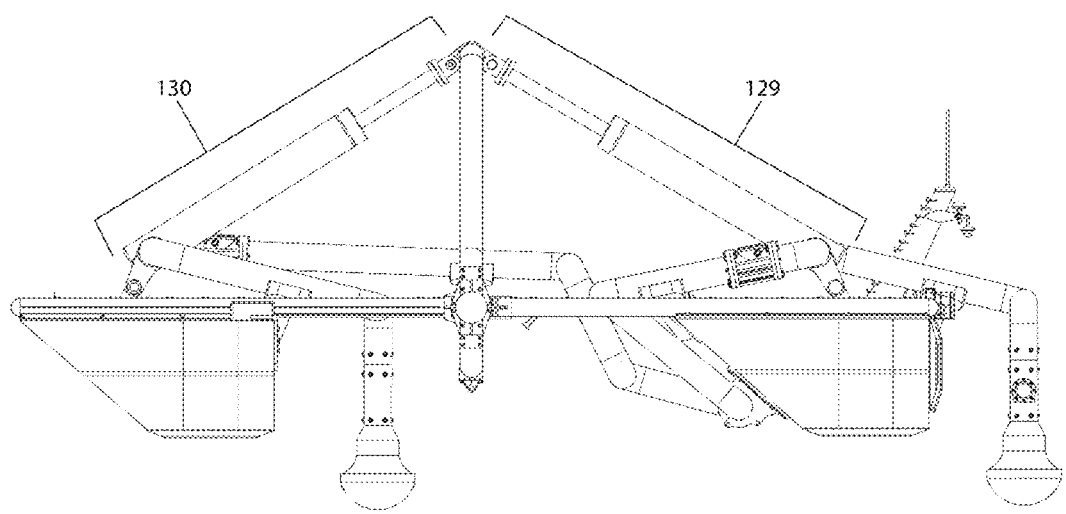
FIG. 36 illustrates a left side view of the complete apparatus in accordance with the principles of the present disclosure.
Figure 37:
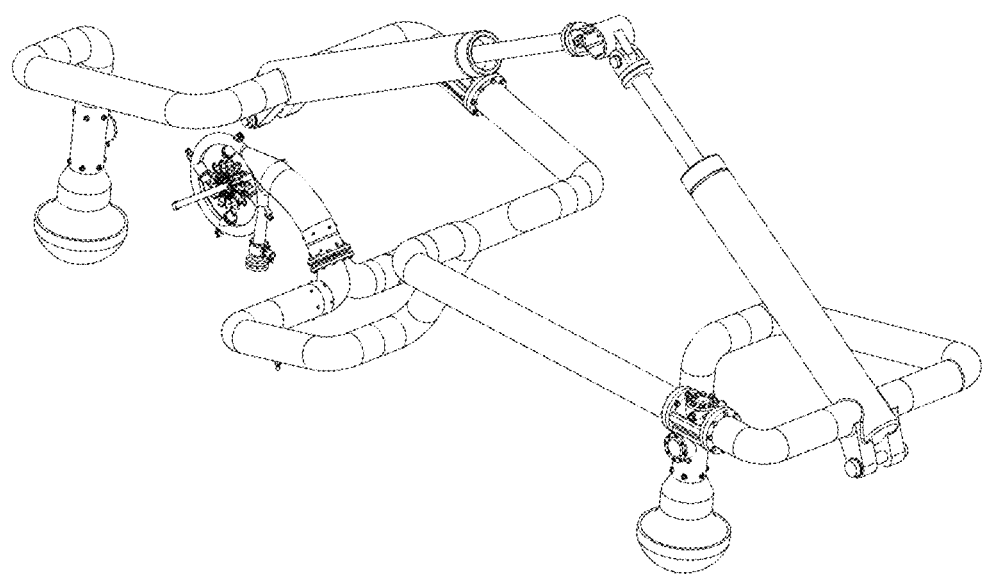
FIG. 37 illustrates a right front side perspective view of the hydraulic assembly in accordance with the principles of the present disclosure.
Figure 38:
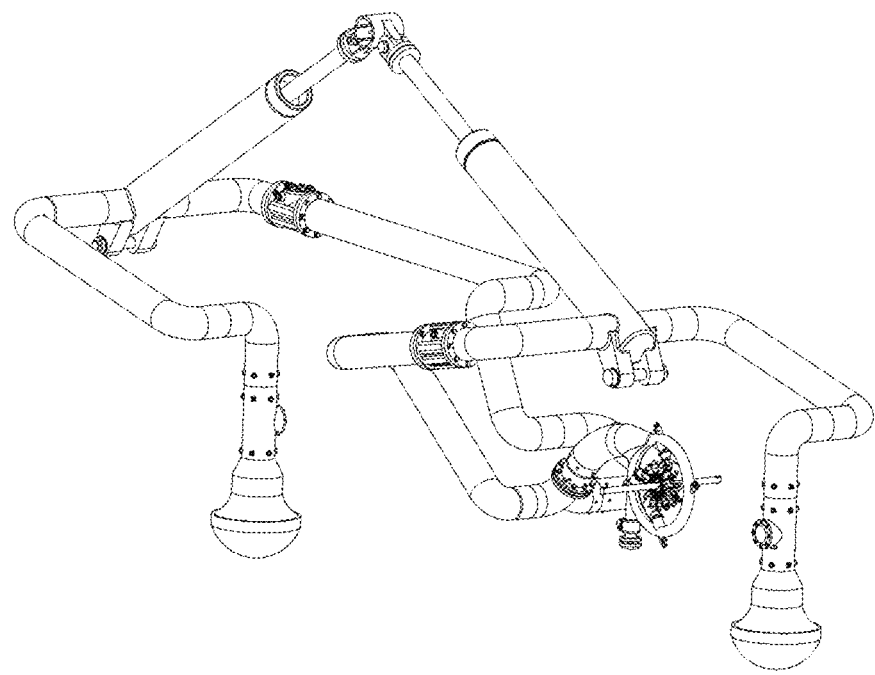
FIG. 38 illustrates a left rear side perspective view of the hydraulic assembly in accordance with the principles of the present disclosure.
Figure 39:
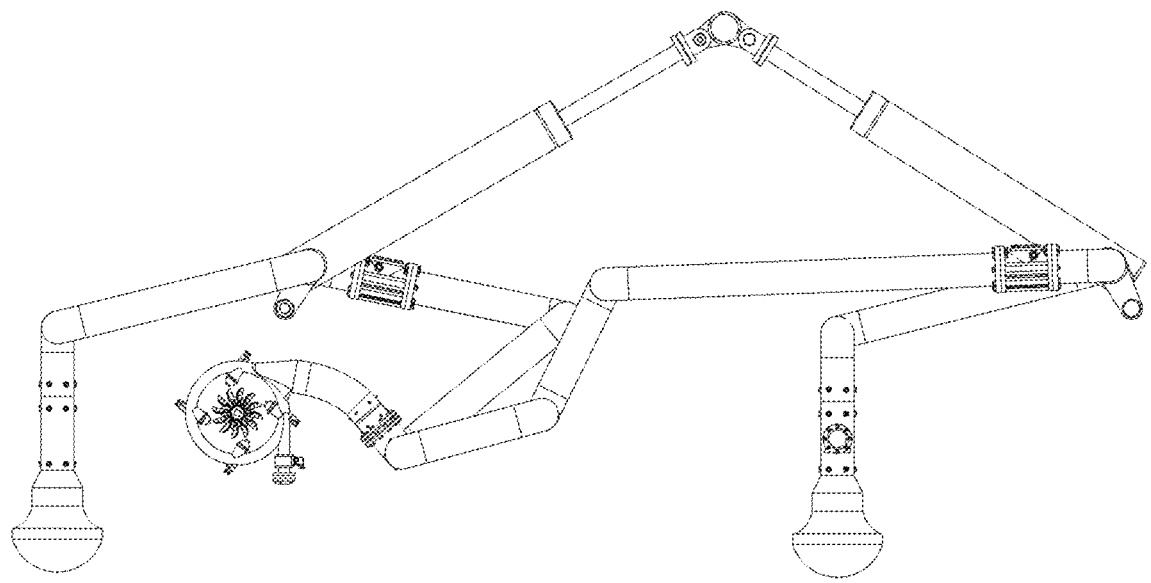
FIG. 39 illustrates a right side view of the hydraulic assembly in accordance with the principles of the present disclosure.
Figure 40:
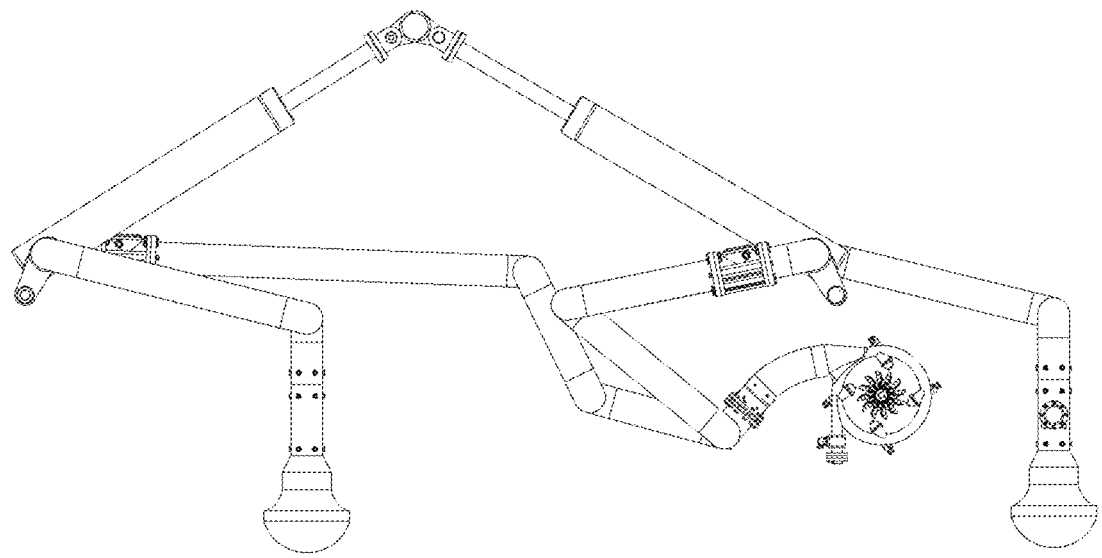
FIG. 40 illustrates a left side view of the hydraulic assembly in accordance with the principles of the present disclosure.
Figure 41:
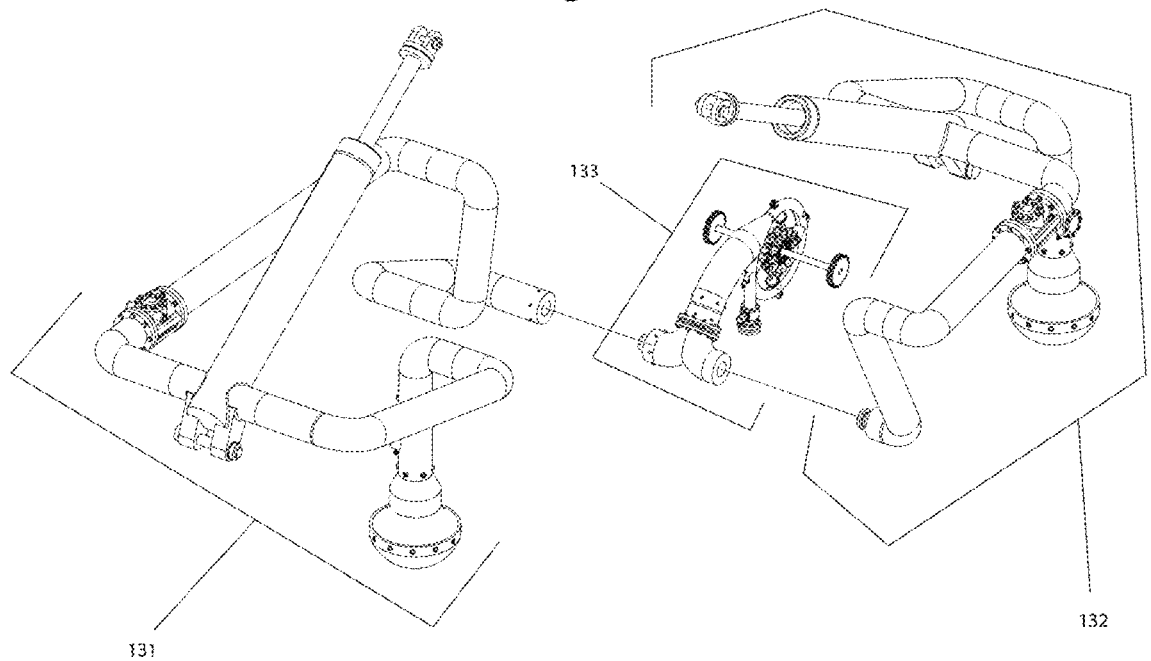
FIG. 41 illustrates a partially exploded front left side perspective view of the three major hydraulic assemblies in accordance with the principles of the present disclosure.
Figure 42:
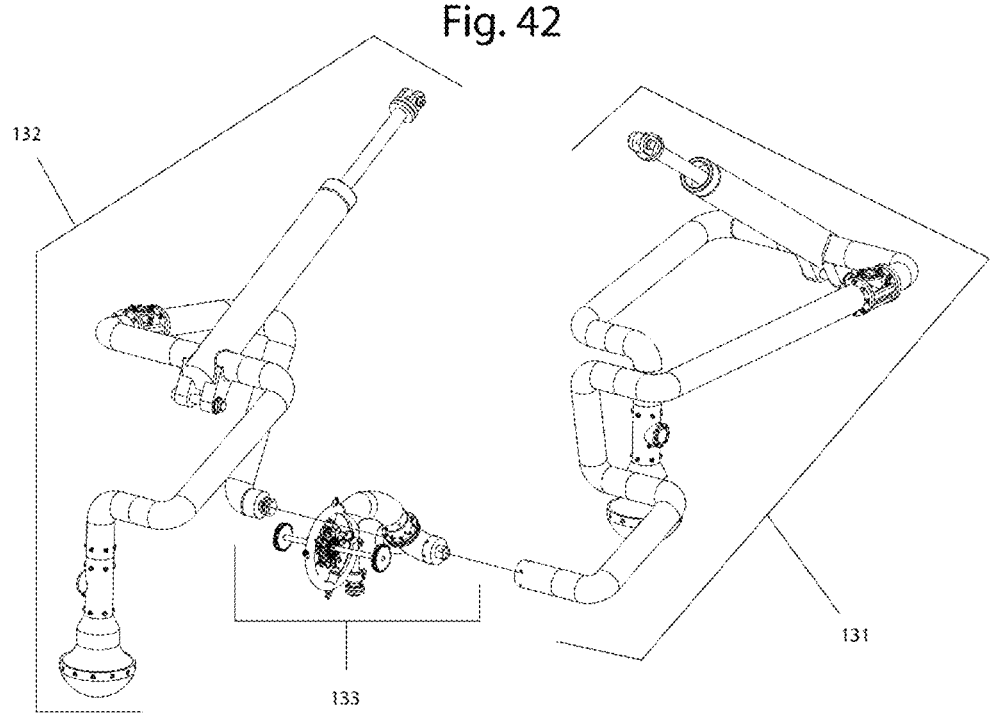
FIG. 42 illustrates a partially exploded rear right side perspective view of the three major hydraulic assemblies in accordance with the principles of the present disclosure.
Figure 43:
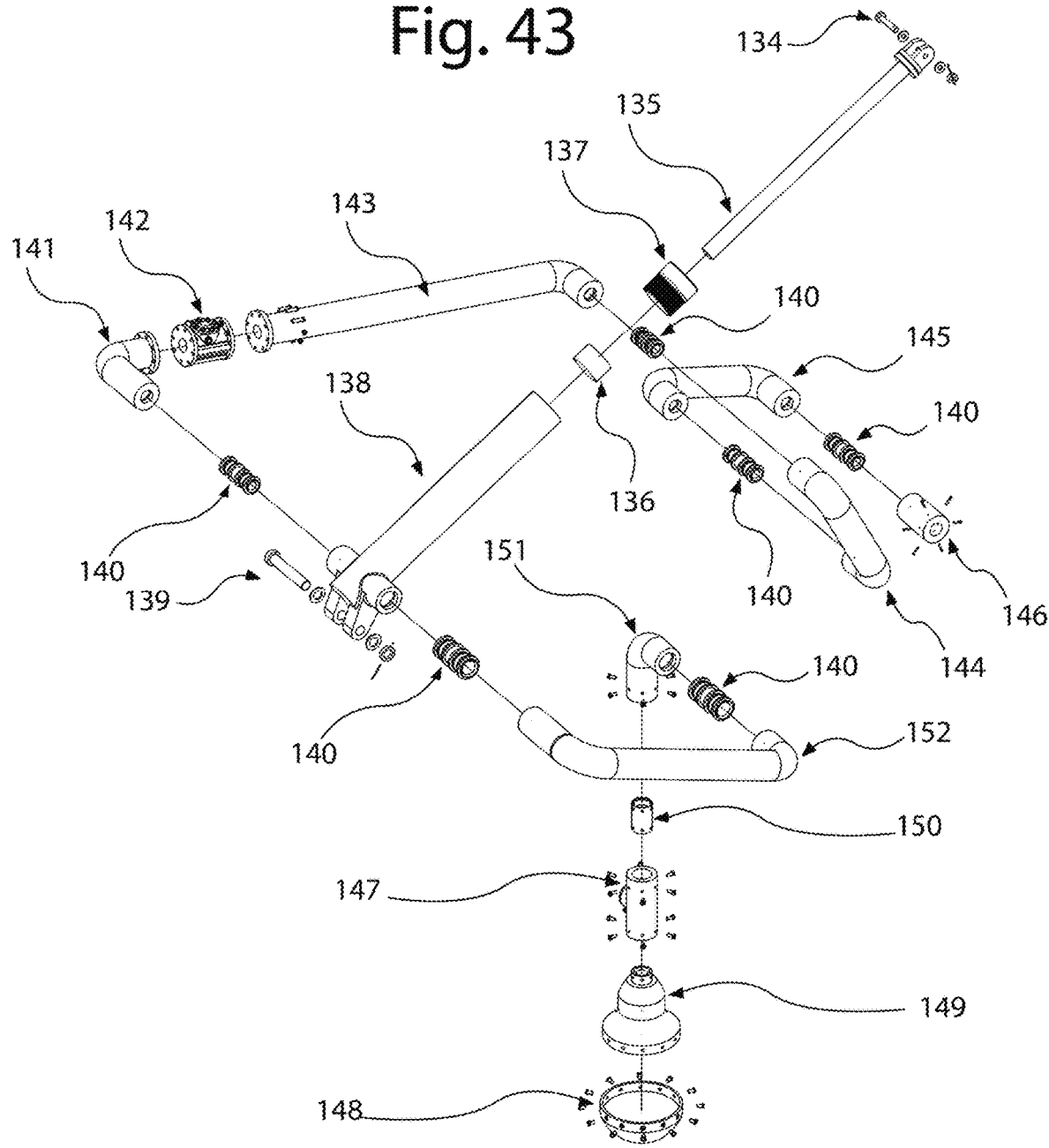
FIG. 43 illustrates an exploded front left side perspective view of the forward hydraulic system in accordance with the principles of the present disclosure.
Figure 44:
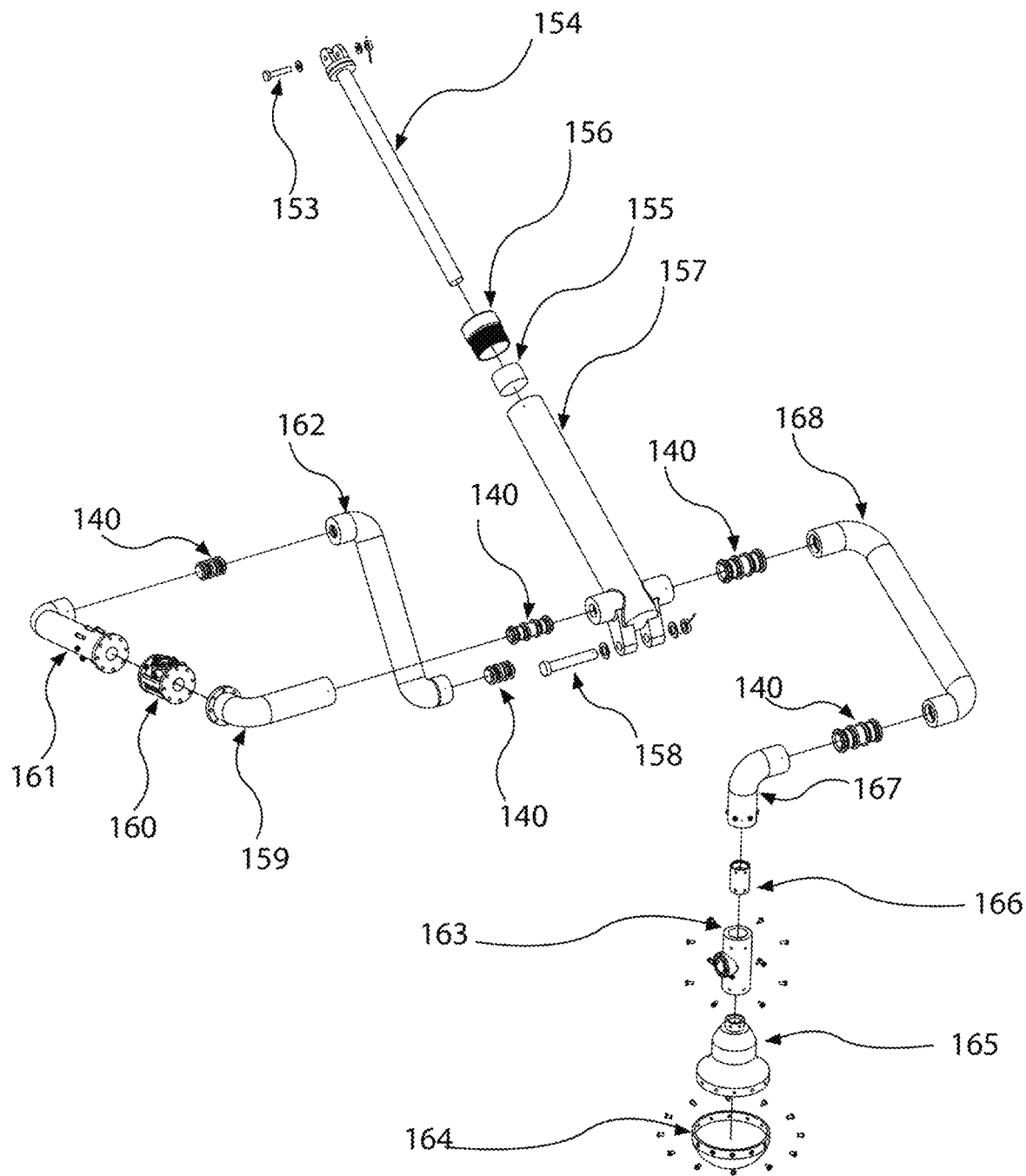
FIG. 44 illustrates an exploded rear right side perspective view of the rear hydraulic assembly in accordance with the principles of the present disclosure.

FIG. 36 illustrates a left side view of the marine wave apparatus 1, rear hydraulic piston assembly 129, front hydraulic piston assembly 130. FIG. 37 illustrates a right front side perspective view of the hydraulic assembly. FIG. 38 illustrates a left rear side perspective view of the hydraulic assembly. FIG. 39 illustrates a right side view of the hydraulic assembly. FIG. 40 illustrates a left side view of the hydraulic assembly. FIG. 41 illustrates a left front side perspective view of the three main hydraulic assemblies, forward hydraulic assembly 131, rear hydraulic assembly 132 and turbine assembly 133. FIG. 42 illustrates a right rear side perspective view of the three main hydraulic assemblies, forward hydraulic assembly 131, rear hydraulic assembly 132 and turbine assembly 133. FIG. 43 illustrates a left front side perspective view of the forward hydraulic assembly 131, rod hinge pin assembly 134, rod 135, piston 136, cylinder head 137, forward cylinder tube 138, cylinder tube hinge pin assembly 139, rotary joint 140, which allows for movement between the parts, forward output elbow pipe 141, forward output check valve 142, forward horizontal output pipe 143, forward vertical output pipe left 144, forward vertical output pipe right 145, forward output connector pipe 146, forward intake check valve 147, forward water strainer 148, forward water strainer body 149, forward intake connector pipe 150, forward intake elbow pipe 151, forward intake pipe 152. FIG. 44 illustrates a left rear side perspective view of the rear hydraulic assembly 132, rotary joint 140, rod hinge pin assembly 153, rod 154, piston 155, cylinder head 156, rearward cylinder tube 157, cylinder tube hinge pin assembly 158, rearward output elbow pipe 159, rearward output check valve 160, rearward output horizontal output pipe 161, rearward vertical output pipe 162, rearward intake check valve 163, rearward water strainer 164, rearward water strainer body 165, rearward intake connector pipe 166, rearward intake elbow pipe 167, rearward intake pipe 168.

Figure 46:
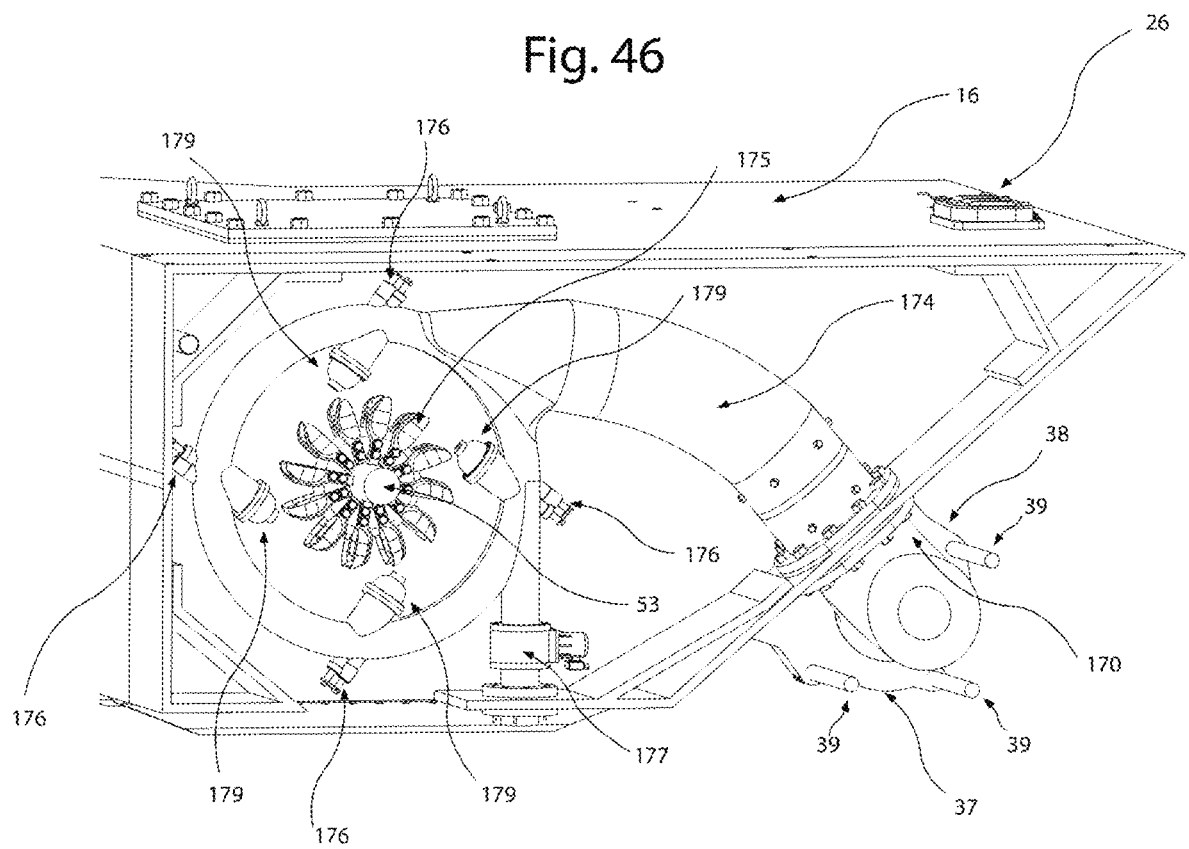
FIG. 46 illustrates a rear right side perspective view of the hydraulic turbine/penstock system within a cutaway of the rear buoyancy tank in accordance with the principles of the present disclosure.
Figure 47:
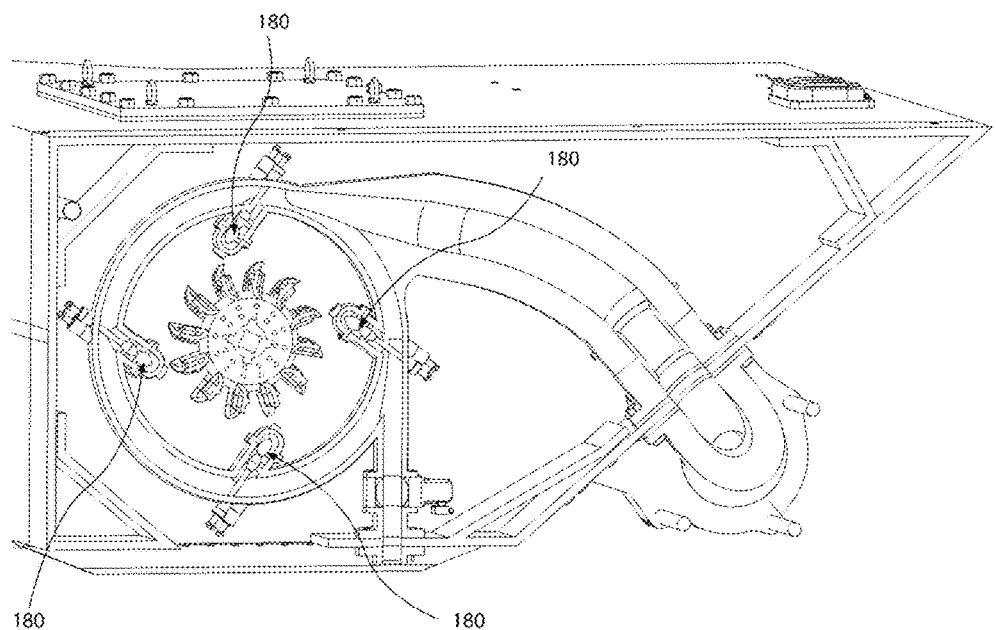
FIG. 47 illustrates a rear right side cutaway perspective view of the hydraulic turbine/penstock system within a cutaway of the rear buoyancy tank in accordance with the principles of the present disclosure.
Figure 48:
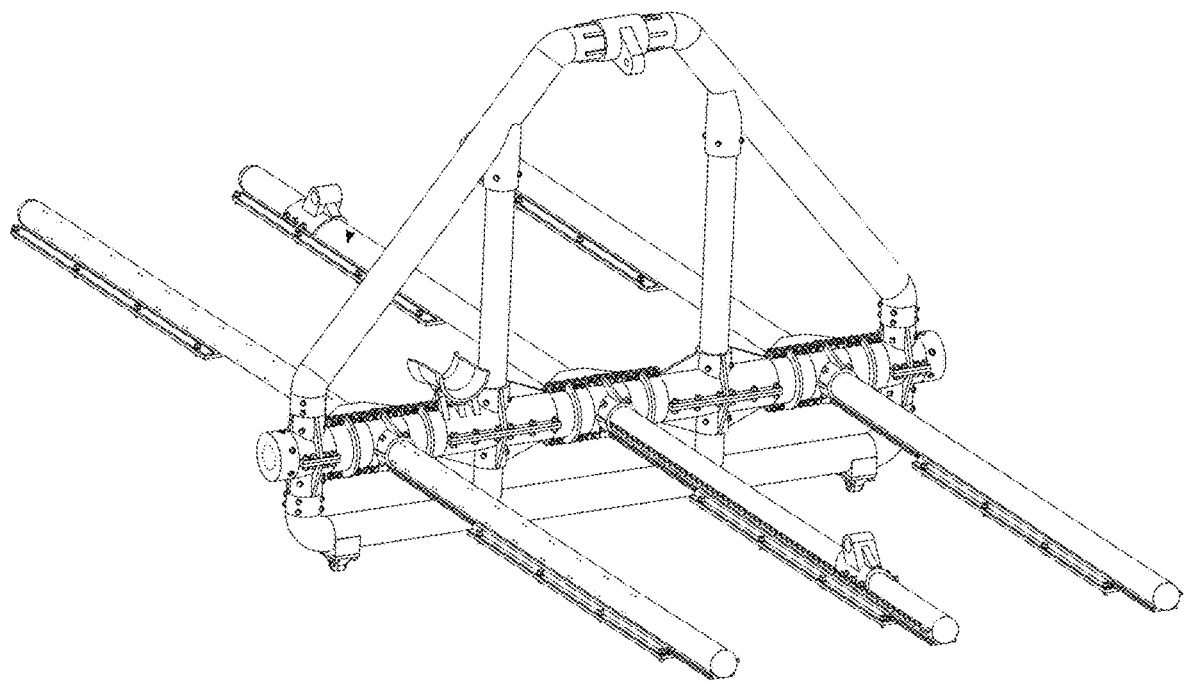
FIG. 48 illustrates a front top right perspective view of the structural assembly in accordance with the principles of the present disclosure.
Figure 49:
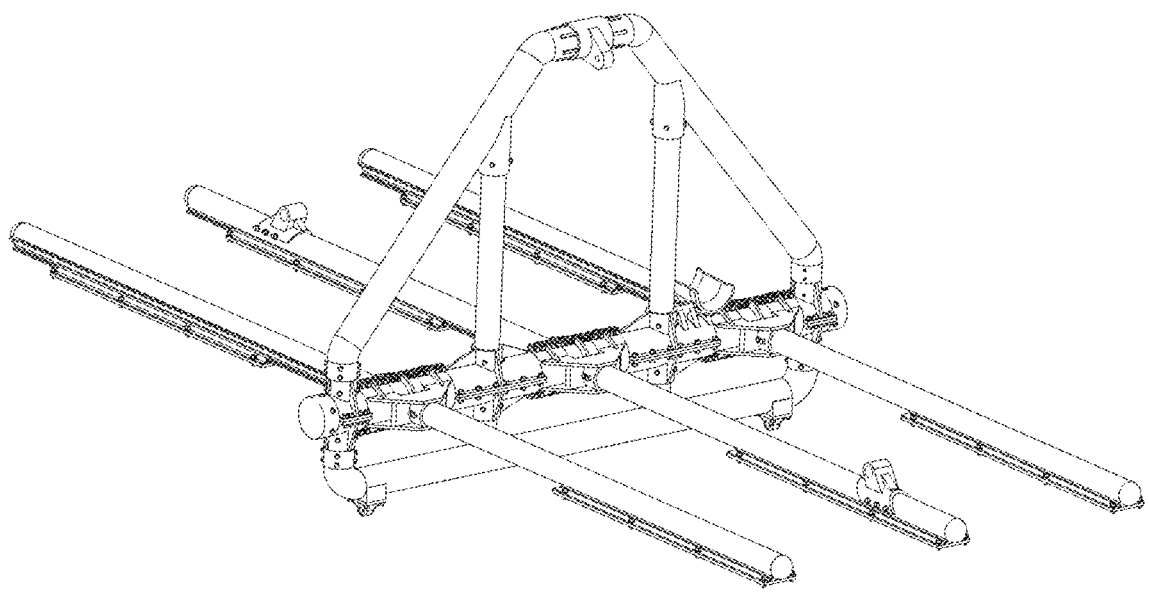
FIG. 49 illustrates a rear top left perspective view of the structural assembly in accordance with the principles of the present disclosure.

FIG. 45 illustrates an exploded right rear side perspective view of the turbine assembly 133, external connecting flange 40, T pipe connector 169, T pipe 170, seal 171, penstock base adapter 172, penstock connector 173, penstock 174, Pelton turbine 175, spear control actuator 176, outlet control valve 177, outlet adapter 178, nozzle cap 179, spear 180. FIG. 46 illustrates a right rear side perspective view of the turbine assembly 133 rear buoyancy tank assembly 16, small access hatch 26, lower main pipe support brace 37, upper pipe support brace 38, horizontal support bar 39, turbine shaft 53, penstock 174, Pelton turbine 175, spear control actuator 176, outlet control valve 177, nozzle cap 179. FIG. 47 illustrates a cutaway right rear side perspective view of the turbine assembly 133, spear 180. FIG. 48 illustrates a right front side perspective view of the structural support assembly 12. FIG. 49 illustrates a left rear side perspective view of the structural support assembly 12.

Figure 50:
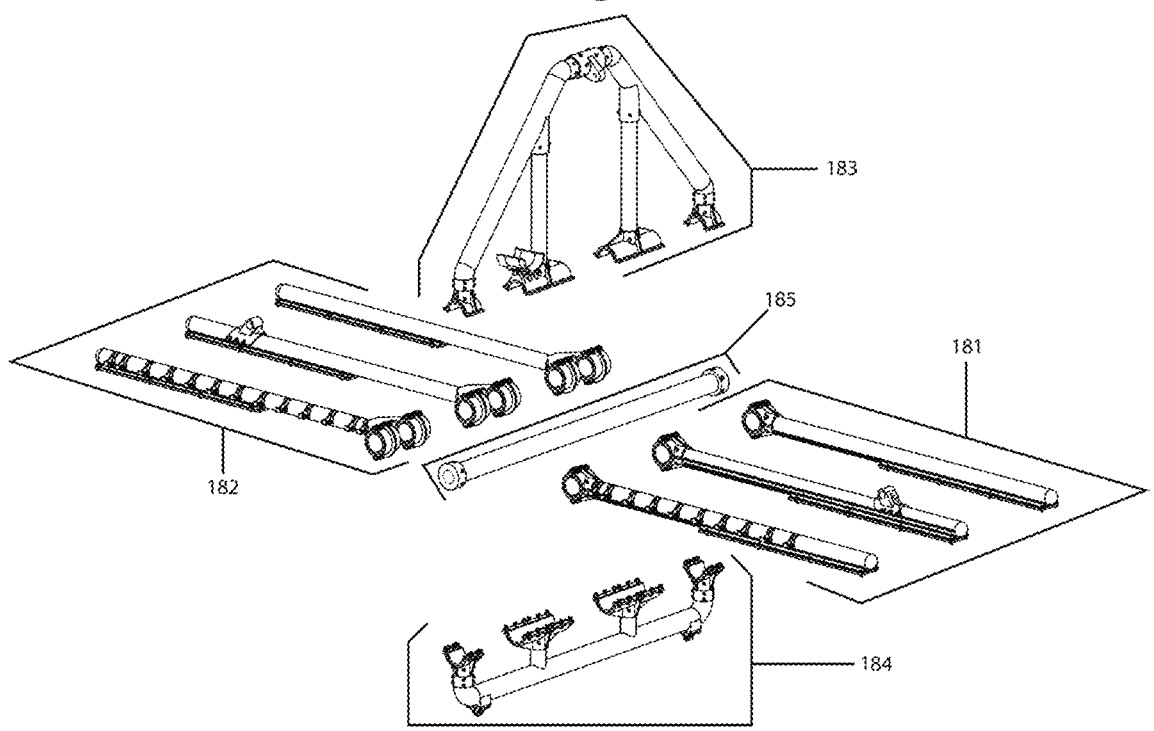
FIG. 50 illustrates a partially exploded front top right perspective view of the four major structural assemblies in accordance with the principles of the present disclosure.
Figure 51:
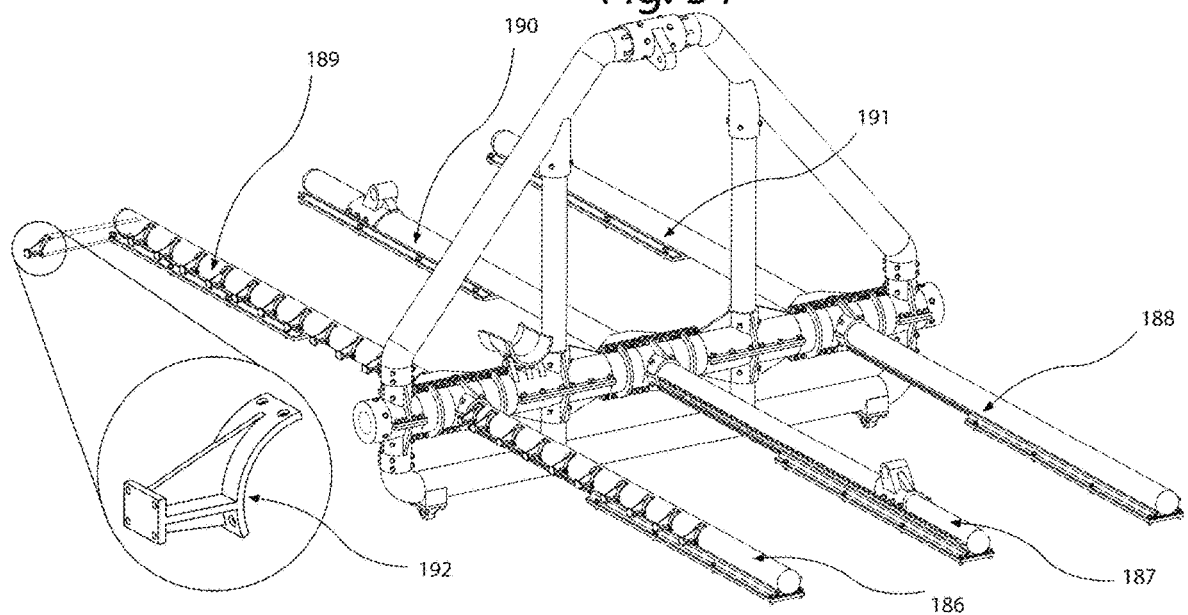
FIG. 51 illustrates a front top right perspective view of the structural assembly with a close up of an electrical conduit support arm in accordance with the principles of the present disclosure.
Figure 52:
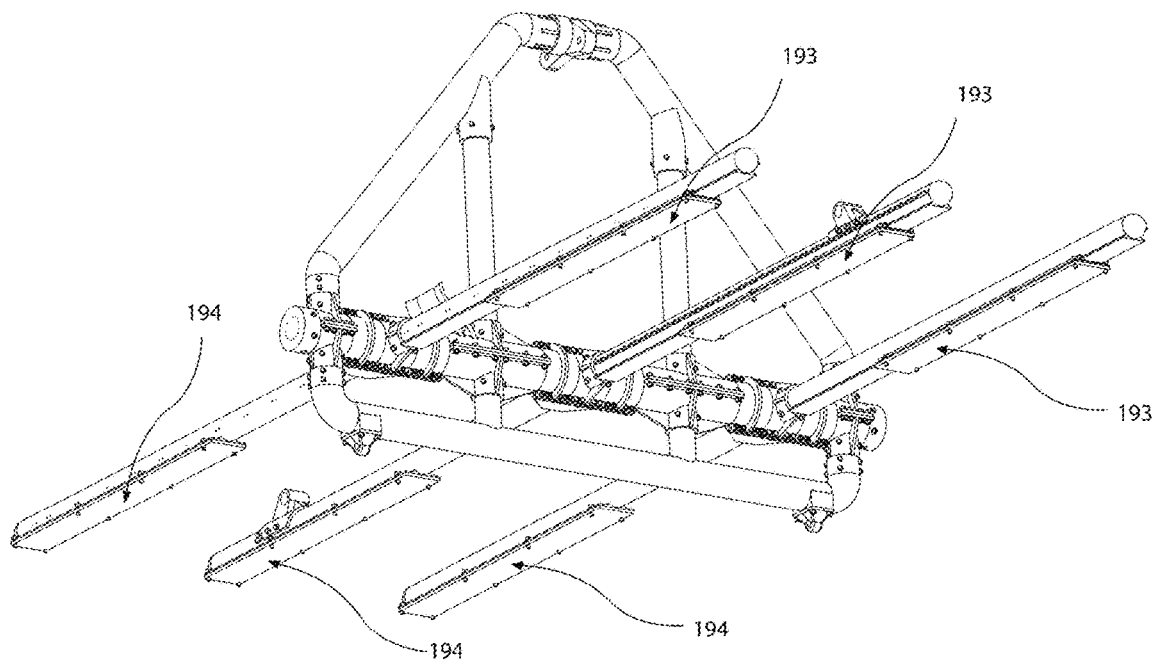
FIG. 52 illustrates a front bottom right perspective view of the structural assembly in accordance with the principles of the present disclosure.

FIG. 50 illustrates a partially exploded right front side perspective view of the 5 major components of the structural support assembly 12, forward outrigger assemblies 181, rear outrigger assemblies 182, upper triangular frame assembly 183, lower triangular frame assembly 184, main hinge pin assembly 185. FIG. 51 illustrates a right front side perspective view of the structural support assembly 12, right front outrigger assemblies 186, center front outrigger assemblies 187, left front outrigger assemblies 188, right rear outrigger assemblies 189, center rear outrigger assemblies 190, left rear outrigger assemblies 191 electrical conduit support arms 192. FIG. 52 illustrates a right front bottom side perspective view of the structural support assembly 12, outrigger slide assembly 193, outrigger base 194.

Figure 53:
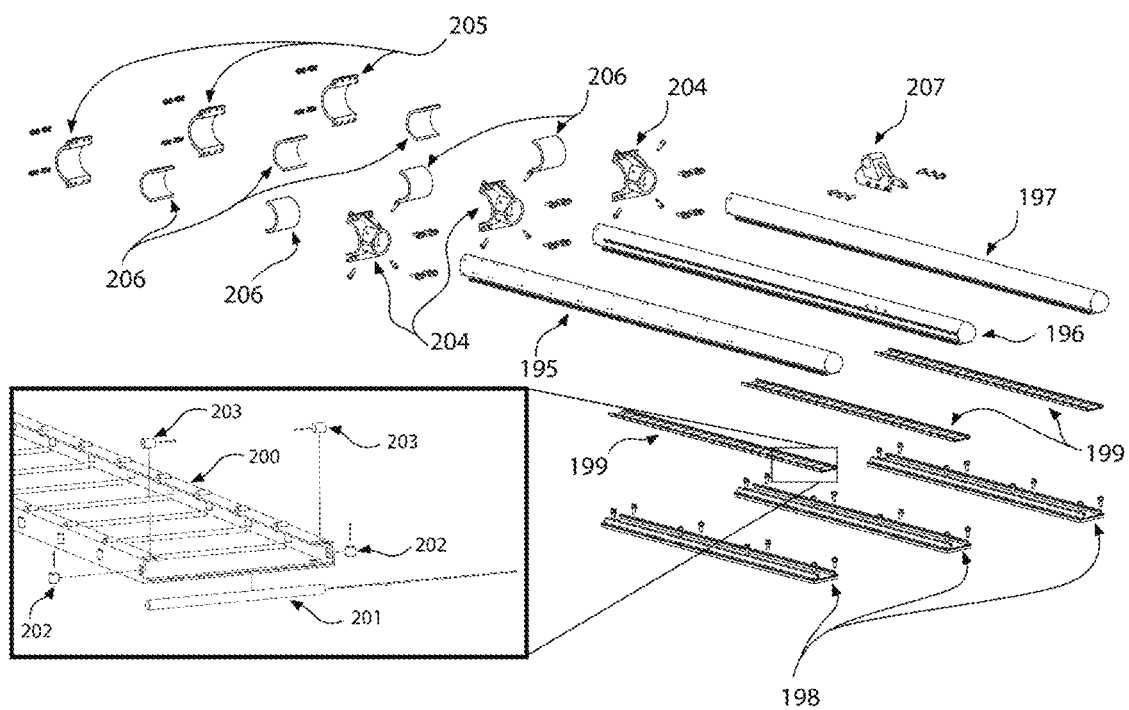
FIG. 53 illustrates an exploded front top right perspective view of the forward outrigger assembly in accordance with the principles of the present disclosure.
Figure 61:
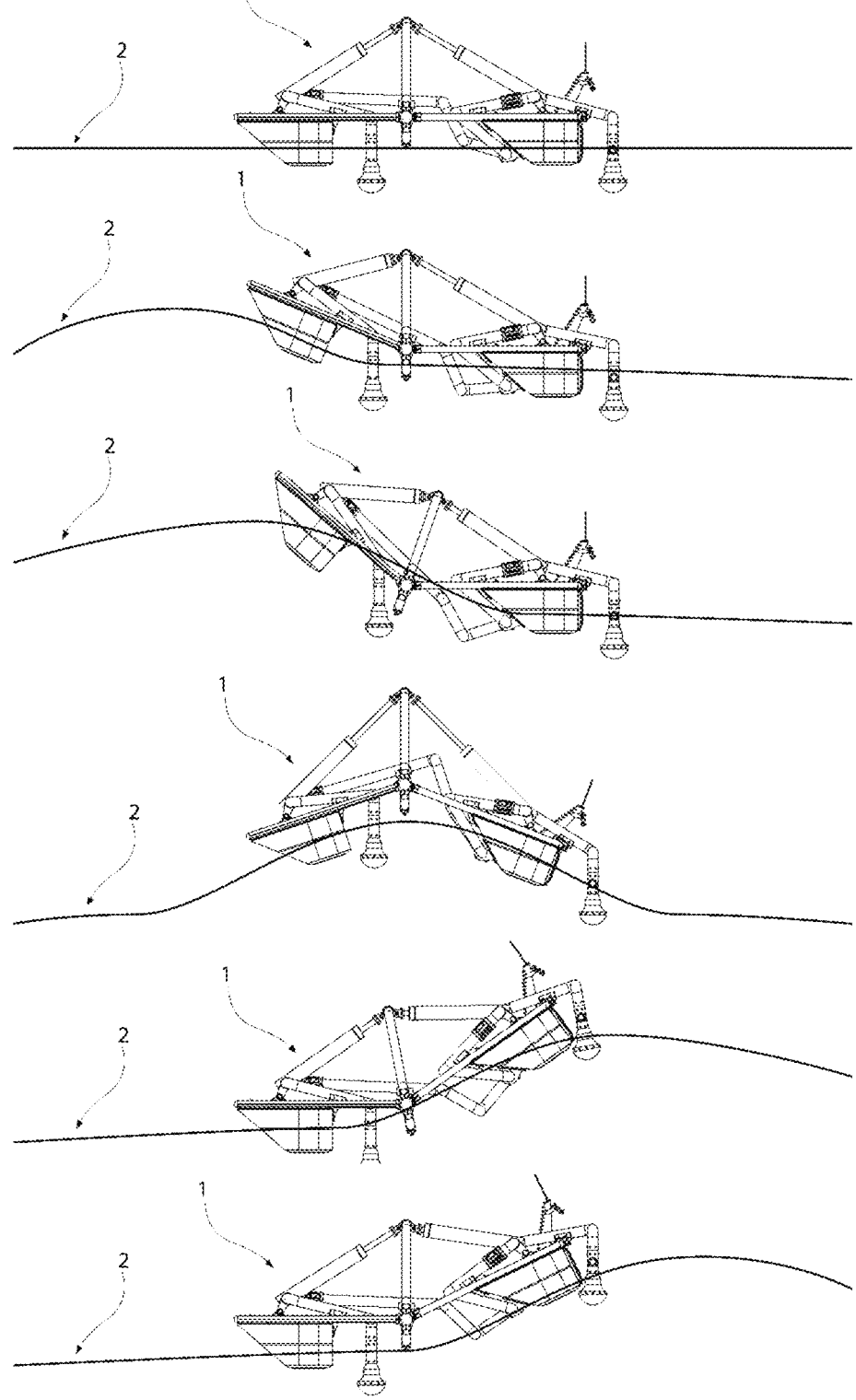
FIG. 61 illustrates a left view of the full range of movement of the exemplary embodiment during a wave event in accordance with the principles of the present disclosure.
Figure 63:
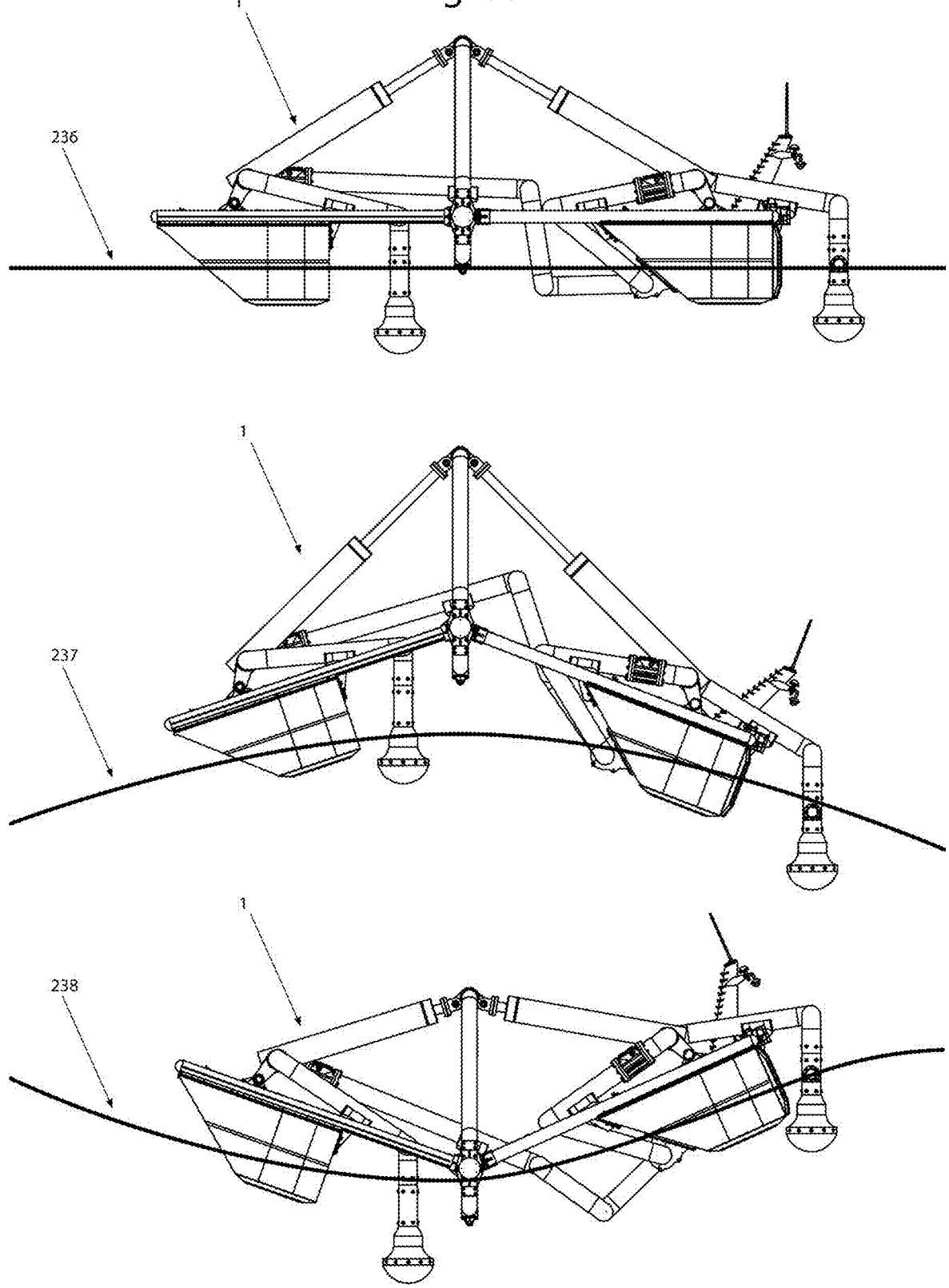
FIG. 63 illustrates a left view of the exemplary embodiment indicating the heaving motion of the vertical triangular support assembly during a wave event and its effect on the hydraulic piston assembly, hydraulic conduits and outrigger assembly in accordance with the principles of the present disclosure.

FIG. 53 illustrates an exploded right front side perspective view of the forward outrigger assemblies 181, front right outrigger 195, front center outrigger 196, front left outrigger 197, outrigger support base 198, bearing support case assembly 199, bearing support case 200, lower long needle bearing 201, lateral bearing 202, upper bearing 203, inner bearing case small 204, outer bearing case small 205, inner half bearing 206, forward hydraulic piston hard point lower 207. The outrigger support base 198 is attached to the forward buoyancy tank 17 and the bearing support case assembly 199 is attached to the outrigger support base 198. The bearing support case 200 contains the lower long needle bearing 201, lateral bearing 202, upper bearing 203, which allow the base of the forward outriggers 195, 196 and 197 to slide backwards and forwards in a horizontal linear manner see FIG. 71. The inner half bearings 206 wrap around the large main hinge pin 224 see FIG. 58 and the inner bearing cases small 204 and outer bearing cases small 205 wrap around the inner half bearings 206 to hold them in place. The inner bearing cases small 204 are then connected to the rear of the outriggers 196, 196 and 197. This allows for the outriggers to rotate in an arc along the longitudinal axis of the large main hinge pin 224. Views of these connections are seen clearly in FIGS. 49, 51, 52. Views of the rotational movements are seen in FIGS. 61 and 63.

Figure 54:
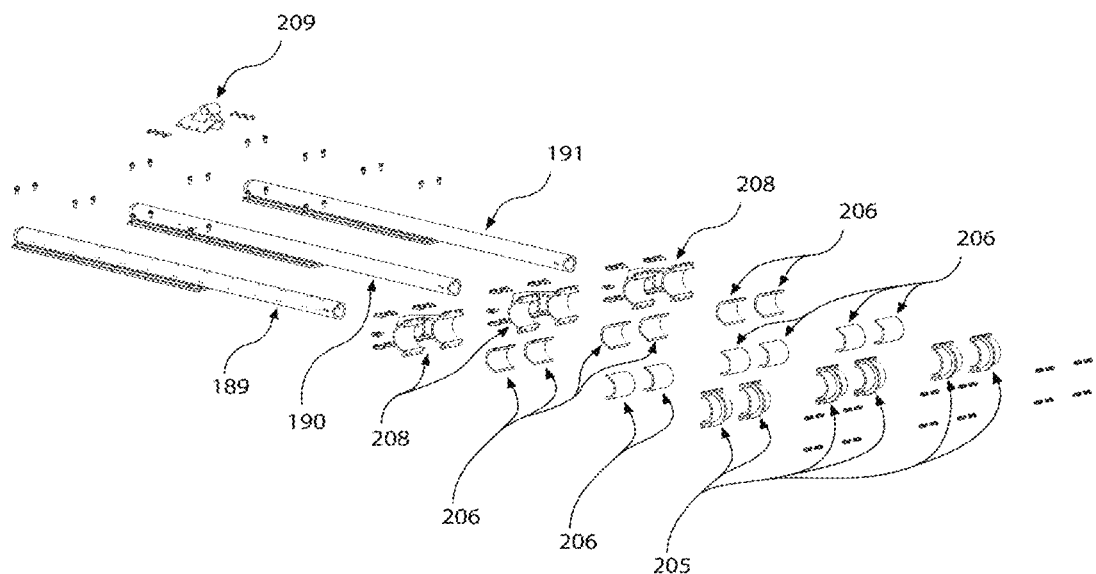
FIG. 54 illustrates an exploded rear top left perspective view of the rear outrigger assembly in accordance with the principles of the present disclosure.

FIG. 54 illustrates an exploded right front side perspective view of the rear outrigger assemblies 182, rear right outrigger 189, rear center outrigger 190, rear left outrigger 191, outer bearing case small 205, small outer half bearing 206, twin inner bearing case 208, rear hydraulic piston hard point lower 209. The outrigger base 194 see FIG. 52 of the rear outriggers 182 see FIG. 50 are attached to the rear buoyancy tank 16. The inner half bearings 206 wrap around the large main hinge pin 224 see FIG. 58 and the twin inner bearing case 208 and the outer bearing case small 205, wrap around the inner half bearings 206 to hold them in place. The twin inner bearing case 208 are then connected to the rear of the outriggers 189, 190 and 191. This allows for the outriggers to rotate in an arc along the longitudinal axis of the large main hinge pin 224. Views of these connections are seen clearly in FIGS. 49, 51, 52. Views of the rotational movements are seen in FIGS. 61 and 63.

Figure 55:
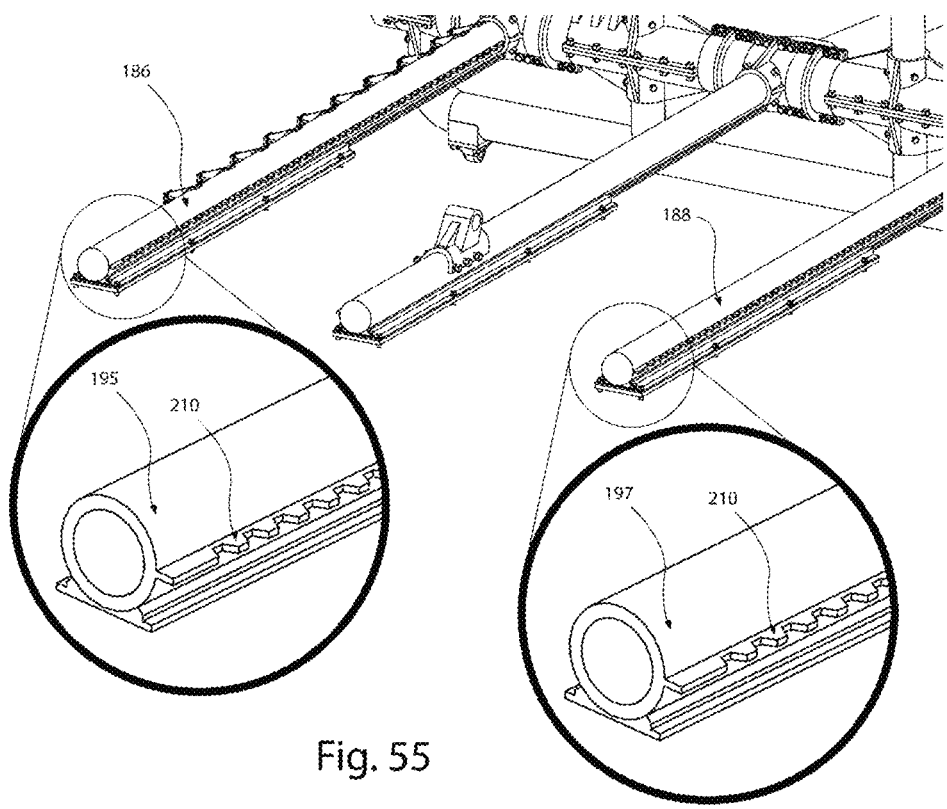
FIG. 55 illustrates a left front close up perspective view of the front left and right outriggers in accordance with the principles of the present disclosure.
Figure 56:
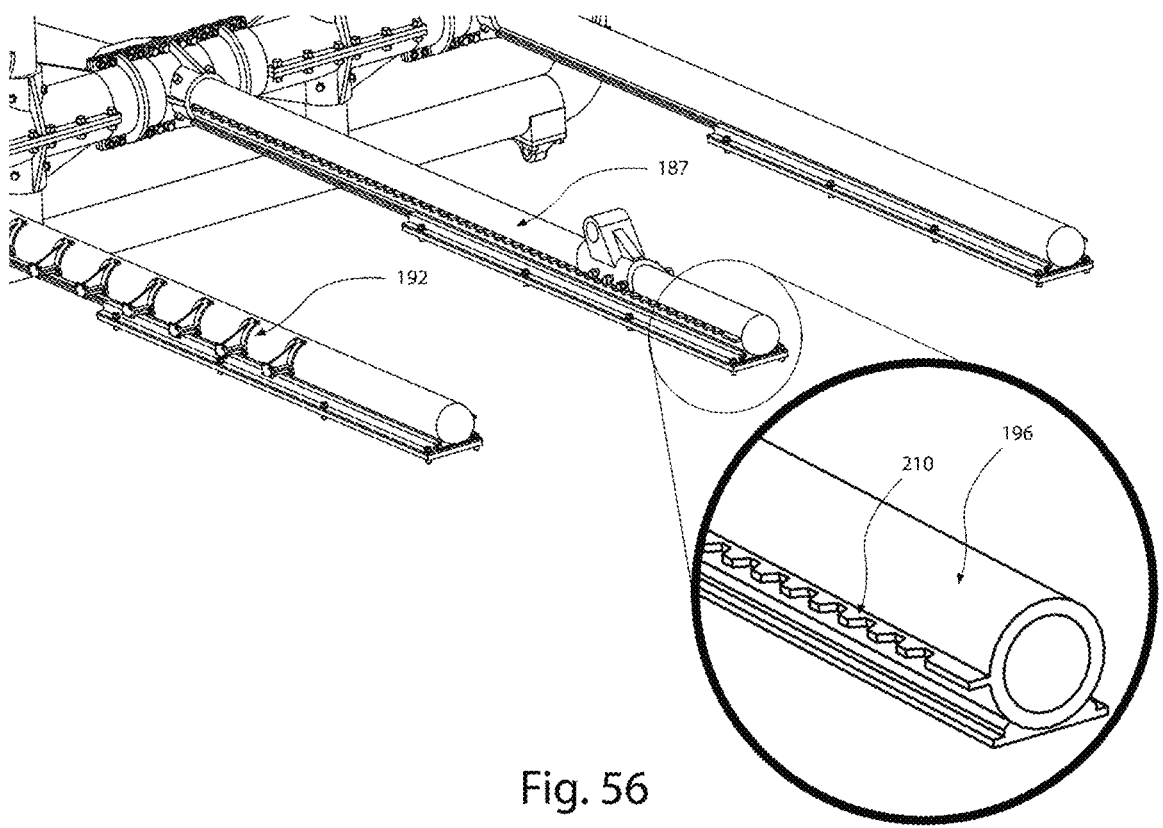
FIG. 56 illustrates a right front close up perspective view of the front center outrigger in accordance with the principles of the present disclosure.

Outrigger assemblies 181 and 182 tie into the large hinge pin 224 see FIGS. 48, 49, 50 and 58 thus creating a large hinge or fulcrum between the forward 16 and rear 17 buoyancy tanks see FIGS. 2, 3, 7, 61 and 63. Since the forward buoyancy tank can extend or contract horizontally see FIG. 71, it affects the forces needed to lift and lower the structural components 12 see FIGS. 5 and 6 along the horizontal axis of the large hinge pin 224. This fulcrum effect causes small waves to lift and lower the structural components 12 easily when the forward buoyancy tank 16 is fully extended. When large waves occur with the forward buoyancy tank 16 fully contracted it will be harder to lift and lower the structural components 12 thus the system will act as an adjustable fulcrum lever system. FIG. 55 illustrates a left front side perspective view of the front outrigger assemblies 181, right front outrigger assemblies 186, left front outrigger assemblies 188, front right outrigger 195, front left outrigger 197, rack 210. Rack 210 meshes with brake 106 see FIG. 28. When brake 106 is extended it holds outriggers 195 and 197 in place. When brake 106 is contracted, outriggers 195 and 197 are allowed to move horizontally forward or backwards. FIG. 56 illustrates a right front side perspective view of the outrigger assemblies 181, front center outrigger assembly 187, front center outrigger 196, rack 210. Rack 210 on front center outrigger 196 meshes with pinion 109 see FIG. 28 and rotates because of motor 110. This rotation of pinion 109, clockwise or counter clockwise allows for horizontal linear movement of the forward buoyancy tank 17.

Figure 57:
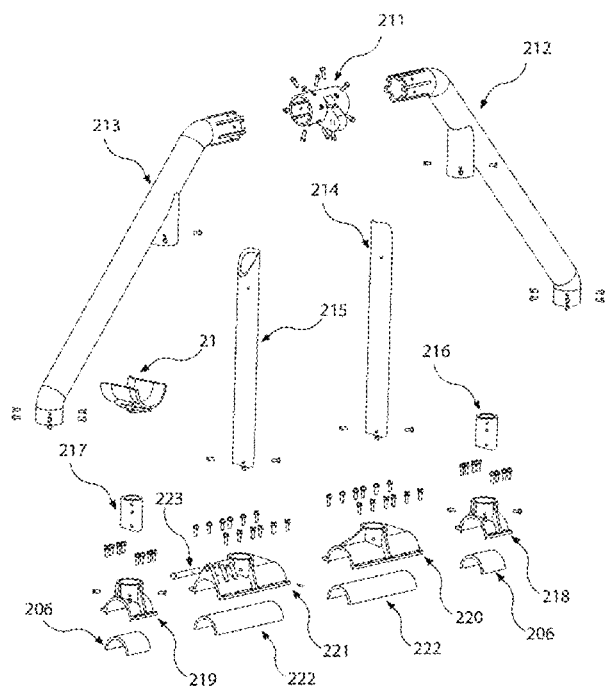
FIG. 57 illustrates an exploded right front perspective view of the upper triangular support assembly in accordance with the principles of the present disclosure.
Figure 58:
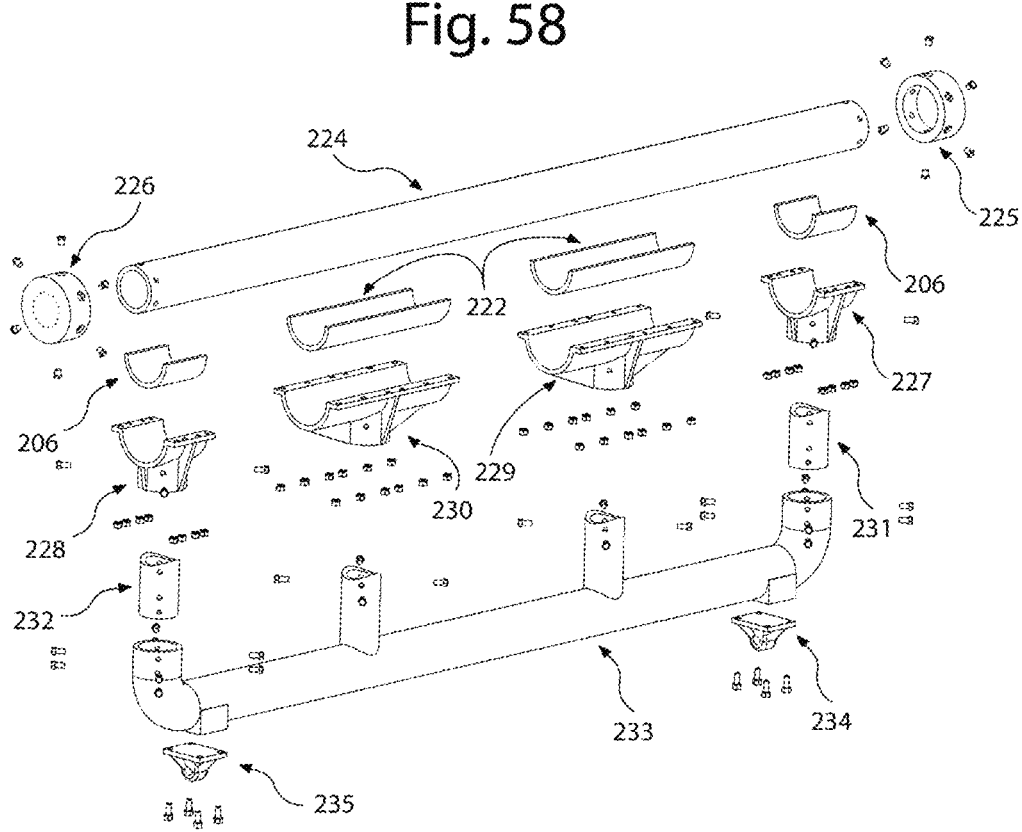
FIG. 58 illustrates an exploded right front perspective view of the lower triangular support assembly in accordance with the principles of the present disclosure.

FIG. 57 illustrates a right front side perspective view of the upper vertical triangular frame assembly 183, hydraulic pipe support cradle 21 small inner half bearing 206, upper hydraulic piston double hard point 211, upper left oblique triangular support structure 212, upper right oblique triangular support structure 213, upper left vertical triangular support structure 214, upper right vertical triangular support structure 215, upper left bearing case connector pipe 216, upper right bearing case connector pipe 217, upper left bearing case small 218, upper right bearing case small 219, upper left bearing case large 220, upper right bearing case large with hinge knuckle 221, large half bearing 222, hinge pin 223. FIG. 58 illustrates a right front side perspective view of the lower vertical triangular frame assembly 183 and the main hinge pin assembly 185, small half bearing 206, large main hinge pin 224, left hinge pin cover 225 right hinge pin cover 226, lower left bearing case small 227, lower right bearing case small 228, lower left bearing case large 229 lower right bearing case large 230, lower left bearing case connector pipe 231, lower right bearing case connector pipe 232, lower triangular support structure 233, anchor cable hard point left 234, anchor cable hard point right 235. Components of the upper triangular frame assembly 183 see FIGS. 48, 49, 50, and 52 connect to the components of the lower triangular frame 184 and both surround the large main hinge pin 224, thus the stresses incurred from the pull of the rode during wave events see FIGS. 1, 2, 61 and 63 and from pulling and pushing from the upper hydraulic assemblies 129 and 130 see FIGS. 36, 61, 62 and 63 are distributed among the upper and lower components as well as around the main hinge pin and also allows for rotation along the axis of the main hinge pin.

Figure 59:
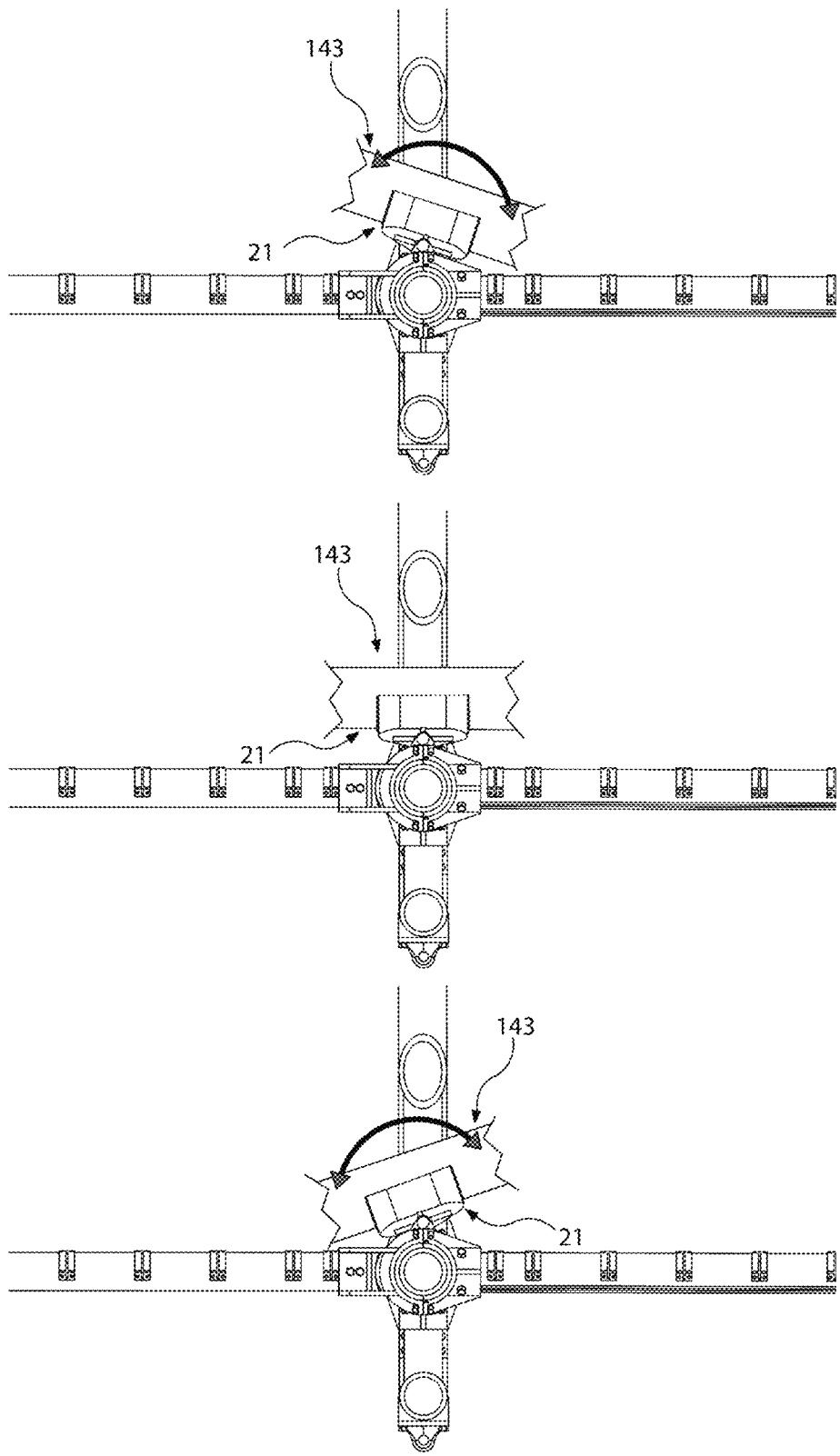
FIG. 59 illustrates a right side view of the range of movements of the hydraulic pipe support assembly on the upper triangular support structure in accordance with the principles of the present disclosure.
Figure 62:
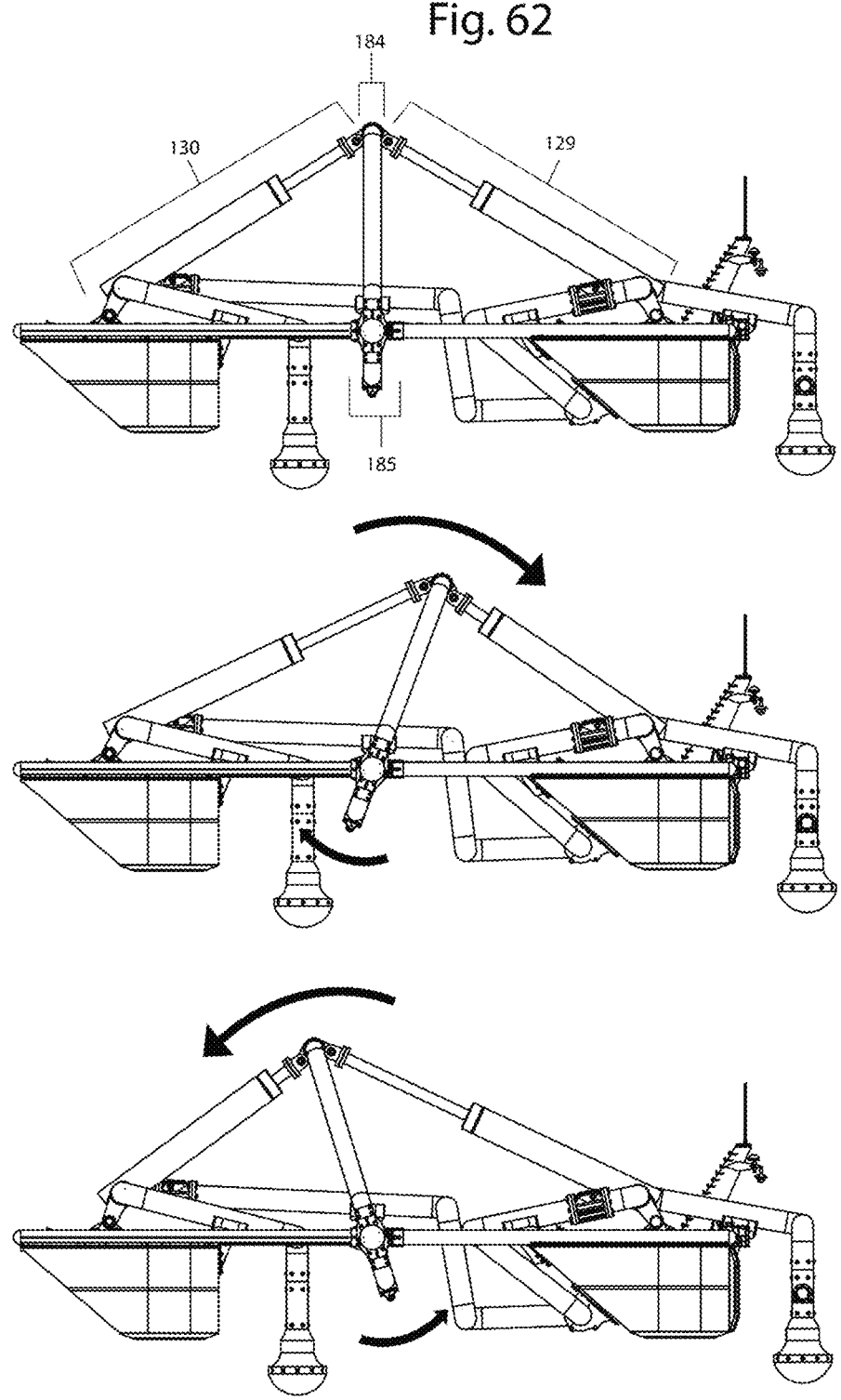
FIG. 62 illustrates a left view of the exemplary embodiment indicating the pitching motion of the triangular assembly structure and its effect on the hydraulic piston assembly in accordance with the principles of the present disclosure.

FIG. 59 illustrates a right side view of the range of movements of the hydraulic pipe support cradle 21, supporting the forward horizontal output pipe 143, on the support assembly 12. FIG. 60 illustrates a left side view of the range of movements of the hydraulic pipe support cradle 21 supporting the forward intake pipe 152, rearward horizontal output pipe 161, rearward intake pipes 168, on the tank float assemblies 15. The hydraulic pipe support cradles 21 with its hinge pins and bases allows for slight back and forth movement of the hydraulic pipes as well as movements in horizontal arcs see FIGS. 59 and 60. These movements are needed because the design as a whole flexes and stretches to extract energy from marine waves. FIG. 61 illustrates a left side view of the range of movements of the marine apparatus 1, floating on a body of water 2 during a one marine wave event. FIG. 62 illustrates a left side view of the range of movements of the hydraulic piston assemblies 129 and 130 and the upper and lower triangular frame assemblies 184 and 185.

Figure 65:
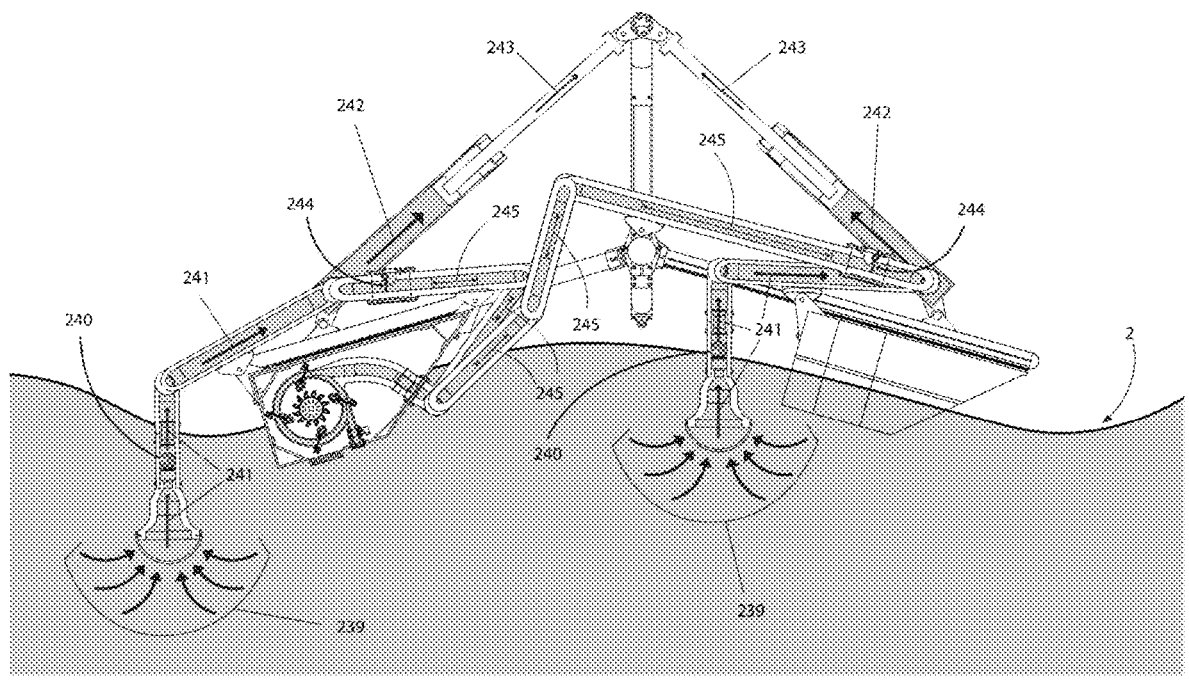
FIG. 65 illustrates a right cutaway view of the hydraulic system during a crest wave event where water is being sucked into the input pipes and hydraulic cylinder in accordance with the principles of the present disclosure.
Figure 64:
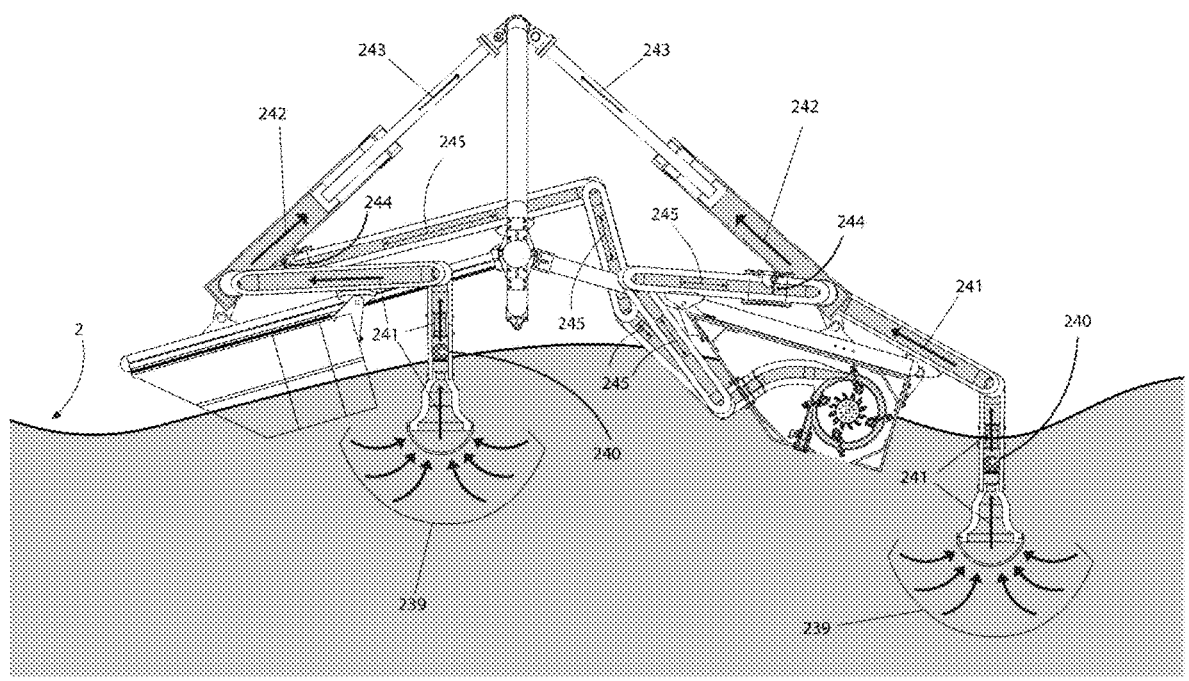
FIG. 64 illustrates a left cutaway view of the hydraulic system during a crest wave event where water is being sucked into the input pipes and hydraulic cylinder in accordance with the principles of the present disclosure.
Figure 66:
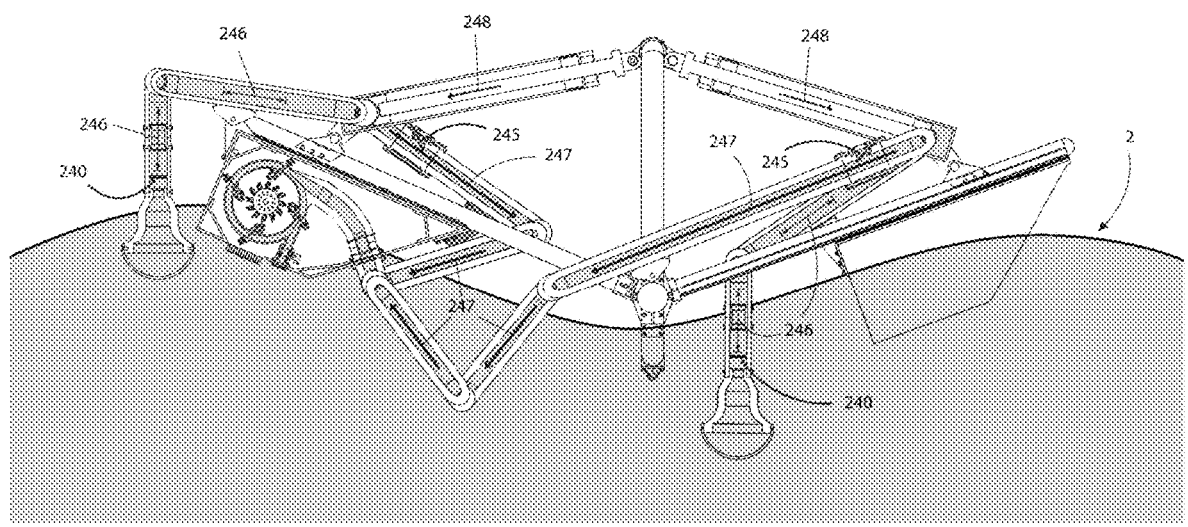
FIG. 66 illustrates a right cutaway view of the hydraulic system during a trough wave event where water is being compressed in the hydraulic cylinder and is sent pressurized through the output pipes to spin the hydraulic turbine in the rear buoyancy tank in accordance with the principles of the present disclosure.

FIG. 63 illustrates a left side view of the range of movements of the marine apparatus 1, ocean flat 236, ocean wave crest 237, ocean wave trough 238. These range of movements are due to the rotary joints 140 in FIGS. 43 and 44 and the hydraulic hard points 207, 209 and 211 in FIGS. 53, 54 and 57. FIG. 64 illustrates a left side view of the water flow inside the hydraulic system 13, during an intake of marine water of the marine apparatus 1, body of water 2, water being sucked in through the water strainer 239, open input check valve allowing water flow 240, water flowing through the water strainer body and intake pipes 241, water is sucked into the hydraulic cylinder tube 242, the piston and piston rod expands 243, output check valve 244, is closed impeding water in the output pipes to return to the hydraulic cylinder tube, no water movement in the output pipes 245. FIG. 65 illustrates a right side view of the water flow inside the hydraulic system 13, during an intake of marine water of the marine apparatus 1, body of water 2, water being sucked in through the water strainer 239, open input check valve allowing water flow 240, water flowing through the water strainer body and intake pipes 241, water is sucked into the hydraulic cylinder tube 242, the piston and piston rod expands 243, output check valve 244, is closed impeding water in the output pipes to return to the hydraulic cylinder tube, no water movement in the output pipes 245. FIG. 66 illustrates a right side view of the water flow inside the hydraulic system 13, during a compression of marine water inside of the marine apparatus 1, body of water 2 closed input check valve 246, impedes water flow from returning to the body of water 2, water trapped in intake pipes, no movements 247, the piston and piston rod 248, contract compressing the water in the cylinder tube, output check valve is open 249 allowing compressed water to flow through the output pipes 250, towards the turbine assembly 133.

Figure 67:
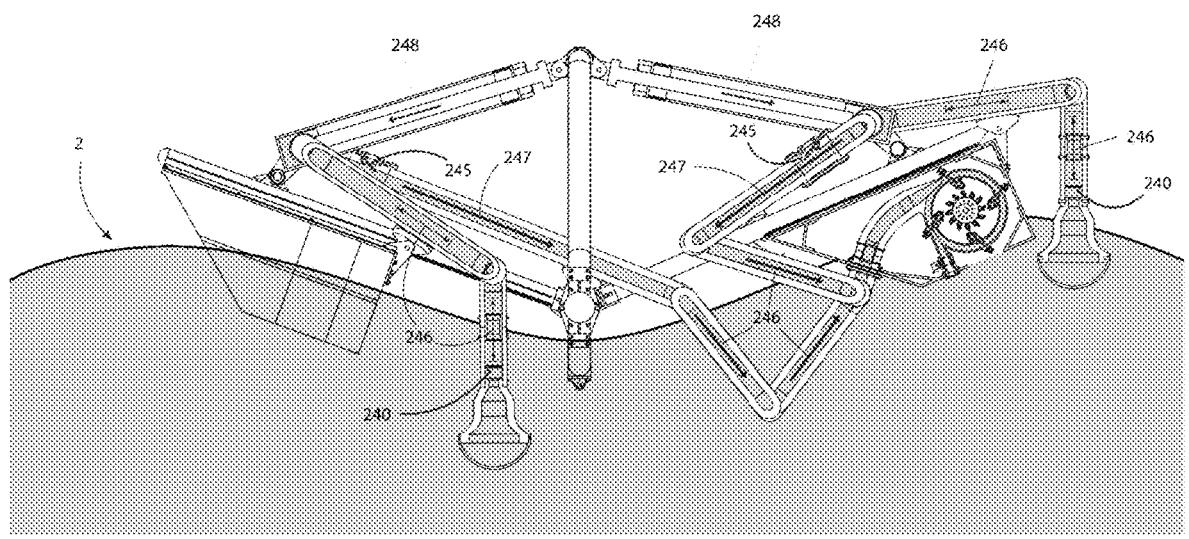
FIG. 67 illustrates a left cutaway view of the hydraulic system during a trough wave event where water is being compressed in the hydraulic cylinder and is sent pressurized through the output pipes to spin the hydraulic turbine in the rear buoyancy tank in accordance with the principles of the present disclosure.
Figure 72:
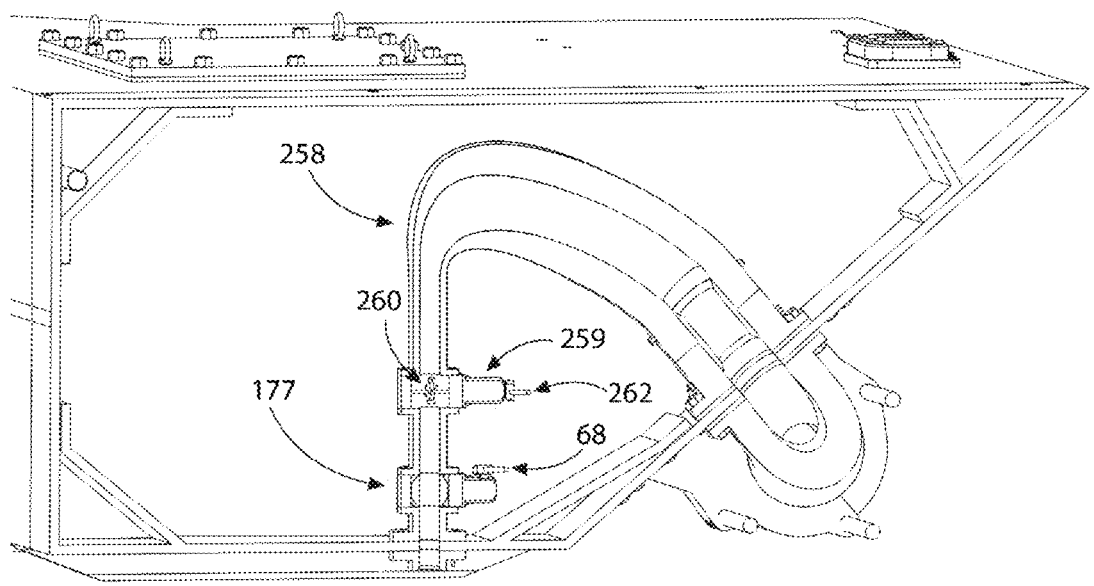
FIG. 72 illustrates a right cutaway view of the rear buoyancy tank and the high pressure water pumping extraction system which replaces turbine rotation and electricity production where high pressure water is sent to shore by external pipes for use in moving turbines remotely or for pumping water to a desalination plant or for any other use where pressurized pumped water is needed in accordance with the principles of the present disclosure.

FIG. 67 illustrates a left side view of the water flow inside the hydraulic system 13, during a compression of marine water inside of the marine apparatus 1, body of water 2 closed input check valve 246, impedes water flow from returning to the body of water 2, water trapped in intake pipes, no movements 247, the piston and piston rod 248, contract compressing the water in the cylinder tube, output check valve is open 249 allowing compressed water to flow through the output pipes 250, towards the turbine assembly 133. FIG. 68 illustrates a left side cross section view of the water flow inside the hydraulic turbine assembly 133, during a compression of marine water, body of water 2, pressurized water from output pipes 251, water impacting turbine causing turbine to spin 252, water falling away from turbine 253, water returning to the ocean 254 through the turbine water escape aperture 34. FIG. 69 illustrates a top view of the tank float assemblies 15, fletchings 255 used to help center and face the marine apparatus 1, into the incoming waves. The waves impact the fletchings which partially deflects the waves and moves the marine apparatus 1 in the opposite direction. FIG. 70 illustrates a side view of the tank float assemblies 15, the sloped bow 256 aids the marine apparatus 1, to rise over incoming waves, minimizing push back during wave impacts and maximizing energy oscillation of the system. FIG. 71 illustrates a side view of the marine apparatus 1, where the forward buoyancy tank assembly 17, moves forward and backwards by way of the electrical motor assembly 100, which rotates gear 109, which moves along rack 210, that is welded to the front center outrigger 196. When the front buoyancy tank assembly 17, reaches its optimum position, the electrical brake assembly 99, extends the break 106, to lock in the position of the forward buoyancy tank assembly 17, or contracts break 106, to allow for movement. As in the use of a fulcrum and lever, the further out the forward buoyancy tank 17 is extended, the easier it is for any wave to lift and lower it. The further in the forward buoyancy tank 17 is contracted, the more resistance there is for any wave to lift and lower it. Because of these movements, the marine apparatus 1 is able to adjust its length to suit the types of wave conditions that it will encounter to provide the correct amount of movement between its parts which will influence the amount of water that will be drawn into the hydraulic assembly 12 and the amount of pressure sent to move the turbine 175 which will move the generators 56. When the forward buoyancy tank assembly 17, moves forward, the central section where the upper and lower triangular frame is located becomes easier to heave in any given wave event because more weight is being concentrated there. When higher waves occur, the forward buoyancy tank assembly 17, moves rearward and the central section becomes harder to heave in any given wave event because more weight is being placed over the forward and rear buoyancy tanks. The more the marine apparatus 1, heaves, the more water is sucked into the hydraulic system 13, which also raises the water pressure impacting the turbine 175, causing the turbine to spin faster. The faster the turbine 175, spins the faster the generator 56 rotates. As the generator 56, rotates faster, more electricity is produced. Less heaving produces less electricity. FIG. 72 illustrates a right cutaway view of the rear buoyancy tank 16, a pumping extraction pipe 258, small generator 259, small turbine blade 260, DC electricity output 262, outlet control valve 177 and low voltage electricity 68. This configuration replaces turbine rotation and electricity production with a pumping configuration where high pressure water is sent to shore by external pipes for use in moving hydraulic turbines or hydraulic motors remotely or for pumping water to a desalination plant or for any other use where pressurized pumped water is needed. A small generator 259 and turbine blade 260 is mounted in the pumping extraction system 258 to produce electricity only for the onboard needs of the marine wave apparatus 1.

Figure 73:
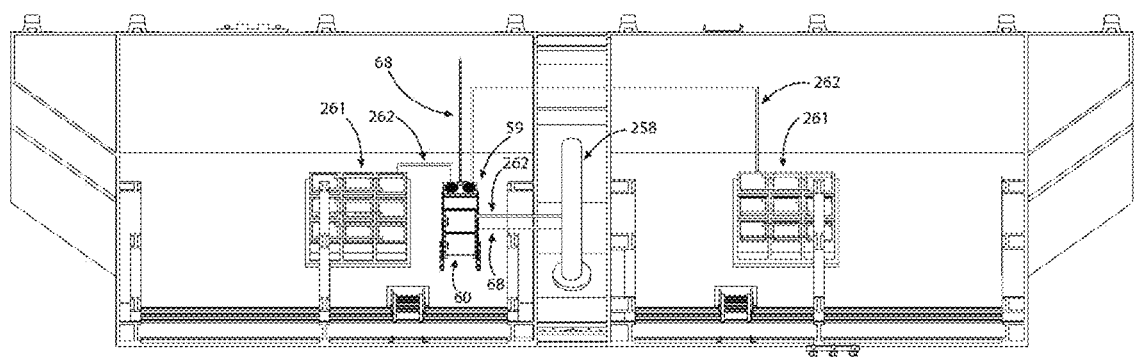
FIG. 73 illustrates a top front view of the rear buoyancy tank without its deck and supports, indicating a view of the high pressure water pumping extraction system in accordance with the principles of the present disclosure.

FIG. 73 illustrates a top front perspective view of the rear buoyancy tank 16 without its deck and supports, indicating a view of a pumping design, pumping extraction pipe 258, industrial high amp batteries 261, DC electricity output 262, low voltage transformer 59, PLC, communications control, camera control, gyroscope and GPS control cabinet 60, low voltage electricity 68. Large scale electricity production is replaced by electrical production only for on board needs and stored in battery banks.

The present disclosure presents a mechanical structure used for extracting energy from oscillating ocean waves capable of adapting to variations in wave frequency and amplitude as well as auto positioning the forward section towards the incoming waves for maximum efficiency. The apparatuses main components are comprised of: front and rear buoyant tanks connected by a plurality of horizontal outriggers by way of a hinge to a vertical frame structure. The pitching motion of the buoyant tanks and outriggers creates perpendicular rotation of the vertical frame by way of the hinge within the vertical frame. The power extraction system is made up of hydraulic rams. The upper section of the hydraulic rams are connected to the upper section of the vertical frame by way of a hard point which allows for pivotal movement. The lower hydraulic ram sections are connected by way of a hard points to an outrigger which lies above both buoyant tanks. The hard points allow for pivotal movement. The perpendicular rotation of the vertical frame and the pitching of the buoyancy tanks contract and expand the hydraulic rams. On the downward slope of the wave the buoyancy tanks pitch forward expanding the hydraulic rams creating a vacuum. The vacuum forces open a check causing water to flow into the hydraulic rams from an inlet pipe and filter. Check valves on the exit pipes close off so that neither water nor air are not sucked back towards the hydraulic rams. On the upward slope of the wave, water in the hydraulic ram's cavity is compressed, a check valve closes off on the inlet pipe and a check valve on the outlet pipe opens allowing for the compressed water to flow forwards. Hydraulic pressure in the system is equivalent to the displacement of the buoyant tanks minus the weight of the complete apparatus. Hydraulic pressure is used as the motive force to move a turbine or for pumping water.

In light of the foregoing description, it should be recognized that embodiments in accordance with the present invention can be realized in numerous configurations contemplated to be within the scope and spirit of the claims. Additionally, the description above is intended by way of example only and is not intended to limit the present invention in any way, except as set forth in any future claim.

The invention claimed is:

1. An apparatus for extracting energy from oscillating fluid, comprising:
   a structural support assembly that comprises a main hinge, a plurality of front outrigger assemblies, a plurality of rear outrigger assemblies and a frame assembly having an upper frame and a lower frame;
   wherein the upper frame and the lower frame are both attached to the main hinge;
   wherein both the plurality of front outrigger assemblies and the plurality of rear outrigger assemblies are attached to the main hinge via one or more bearings that permit the front and rear outrigger assemblies to rotate along the axis of the main hinge;
   wherein at least one of the plurality of front outrigger assemblies includes at least one outrigger support base;
   wherein at least one of the plurality of front outrigger assemblies includes a rack and pinion system;
   wherein at least one of the plurality of front outrigger assemblies includes a rack and braking system;
   a hydraulic assembly that comprises a front hydraulic assembly, a rear hydraulic assembly and a turbine assembly, wherein both the front and rear hydraulic assemblies include one or more hydraulic pumps;
   wherein the hydraulic assembly is connected to the structural support assembly;
   an electrical assembly that comprises at least one generator, at least one hydraulic turbine, at least one voltage transformer, a programmable logic controller and a circular electrical transfer assembly connected to a rear electrical conduit and connected to a forward electrical conduit;
   a tank float assembly that comprises a front tank float assembly and a rear tank float assembly;
   wherein at least one of the front outrigger assemblies is connected to the front tank float assembly via the at least one outrigger support base, which allows the forward and rearward movement of the front tank float assembly;
   wherein at least one of the rear outrigger assemblies is connected to the rear tank float assembly;
   wherein the one or more hydraulic pumps are connected to at least one of the front outrigger assemblies and to at least one of the rear outrigger assemblies, thus providing the front and rear tank float assemblies, which are connected to the corresponding front and rear outrigger assemblies, with the capability of moving up and down when the corresponding front and rear outrigger assemblies rotate along the axis of the main hinge; and
   an electrical brake assembly for stopping the front tank float assembly as it moves back and forth along the at least one outrigger support base.

2. The apparatus for extracting energy from oscillating fluid of claim 1, wherein the frame assembly is triangular in shape.

3. The apparatus for extracting energy from oscillating fluid of claim 1, wherein both the front and rear hydraulic assemblies include one or more check valves.

4. The apparatus for extracting energy from oscillating fluid of claim 1, wherein the hydraulic assembly is connected to the structural support assembly via the upper frame of the frame assembly.

5. The apparatus for extracting energy from oscillating fluid of claim 1, wherein the electrical assembly is located inside the front tank float assembly or inside the rear tank float assembly.

6. The apparatus for extracting energy from oscillating fluid of claim 1, wherein the electrical assembly further comprises one or more of the following: a data antenna, a video camera, a GPS antenna, a communications antenna, an electrical generator, a heat sink cooling fins, a high voltage transformer, a low voltage transformer, an hydraulic Pelton turbine, a programmable logic controller, a communications control, a camera control, a gyroscope and a GPS control cabinet.

7. The apparatus for extracting energy from oscillating fluid of claim 1, further comprising a rode connected to the frame assembly.

8. The apparatus for extracting energy from oscillating fluid of claim 7, wherein the rode includes a junction ring that splits one end of the rode into a two-headed end, thereby allowing the rode to connect to the frame assembly in two locations.

9. The apparatus for extracting energy from oscillating fluid of claim 7, further comprising an anchor attached to the rode.

10. The apparatus for extracting energy from oscillating fluid of claim 7, further comprising an armored electrical cable connected to the frame assembly.

11. The apparatus for extracting energy from oscillating fluid of claim 10, further comprising a plurality of floats connected to the electrical armored cable.

12. The apparatus for extracting energy from oscillating fluid of claim 11, wherein the electrical armored cable is connected to the rode via a one or more separating straps.

* * * * *